(12) United States Patent
Suzuki et al.

(10) Patent No.: US 7,796,205 B2
(45) Date of Patent: Sep. 14, 2010

(54) POLYMER FILM, CYCLIC POLYOLEFIN FILM, METHOD FOR MANUFACTURING THE SAME, OPTICAL COMPENSATION FILM, POLARIZER AND LIQUID CRYSTAL DISPLAY DEVICE

(75) Inventors: Masaya Suzuki, Minami-Ashigara (JP); Hirofumi Toyama, Minami-Ashigara (JP); Koju Ito, Minami-Ashigara (JP); Katsumi Sasata, Minami-Ashigara (JP); Hiromoto Haruta, Minami-Ashigara (JP); Kunihiro Atsumi, Minami-Ashigara (JP); Takashi Murooka, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 292 days.

(21) Appl. No.: 12/064,591

(22) PCT Filed: Aug. 25, 2006

(86) PCT No.: PCT/JP2006/317292

§ 371 (c)(1),
(2), (4) Date: Feb. 22, 2008

(87) PCT Pub. No.: WO2007/024028

PCT Pub. Date: Mar. 1, 2007

(65) Prior Publication Data
US 2009/0135344 A1    May 28, 2009

(30) Foreign Application Priority Data

| Aug. 26, 2005 | (JP) | ............................. 2005-246468 |
| Sep. 9, 2005 | (JP) | ............................. 2005-262708 |
| Feb. 21, 2006 | (JP) | ............................. 2006-044206 |
| Jun. 8, 2006 | (JP) | ............................. 2006-159834 |

(51) Int. Cl.
*G02F 1/1333* (2006.01)
*C08J 5/18* (2006.01)
*B29C 39/22* (2006.01)
*C08B 3/00* (2006.01)
*C08F 210/00* (2006.01)

(52) U.S. Cl. .................. 349/49; 428/141; 264/121; 536/58; 526/348

(58) Field of Classification Search .................. None
See application file for complete search history.

(56) References Cited

U.S. PATENT DOCUMENTS 5,077,912 A    1/1992  Ogawa et al.
6,731,357 B1 *  5/2004  Tachibana et al. ............. 349/96

(Continued)

FOREIGN PATENT DOCUMENTS

EP    0 911 656 A2    4/1999

(Continued)

OTHER PUBLICATIONS

Form PCT/ISA/210 (International Search Report) dated Nov. 17, 2006.

(Continued)

*Primary Examiner*—Tina M Wong
(74) *Attorney, Agent, or Firm*—Buchanan Ingersoll & Rooney PC

(57) ABSTRACT

A polymer film, wherein when any point in the polymer film is taken as a center, a maximum difference between high and low film thicknesses within a range of 60 mm diameter is not more than 1 μm, an RMS value of a film thickness is 0 μm to 0.15 μm or a difference between maximum and minimum values of slow axis angle in any 60 mm×60 mm square in the polymer film is 0° to 0.40°; and a solution casting film-forming method comprising: casting a dope on a support; peeling the casted film, wherein a dry wind of 3 m/s to 15 m/s is applied to the casted film within 15 seconds from the casting, and wherein before the dry wind is applied to the casted film, an air floating on a surface of the casted film has a wind velocity of less than 3 m/s.

4 Claims, 5 Drawing Sheets

U.S. PATENT DOCUMENTS

| | | | |
|---|---|---|---|
| 7,226,556 B2 * | 6/2007 | Yamazaki et al. | 264/212 |
| 7,359,017 B2 * | 4/2008 | Umeda et al. | 349/117 |
| 7,399,440 B2 * | 7/2008 | Kazama et al. | 264/217 |
| 2004/0174474 A1 | 9/2004 | Tachibana et al. | |
| 2005/0238820 A1 | 10/2005 | Tachibana et al. | |
| 2006/0001799 A1 * | 1/2006 | Kawamoto et al. | 349/96 |

FOREIGN PATENT DOCUMENTS

| | | |
|---|---|---|
| JP | 2-131174 A | 5/1990 |
| JP | 8-050206 A | 2/1996 |
| JP | 2587398 Y2 | 10/1998 |
| JP | 11-077718 A | 3/1999 |
| JP | 11-123732 A | 5/1999 |
| JP | 2000-212298 A | 8/2000 |
| JP | 2000-301555 A | 10/2000 |
| JP | 2000-301588 A | 10/2000 |
| JP | 2001-019776 A | 1/2001 |
| JP | 2002-071957 A | 3/2002 |
| JP | 2002-114827 A | 4/2002 |
| JP | 2002-311240 A | 10/2002 |
| JP | 2003-001655 | 1/2003 |
| JP | 2003-039459 | 2/2003 |
| JP | 2003-145562 A | 5/2003 |
| JP | 2003-212927 A | 7/2003 |
| JP | 2003-270442 A | 9/2003 |
| JP | 2003-276037 A | 9/2003 |
| JP | 2004-126026 A | 4/2004 |
| JP | 2004-198952 | 7/2004 |
| JP | 2004-325561 | 11/2004 |
| JP | 2004-361712 | 12/2004 |
| WO | WO 2004/070463 | 8/2004 |

OTHER PUBLICATIONS

Form PCT/ISA/237 (Written Opinion of the International Searching Authority) dated Nov. 17, 2006.

Form PCT/ISA/206 dated Oct. 3, 2006.

Journal of Technical Disclosure No. 2001-1745, Mar. 15, 2001, pp. 1-84.

Office Action issued in corresponding Japanese Patent Application 2005-262708 dated Apr. 13, 2010.

* cited by examiner

POLYMER FILM, CYCLIC POLYOLEFIN FILM, METHOD FOR MANUFACTURING THE SAME, OPTICAL COMPENSATION FILM, POLARIZER AND LIQUID CRYSTAL DISPLAY DEVICE

TECHNICAL FIELD

The present invention relates to polymer film and a method for manufacturing the same. In addition, the present invention relates to a cyclic polyolefin film and a method for manufacturing the same, to an optical compensation film, to a polarizer and to a liquid crystal display device.

BACKGROUND ART

Due to its various advantages such as that voltage is low, consumption of electricity is low and it is possible to make into small size and into thin thickness, liquid crystal display devices have been widely utilized for use as television and monitor for personal computers and portable instruments. With regard to the liquid crystal display device as such, various modes have been proposed depending upon the orientation state of liquid crystals in liquid crystal cells and, up to now, a TN mode where a twisted orientation state is about 90° from the lower-side substrate to the upper-side substrate of the liquid crystal cell has been the mainstream.

Usually, a liquid crystal display device is constituted from liquid crystal cell, optical compensation sheet and polarizer. The optical compensation sheet is used for solving the coloration of image or for expanding the visual angle and film where liquid crystal is applied to double refraction film or transparent film has been used. For example, in Japanese Patent No. 2,587,398, there is a disclosure for an art where discotheque liquid crystal is applied on a triacetyl cellulose film, oriented and fixed and the resulting optical compensation sheet is applied to a liquid crystal cell of TN mode to expand the visual angle. However, in liquid crystal device to be used for television where it is presumed to see a large screen from various angles, there is a severe demand for dependency of visual angle and the demand as such is unable to be satisfied by the aforementioned means. Therefore, liquid crystal devices being different from TN mode such as IPS (in-plane switching) mode, OCB (optically compensatory bend) mode and VA (vertically oriented) mode have been studies. Since VA mode has particularly high contrast and relatively high yield in the manufacture, it has been receiving attention as a liquid crystal display device for TV.

As compared with other polymer films, cellulose acetate film usually has a characteristic that its optical isotropy is high (retardation value is low). Therefore, it is common that cellulose acetate film is used for the use where optical isotropy is demanded such as a polarizing plate.

On the contrary, optical anisotropy (high retardation value) is demanded for an optical compensation sheet (phase contrast film) for liquid crystal display devices. Particularly for an optical compensation sheet for VA, in-plane retardation (Re) of 30 to 200 nm and thickness-direction retardation (Tth) of 70 to 400 nm are needed. Accordingly, as an optical compensation sheet, it has been usual to use synthetic polymer film having high retardation values such as polycarbonate film and polysulfone film.

As such, in the technical field of optical materials, it has been a general principle that synthetic polymer film is used in case optical anisotropy (high retardation value) is demanded for polymer film while cellulose acetate film is used in case optical isotropy (low retardation value) is demanded.

In European Patent Laid-Open No. 911656, there is a disclosure for cellulose acetate film having a high retardation value which is able to be used for the use where optical anisotropy is also demanded overturning the conventional common principles. In the document, an aromatic compound having at least two aromatic rings or, particularly, a compound having 1,3,5-triazine rings is added followed by subjecting to an stretching treatment so as to achieve a high retardation value in cellulose triacetate.

It has been known that, generally, cellulose triacetate is a polymer material which is hard to be stretched and is difficult for making its double refractive index big. However, when an additive is oriented at the same time in an stretching treatment, the double refractive index is now made possible to enlarge whereby a high retardation value is achieved. Since this film is also used as a protective film for a polarizing plate, there is an advantage that less expensive and thin liquid crystal display device is able to be provided.

In Japanese Patent Laid-Open No. 2002/71,957, there is a disclosure for optical film containing cellulose acylate having an acyl group of 2 to 4 carbons as a substituent and satisfies both of formulae $2.0 \leq (A+B) \leq 3.0$ and $A < 2.4$ in which A is degree of substitution of acetyl group and B is degree of substitution of propionyl group or butyryl group and, further, Nx which is refractive index in the direction of slow axis angle and Ny which is refractive index in the direction of progressive phase axis at wavelength of 590 nm satisfy the formula $0.0005 \leq (Nx-Ny) \leq 0.0050$.

Further, in Japanese Patent Laid-Open No. 2003/270,442, there is a disclosure for polarizing plate used for a liquid crystal display device of a VA mode which is characterized in that the polarizing plate has a polarizer and an optically biaxial mixed fatty acid cellulose acylate film and that the optically biaxial mixed fatty acid cellulose acylate film is oriented between liquid crystal cell and polarizer.

Cellulose ester film is usually manufactured by a solution film-forming method. The solution film-forming method is able to manufacture film having good properties such as optical property as compared with other manufacturing method such as melting film-forming method. In the solution film-forming method, a polymer solution (hereinafter, it will be referred to as a dope) where a polymer is dissolved in a mixed solvent in which dichloromethane and methyl acetate are main solvents. The dope is made into casting beads from a casting die and casted onto a support to form a casted film. After the casted film becomes a product having a self-supporting property on the support, it is peeled from the support as a film (hereinafter, this film will be referred to as wet film), dried and wound as film (refer, for example, to *Journal of Technical Disclosure* No. 2001/1,745 published by the JIII (Japanese Institute for Inventions and Innovations)).

In a solution film-forming method, dry wind is applied onto the surface of the casted film in order to proceed the drying of the film. However, if drying of the casted film is carried out suddenly, there is a risk of causing the worsening of the face property of the surface. Therefore, there has been known a method where drying speed of the casted film is made not more than 300% by mass/min (=5% by mass/s) in terms of amount of the solvent contained therein on the basis of dried amount so that a slow drying is carried out (refer, for example, to Japanese Patent Laid-Open No. 11/123,732). A co-casting method where the casted film is made into a multi-layer structure has been known as well. An example is a casted film where skin layers are formed on both surfaces of a core layer which is an intermediate layer. In that case, dope viscosity of the core layer is enhanced to ensure the strength of the casted film and, at the same time, dope viscosity forming the skin layer is lowered so that flatness and smoothness of the surfaces are improved (refer, for example, to Japanese Patent Laid-Open No. 2003/276,037).

Polarizing plate is usually manufactured by adhesion of film mainly comprising cellulose triacetate as a protective film on both sides of a polarizer in which iodine or dichromatic dye is oriented to and adsorbed with polyvinyl alcohol. Cellulose triacetate film has characteristics of high toughness, flame retardant property, optical isotropy (low retardation), etc. and has been widely used as a protective film for the above-mentioned polarizing plate. A liquid crystal display device is constituted from polarizing plate and liquid crystal cell. In a TFT liquid crystal display device of a TN mode which is a mainstream of liquid crystal display devices at present, an optical compensation sheet is inserted between polarizing plate and liquid crystal cell whereby a liquid crystal display device having a high display quality is achieved as mentioned in Japanese Patent Laid-Open No. 08/050,206. However, in cellulose triacetate, much water is absorbed and permeated and, therefore, it has disadvantages that optical compensation property changes and that a polarizer is apt to be deteriorated.

Cyclic polyolefin film has been receiving public attention as a film which is able to improve moisture-absorbing and permeating properties of cellulose triacetate film and development of film for protection of polarizing plate by heat fusion film-forming and solution film-forming has been developed. Since cyclic polyolefin film has high ability for expression of optical characteristics, its development as a phase contrast film has been conducted (Japanese Patent Laid-Open No. 2003/212,927, Japanese Patent Laid-Open No. 2004/126,026 and Japanese Patent Laid-Open No. 2002/114,827).

In the method for the manufacture of cyclic polyolefin film, variations in optical characteristics in a transverse direction and in a longitudinal direction (in the directions of retardation and of optical axis) have been problems in the case of heat fusion film-forming. Another problem it that, in cyclic polyolefin film having a glass transition point (Tg) of as high as 200° C. to 400° C., temperature upon heat fusion film formation is high and, therefore, it is difficult to prepare a uniform film by means of a strict control.

On the other hand, in the solution film formation of cyclic polyolefin film, although there is an advantage that polymer having a high Tg is able to be made into film, there are problems in adjustment in expressing ability of optical characteristics and a control of variation thereof. In addition, in the use as an optical compensation film which has been used in liquid crystal display devices in recent years, there has been an increasing demand particularly for flatness of the film but, under the conventional drying conditions, it has been found to cause a problem that unevenness in stripes and in spots is generated upon drying due to its wind velocity, etc. Further, when resistance upon peeling is high, there is a problem of generation of step-like unevenness upon peeling. Particularly, unevenness in stripes and in spots which is generated in drying is a big problem causing deterioration of quality of optical films where an excellent flatness is demanded and there is a necessity for improving it.

DISCLOSURE OF THE INVENTION

The methods disclosed in the above-mentioned documents are effective in such a respect that less expensive and thin liquid crystal display devices are able to be manufactured. However, high retardation is given to cellulose ester film and, in liquid crystal display device used as a phase contrast film, only a slight uneven thickness is recognized by naked eye. Moreover, in liquid crystal display device for TV, black luminance lowers as a result of tendency of high contrast in panel of recent years and only a slight unevenness of optical film is recognized by naked eye. Therefore, level for demanding the flatness of film is increasing. On the other hand, under the conventional film-forming conditions, there have been problems of generation of linear or spotty unevenness due to wind velocity in drying and of generation of unevenness observed upon cross nicol. The unevenness generated upon drying as such is a big problem causing deterioration of quality particularly in optical film where a good flatness is demanded. Further, quickening of the casting speed and that of the drying speed have been carried out so as to enhance the productivity of film. In that case, there is a problem that low productivity of film is resulted due to lowering of drying speed in the method mentioned in the aforementioned Patent Document 4. In the method mentioned in the aforementioned Patent Document 5, it is always necessary to conduct a multi-layered casting and the method may not be always suitable for the desired film.

A first object of the present invention is that, in a liquid crystal display device using a phase contrast film and cellulose ester film, uneven film thickness of the phase contrast film is made small so that a liquid crystal display device having an excellent displaying quality is provided.

The present invention has been achieved in view of the above-mentioned conventional problems and its second object is to provide a cyclic polyolefin film having little hygroscopicity and moisture permeability, having little change in optical characteristics by changes in environmental temperature and humidity and having excellent flatness and surface property without unevenness. Another object is to provide a solution casting film-forming method for a cyclic polyolefin film having the above-mentioned properties. Still another object is to provide an optical compensation film, a polarizer and a liquid crystal display device using the excellent cyclic polyolefin film having the above-mentioned properties.

As a result of intensive investigations of the present inventors, it has been found that, when a casted film is quickly dried in a drying zone with hot wind within 15 seconds from initiation of casted film (hereinafter, it will be referred to as initial film) is formed on the surface of the casted film and, due to a leveling effect of the initial film, growth of the film is promoted together with flattening and smoothening of the surface property of the initial film. It has been also found that the film prepared by stretching this casted film followed by drying has an excellent flatness. It has been further found that the above-mentioned object is able to be achieved by the use of polymer film in which the maximum difference between high and low film thickness (P–V value) is adjusted to make not longer than 1 µm and the slow axis angle distribution is adjusted to make not more than 0.40° whereupon the present invention has been achieved.

Thus, the present invention relates to a polymer film having the following constitution, a solution film-forming method and polarizing plate and liquid crystal display device using cellulose ester film and, as a result thereof, the aforementioned first object of the present invention is able to be achieved.

(1) A polymer film, wherein when any point in the polymer film is taken as a center, a maximum difference between high and low film thicknesses within a range of 60 mm diameter is not more than 1 µm.

(2) A polymer film, wherein when any point in the polymer film is taken as a center, an RMS value of a film thickness within a range of 60 mm diameter is 0 μm to 0.15 μm.

(3) A polymer film, wherein a difference between maximum and minimum values of slow axis angle in any 60 mm×60 mm square in the polymer film is 0° to 0.40°.

(4) The polymer film as described in (1) or (2) above, wherein a difference between maximum and minimum values of slow axis angle in any 60 mm×60 mm square in the polymer film is 0° to 0.40°.

(5) The polymer film as described in any of (1) to (4) above, wherein an in-plane retardation Re ($\lambda$) is 0 nm $\leq$ Re$_{(590)}$ $\leq$ 200 nm and a retardation in a direction of film thickness Rth ($\lambda$) is 60 nm $\leq$ Rth$_{(590)}$ $\leq$ 400 nm, wherein Re ($\lambda$) is an in-plane retardation (Re) value (unit: nm) at a wavelength of $\lambda$ nm; and Rth ($\lambda$) is a retardation (Rth) value (unit: nm) in a direction of film thickness at a wavelength of $\lambda$ nm.

(6) The polymer film as described in any of (1) to (5) above, which comprises at least one retardation expressing agent comprising a rod-shaped or discotic compound.

(7) The polymer film as described in any of (1) to (6) above, which comprises at least one of plasticizer, ultraviolet absorber and peeling promoter.

(8) The polymer film as described in any of (1) to (7) above, which has a film thickness of 40 to 180 μm.

(9) The polymer film as described in any of (1) to (8) above, wherein a material polymer of the polymer film is a cyclic polyolefin.

(10) The polymer film as described in any of (1) to (8) above, wherein a material polymer of the polymer film is a cellulose ester, and wherein an acyl substituent of the cellulose ester substantially comprises acetyl group only, and a total degree of substitution of the cellulose ester is 2.56 to 3.00.

(11) The polymer film as described in any of (1) to (8) above, wherein a material polymer of the polymer film is a cellulose ester, and wherein an acyl substituent of the cellulose ester substantially comprises at least two of acetyl group, propionyl group and butanoyl group, and a total degree of substitution of the cellulose ester is 2.50 to 3.00.

(12) The polymer film as described in (10) above, which comprises a cellulose acylate obtained by substitution of hydroxyl group of glucose unit constituting cellulose with acyl group having two or more carbon atoms, wherein when a degree of substitution of hydroxyl group at 2-position of the glucose unit is DS2, a degree of substitution of hydroxyl group at 3-position of the glucose unit is DS3 and a degree of substitution of hydroxyl group at 6-position of the glucose unit is DS6, DS2, DS3 and DS6 satisfy following formulae (I) and (II):

$$2.0 \leq DS2+DS3+DS6 \leq 3.0 \quad (I)$$

$$DS6/(DS2+DS3+DS6) \geq 0.315. \quad (II)$$

(13) A solution film-forming method comprising:

casting a dope containing a polymer and a solvent on a support which runs in an endless manner from a casting die to form a casted film on the support from the dope;

applying a dry wind of 3 m/s or more onto the casted film within 15 seconds from the casting of the dope onto the support; and peeling the casted film as a film, wherein the method further comprises stretching the film after peeling the casted film as the film from the support.

(14) A solution film-forming method comprising:

casting a dope containing a polymer and a solvent on a support which runs in an endless manner from a casting die to form a casted film on the support from the dope; and peeling the casted film as a film, wherein an initial film acting as a formation initiator for the film is formed on a surface of the casted film, and a plane of the surface of the casted film is made flat and smooth by leveling effect of the initial film, and wherein the method further comprises stretching the film after peeling the casted film from the support.

(15) The solution film-forming method as described in (14) above, wherein the initial film is formed by applying a dry wind to the casted film.

(16) The solution film-forming method as described in any of (13) to (15) above, wherein before the dry wind is applied to the casted film, an air floating on the surface of the casted film has a wind velocity of less than 3 m/s and time when the air is floating on the surface of the casted film is 15 seconds or shorter.

(17) The solution film-forming method as described in any of (13) to (16) above, wherein the dry wind has a wind velocity of 3 m/s to 15 m/s.

(18) The solution film-forming method as described in any of (13) to (17) above, wherein the dry wind is applied to the casted film for 20 seconds or longer.

(19) The solution film-forming method as described in any of (13) to (18) above, wherein the dry wind has a gas concentration of 25% or less.

(20) The solution film-forming method as described in any of (13) to (19) above, wherein a temperature of the dry wind is 40° C. to 150° C.

(21) The solution film-forming method as described in any of (13) to (20) above, wherein the dope contains an organic solvent, and wherein the organic solvent contains 0.1% by mass to 40% by mass of an alcohol having 6 or less carbons.

(22) The solution film-forming method as described in any of (13) to (21) above, which is a film-forming method where at least two layers of inner and outer layers are casted by a co-casting, wherein a solid concentration of a dope for the outer layer is lower to an extent of 1% by mass or more than a solid concentration of a dope for the inner layer.

(23) The solution film-forming method as described in any of (13) to (22) above, which is a film-forming method where at least two layers of inner and outer layers are casted by a co-casting, wherein an adding amount of alcohol to a dope for the outer layer is 1.05 to 6.0-fold of that for the inner layer.

(24) The solution film-forming method as described in any of (13) to (23) above, which is a film-forming method where at least two layers of inner and outer layers are casted by a co-casting, wherein an adding amount of fine particles of a matte agent to a dope for the inner layer is lower than that to a dope for the outer layer.

(25) The solution film-forming method as described in any of (13) to (24) above, wherein a multiplication factor of the stretching is 1.01- to 2.0-fold.

(26) The polymer film as described in any of (1) to (12) above, which is prepared by a solution film-forming method as described in any of (13) to (25) above.

(27) The polymer film as described in any of (1) to (12) and (26) above, which has an optical compensation layer on the polymer film.

(28) The polymer film as described in (27) above, wherein the optical compensation layer comprises a discotic liquid crystal compound.

(29) A polarizing plate comprising:
a polarizer; and
at least two protective films,
wherein at least one of the at least two protective films is a polymer film as described in any of (1) to (12) and (26) to (28) above.

(30) The polarizing plate as described in (29) above, wherein at least one of a hard coat layer, an antiglare layer and a reflection-preventing layer is provided on a surface of one of the at least two protective films placed at an opposite side of a liquid crystal cell.

(31) A liquid crystal display device comprising at least one of a polymer film as described in any of (1) to (12) and (26) to (28) above and a polarizing plate as described in (29) or (30) above.

The present invention achieving the aforementioned second object of the present invention is as follows.

(32) A solution casting film-forming method comprising:
casting a dope containing a cyclic polyolefin polymer and a solvent on a support which runs in an endless manner from a casting die to form a casted film on the support from the dope;
peeling the casted film as a film,
wherein a dry wind of 3 m/s to 15 m/s is applied to the casted film within 15 seconds from the casting of the dope onto the support, and
wherein before the dry wind is applied to the casted film, an air floating on a surface of the casted film has a wind velocity of less than 3 m/s.

(33) A solution casting film-forming method comprising:
casting a dope containing a cyclic polyolefin polymer and a solvent on a support which runs in an endless manner from a casting die to form a casted film on the support from the dope; and
peeling the casted film as a film,
wherein an initial film acting as a formation initiator for the film is formed on a surface of the casted film, and a plane of the surface of the casted film is made flat and smooth by leveling effect of the initial film.

(34) The solution casting film-forming method as described in (33) above,
wherein the initial film is formed by applying a dry wind to the casted film.

(35) The solution casting film-forming method as described in (33) or (34) above,
wherein before the dry wind is applied to the casted film, an air floating on the surface of the casted film has a wind velocity of less than 3 m/s and time when the air is floating on the surface of the casted film is 15 seconds or shorter.

(36) The solution casting film-forming method as described in any of (33) to (35) above,
wherein the dry wind has a wind velocity of 3 m/s to 15 m/s.

(37) The solution casting film-forming method as described in any of (32) to (36) above,
wherein when the casted film is peeled off from the surface of the support which runs in an endless manner, a residual volatile component is 20% by mass to 150% by mass.

(38) The solution casting film-forming method as described in any of (32) to (37) above,
wherein when the casted film is peeled off from the surface of the support which runs in an endless manner, a resistance against peeling is less than 0.25 N/cm.

(39) The solution casting film-forming method as described in any of (32) to (38) above,
wherein the method further comprises stretching the film after peeling the casted film from the support.

(40) The solution casting film-forming method as described in any of (32) to (39) above,
wherein a glass transition temperature (Tg) of the cyclic polyolefin polymer is 200° C. to 400° C.

(41) A cyclic polyolefin film manufactured by a solution casting film-forming method as described in any of (32) to (40) above.

(42) An optical compensation film comprising a cyclic polyolefin film as described in (41) above.

(43) The optical compensation film as described in (42) above,
wherein an in-plane retardation Re and a retardation in a direction of film thickness Rth satisfy following formulae, and a standard deviation of a slow axis angle is within 1.5°:

$$0 \text{ nm} \leq Re(590) \leq 100 \text{ nm}$$

$$40 \text{ nm} \leq Rth(590) \leq 400 \text{ nm}$$

wherein Re ($\lambda$) and Rth ($\lambda$) represent Re and Rth measured at a wavelength of $\lambda$ nm, respectively.

(44) The optical compensation film as described in (42) or (43) above,
wherein the cyclic polyolefin polymer is stretched by a uniaxial stretching method, a simultaneous biaxial stretching method or a successive biaxial stretching method.

(45) A polarizing plate comprising:
a polarizer; and
at least two protective films,
wherein at least one of the at least two protective films comprises a cyclic polyolefin film as described in (41) or an optical compensation film as described in any of (42) to (44) above.

(46) A liquid crystal display device comprising at least one of a cyclic polyolefin film as described in (41), an optical compensation film as described in any of (42) to (44) above and a polarizing plate as described in (45) above.

Figure 1:
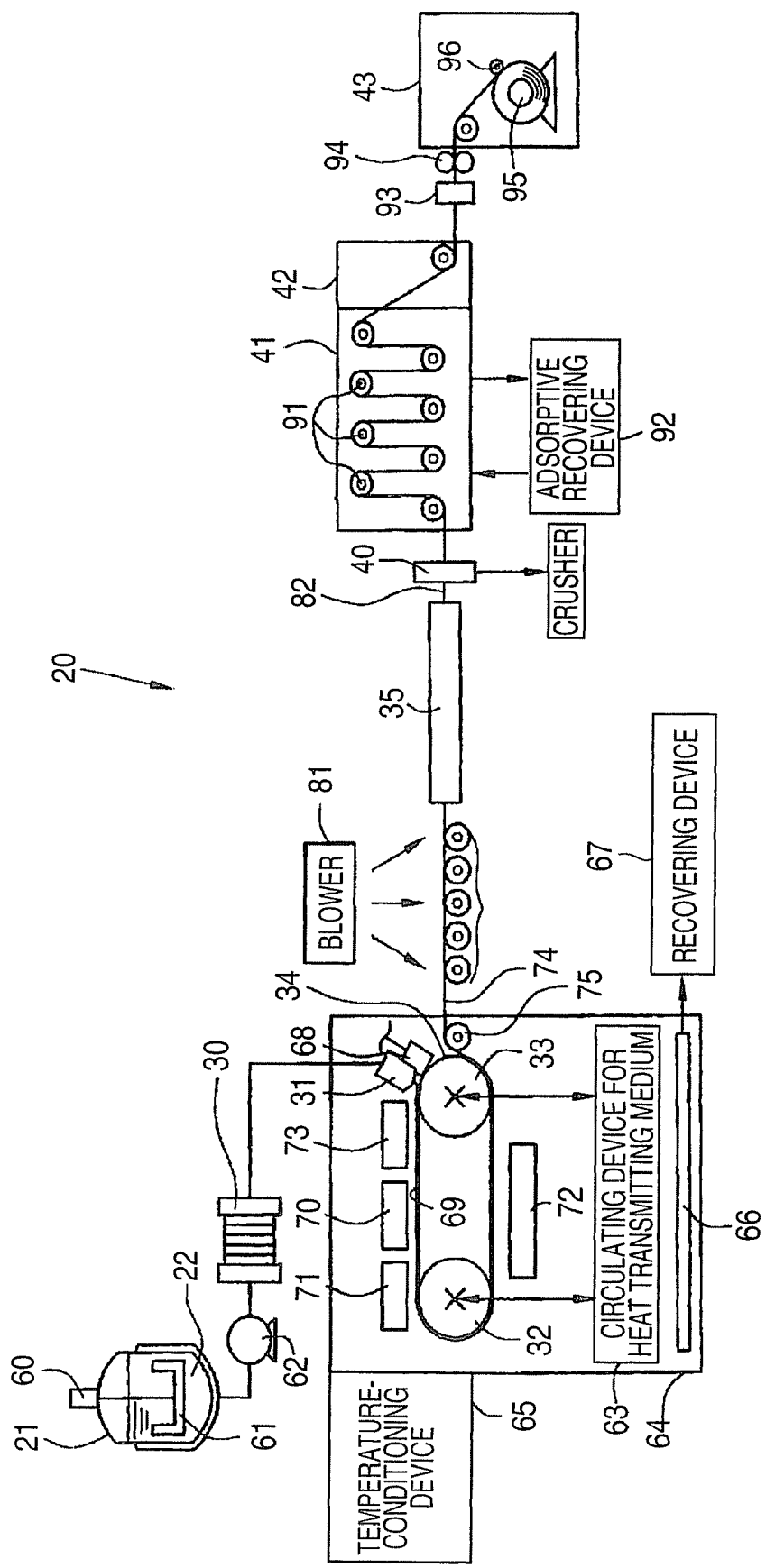
FIG. 1 is an example of outline chart of the film manufacturing line for carrying out the solution film-forming method of the present invention.

30 denotes a filtering device; 31 denotes a casting die; 32 denotes a rotating roller; 33 denotes a rotating roller; 34 denotes a casting band; 35 denotes a tenter-type drying machine; 40 denotes an ear-cutting device; 41 denotes a drying chamber; 42 denotes a cooling chamber; 43 denotes a winding chamber; 46 denotes a casting band; 50 denotes a labyrinth seal; 51 denotes an air-supplying device; 52a, 52b denote nozzles at both ends of casted film 69 for applying dry wind to the central part of casted film 69; 53 denotes a nozzle at central part of casted film 69 in the width direction for applying dry wind to both ends; 54 denotes a nozzle for applying dry wind to casted film 69 to a suction opening 55; 55 denotes a suction opening; 57 denotes a dry wind; 60 denotes a motor; 61 denotes a stirrer; 62 denotes a pump; 63 denotes a circulating device for thermo-transmitting medium; 64 denotes a casting chamber; 65 denotes a temperature-conditioning device; 66 denotes a condenser; 67 denotes a recovering device; 68 denotes a vacuum chamber; 69 denotes a casted film; 69a denotes an initial film; 70, 71, 72 denote other ventilating openings; 73 denotes a ventilation opening for quick drying; 73a denotes a plural nozzles; 76 denotes a vacuum device (such as a roots type blower); 80 denotes a connecting part; 81 denotes a blower; 82 denotes a film; 90 denotes a crusher; 91 denotes many rollers; 92 denotes an adsorptive recovering device; 93 denotes a compulsory charge-eliminating device (charge-eliminating bar); 94 denotes a roller for endowing knurling; 95 denotes a winding roller; 96 denotes a press roller; A denotes a natural wind region; 110 denotes a mixing tank; 111 denotes a stirring fan; 112 denotes a dope; 113 denotes a pump; 114 denotes a filtering device; 115 denotes a casting die; 116 denotes a belt; 117 denotes a film; 118 denotes a tenter; 119 denotes plural rollers; 120 denotes a drying zone; 121 denotes a cooling zone; 122 denotes a winding machine; 123, 124 denote rollers; and 126 denotes a roller.

BEST MODE FOR CARRYING OUT THE INVENTION

As hereunder, the present invention achieving the aforementioned first object of the present invention will be illustrated in detail.

The present invention relates to polymer film which is characterized in that, when any point in a film is a center and within a range of 60 mm diameter therefrom, the maximum difference between high and low film thicknesses (P–V value) is not more than 1 µm, an RMS value of film thickness is 0 µm to 0.15 µm and the difference between maximum and minimum values of slow axis angle in any 60 mm×60 mm square in a film is not more than 0.40°.

The maximum difference between highest and lowest film thickness (P–V value) was measured by a Fujinon stripe analysis apparatus (FX-03). At that time, measuring area was within a range of 60 mm diameter. As to the value of refractive index to be inputted, an average refractive index of cellulose acylate (1.48) or an average refractive index of cycloolefin polymer (1.53) was used. Resolving power of this apparatus is 512×512.

The maximum difference between highest and lowest film thicknesses (P–V value) was also able to be measured by methods other than the above-mentioned method using a Fujinon stripe analysis apparatus (FX-03). For example, film thickness within a range of 60 mm diameter where any point in the film is a center is measured using a laser displacement meter or a film thickness meter of a contacting type.

RMS value of film thickness is a value defined by the following formula and, the same as the P–V value, it was measured by a Fujinon stripe analyzing apparatus (FX-03).

$$(\text{RMS of film thickness}) = \sqrt{\frac{\sum_{i=0}^{N-1} \Delta d_i^2}{N}}$$

$\Delta d_i$: difference of film thickness within a range of 60 mm diameter from mean value N: numbers of measuring points for film thickness within a range of 60 mm diameter The RMS value is also able to be determined using other apparatus such as laser displacement meter or film thickness meter of a contacting type. In that case, film thicknesses are measured for at least 200 points within a range of 60 mm diameter where any point in the film is a center using laser displacement meter, film thickness meter of a contacting type or the like and mean value of film thickness is determined. Here, difference between the mean value of film thickness and the film thickness at each measuring point is calculated to determine $\Delta d_i$ and then it is applied to the above formula to determine the RMS value.

Range of the P–V value of film thickness measured as such is preferably not more than 1 µm, more preferably not more than 0.8 µm, still more preferably not more than 0.6 µm and, most preferably, not more than 0.4 µm.

RMA value of the film thickness is preferably not more than 0.15 µm, more preferably not more than 0.10 µm, still more preferably not more than 0.07 µm and, most preferably, not more than 0.04 µm. The film having good flatness as such hardly generates unevenness upon adhering with a polarizing plate whereupon panel without unevenness is able to be provided.

Slow axis angle distribution of polymer film was measured by an Optipro (XY scanning stage, halogen lamp light+550 nm interference filter). In that case, measuring area was made 60 mm×60 mm and measurement was conducted with intervals of 4 mm using a beam where caliber was 3 mm.

With regard to the range of the difference between maximum and minimum values of slow axis angle distribution within the range of 60 mm×60 mm measured as such, it is preferably not more than 0.40°, more preferably not more than 0.30°, still more preferably not more than 0.20° and, most preferably, not more than 0.10°. The film where slow axis angle distribution within a small range is improved as such is able to significantly improve the unevenness upon a cross nicol observation and is able to provide a panel having no unevenness.

In the present invention, the term "slow axis angle" does not mean the angle between the orientation direction of a polymer film and a specific angle within a film surface. However, in the case of being used as "difference between maximum and minimum values of slow axis angle", the term means the difference between the maximum and minimum values of the angle between slow axis angle of polymer film and a common direction adopted as a standard direction though it is in any direction. Therefore, the value thereof is able to be determined in a straightforward manner.

The present invention also relates to the following solution film-forming method. Thus, in a solution film-forming method where a dope containing polymer and solvent is casted from a casting die onto a support running in an endless manner so that a casted film is formed from the dope on the support and the resulting casted film is peeled as a film, dry wind is applied to the casted film and/or a initial film acting as a formation-initiating film of the film is formed on the surface of the casted film and the surface property of the casted film surface is made flat and smooth by a leveling effect of the initial film so that film after manufacture becomes preferably within a range of the above-mentioned P-V value, RMS value and slow axis angle. The resulting casted film is peeled and, if necessary, stretched.

The latter process as mentioned above is as follows. When the casted film is quickly dried, for example, in a hot air drying zone within 15 seconds from initiation of casted film (hereinafter, it will be referred to as initial film) is formed on the surface of the casted film and growth of the film is promoted together with flattening and smoothening of face property of the initial film by a leveling effect of the initial film.

Incidentally, the initial film stands for a layer having relatively lower volatile substances than the volatile substances on the side of the support or casted film bulk.

As a result, it is also possible to manufacture a film where, for example, maximum difference in high and low film thicknesses (P-V value) is within a range of 60 mm diameter from a center which is any point in the film.

A solution casting method will be illustrated in detail later and, as hereunder, preferred embodiments in the present invention will be illustrated.

The aforementioned initial film is preferred to be formed by application of dry wind to the casted film. Before the dry wind is applied to the casted film, time where wind of 3 m/s or less floats on the surface of the casted film is made preferably not longer than 15 seconds, more preferably not longer than 10 seconds and, most preferably, not longer than 7 seconds.

Wind velocity of the above dry wind is preferably from 3 m/s to 15 m/s, more preferably from 4 m/s to 12 m/s and, most preferably, from 4 m/s to 10 m/s.

Time for application of the dry wind to the casted film is preferably not shorter than 20 seconds.

Time for application of the dry wind to the casted film is preferably not longer than the time by which volatile solvent component becomes to such an extent that it has no inconvenience for peeling of the casted film (preferably not more than 20% by mass) and, although that depends upon the drying condition, it is usually preferred to be not longer than 10 minutes. (In this specification, mass ratio is equal to weight ratio.)

Gas concentration of the dry wind is preferably not more than 25%, more preferably not more than 20% and, most preferably, not more than 18%. Incidentally, in the present invention, the gas concentration means volatile solvent component in the dry wind measured by an infrared analysis method.

Temperature of the dry wind is preferably from 40° C. to 150° C., more preferably from 45° C. to 120° C. and, most preferably, from 50° C. to 100° C.

It is preferred to apply the dry wind to the surface of the casted film by a slit nozzle or a secondary nozzle.

It is preferred that the drying is carried out under a nitrogen atmosphere. Relative humidity at that time is preferably not more than 10%, more preferably not more than 5% and, particularly preferably, not more than 1%.

The initial film is preferred to start in being formed within 15 seconds from the casted film is formed on the support and it is more preferably within 10 seconds and, most preferably, within 7 seconds.

Residual solvent amount of the casted film when drying of surface of the casted film is started is preferably from 200% by mass to 500% by mass, more preferably from 250% by mass to 450% by mass and, most preferably, from 300% by mass to 420% by mass on a dry weight basis.

A decreasing rate of the solvent contained in the casted film within 30 seconds from the supplement of the dry wind is preferably from 1% mass/s to 15% by mass/s, more preferably from 3% by mass/s to 12% by mass/s and, still more preferably, from 5% by mass/s to 10% by mass/s on a dry weight basis.

Viscosity of the dope during the casting is preferably form 10 Pa·s to 100 Pa·s, more preferably from 12 Pa·s to 50 Pa·s and, most preferably, from 15 Pa·s to 40 Pa·s.

The casting is preferred to be carried out by means of a co-casting.

It is preferred that, in the film comprising plural layers produced by a co-casting, at least one of the thickness of the layer at the air side and the thickness of the layer at the side of a support is from 0.5% to 30% of the thickness of the film as a whole.

In conducting a co-casting, solid concentration of the dope in the outer layer is lower than solid concentration of the dope in the inner layer to an extent of preferably not less than 1% by mass and, more preferably, not less than 3% by mass. In addition, it is preferred that the dope contacting to the outside has more composition of alcohol than the inner dope. Adding amount of alcohol in the outer layer to the inner layer is preferably 1.05- to 6.0-fold, more preferably 1.2- to 4.0-fold and, particularly preferably, 1.5 to 3.0-fold.

Running speed of the support is preferably from 10 m/minute to 200 m/minute, more preferably from 15 m/minute to 150 m/minute and, still more preferably, from 20 m/minute to 120 m/minute.

Now, the polymer material which is preferably used in the present invention will be specifically illustrated hereunder.

[Material of Polymer Film]

With regard to a material for the formation of the polymer film of the present invention, polymer in which optical transparency, mechanical strength, heat stability, water intercepting property, isotropy, etc. are excellent and any material may be used. Examples thereof are polycarbonate polymer; polyester polymer such as polyethylene terephthalate and polyethylene naphthalate; acrylate polymer such as polymethyl methacrylate; and styrene polymer such as polystyrene and acrylonitrile-styrene copolymer (AS resin). Other examples are polyolefin polymer such as polyolefin (e.g., polyethylene and polypropylene) and ethylene-propylene copolymer; vinyl chloride polymer; amide polymer such as Nylon and aromatic polyamide; imide polymer; sulfone polymer; polyether sulfone polymer; polyether ether ketone polymer; polyphenylene sulfide polymer; vinylidene chloride polymer; vinyl alcohol polymer; vinyl butyral polymer; acrylate polymer; polyoxymethylene polymer; epoxy polymer; and polymer where the above-mentioned polymers are mixed. The polymer film of the present invention is also able to be formed as a hardened layer of resin of ultraviolet hardening type or heat hardening type such as acrylate, urethane, acrylurethane, epoxy and silicone series. With regard to a material for the formation of the polymer film of the present invention, thermoplastic norbornene resin may be preferably used. Examples of the thermoplastic norbornene resin are Zeonex and Zeonoa manufactured by Nippon Zeon K. K. and Arton manufactured of JSR K. K.

With regard to a material for the formation of the polymer film of the present invention, cellulose polymer (hereinafter, it will be referred to as cellulose acylate) represented by triacetyl cellulose which has been used as a transparent protective film for polarizing plates may be preferably used. Hereinafter, cellulose acetate will be illustrated in detail.

Now, cellulose ester film which is preferably used in the present invention will be illustrated in detail. Glucose unit in a state of β-1,4 bond constituting cellulose have free hydroxyl groups at 2-, 3- and 6-positions. Cellulose ester is a polymer in which a part of or all of those hydroxyl groups is/are esterified with substituent(s) having 2 or more carbons. The substituent is preferred to be an acyl group. Degree of substitution means the rate of esterification of hydroxyl groups of cellulose for each of 2-, 3- and 6-positions (esterification of 100% is degree of substitution of 1).

Total degree of substitution or, in other words, DS2+DS3+DS6 is preferably 2.00 to 3.00, more preferably 2.20 to 2.90 and, particularly preferably, 2.55 to 2.85. DS6/(DS2+DS3+DS6) is preferably not less than 0.31 and, particularly preferably, not less than 0.315. DS2 is degree of substitution with acyl group for hydroxyl group at 2-position of glucose unit (hereinafter, it may be referred to as "degree of acyl substitution at 2-position"), DS3 is degree of substitution with acyl group for hydroxyl group at 3-position of glucose unit (hereinafter, it may be referred to as "degree of acyl substitution at 3-position") and DS6 is degree of substitution with acyl group for hydroxyl group at 6-position of glucose unit (hereinafter, it may be referred to as "degree of acyl substitution at 6-position").

The acyl group used for the cellulose ester of the present invention may be only one type or two or more types of acyl groups may be used as well. When two or more types of acyl groups are used, it is preferred that one of them is acetyl group. When the sum of degrees of substitution with acetyl group at hydroxyl groups of 2-, 3- and 6-positions is DSA while the sum of degrees of substitution with acyl group other than acetyl group at hydroxyl groups of 2-, 3- and 6-positions is DSB, the value of (DSA+DSB) is preferably 2.00 to 3.00, more preferably 2.20 to 2.90 and, particularly preferably, 2.55 to 2.85. DSB is preferably not more than 1.70 and, particularly preferably, not more than 1.0. Further, in DSB, substituent for hydroxyl group at 6-position is preferably not less than 28% thereof, more preferably not less than 30%, still more preferably not less than 31% and, particularly preferably, not less than 32%. In a cellulose acylate film, value of (DSA+DSB) at 6-position of the cellulose acylate is preferred not less than 0.75, more preferably not less than 0.80 and, particularly preferably, not less than 0.85. The cellulose acylate having such a substituting characteristic with acylate group has a good solubility for a broad range of solvents giving a solution where insoluble matter is small. It is also possible to prepare a solution having low viscosity and good filtering property. As a result, foreign substances are small in the cellulose ester film of the present invention and, especially when incorporated into liquid crystal display devices to give a black display, the so-called luminescent foreign substance which glitters caused by leakage of light is able to be made less than before.

There is no particular limitation for an acyl group having 3 or more carbons in the cellulose acylate used for the present invention and it may be either an aliphatic acyl group or an arylacyl group. Examples of the cellulose acylate used in the present invention are cellulose alkyl carbonyl ester, alkenyl carbonyl ester, aromatic carbonyl ester and aromatic alkyl carbonyl ester and each of them may be further substituted. Preferred examples of the acyl group are propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexanecarbonyl, oleoyl, benzoyl, naphthylcarbonyl and cinnamoyl groups. Among the above, propionyl group, butanoyl group, dodecanoyl group, octadecanoyl group, tert-butanoyl group, oleoyl group, benzoyl group, naphthylcarbonyl group and cinnamoyl group are more preferred and propionyl group and butanoyl group are particularly preferred.

<Method for the Synthesis of Cellulose Acylate>

Basic principles of the method for the synthesis of cellulose acylate are mentioned in pages 180 to 190 of "Mokuzai Kagaku" (=Wood Chemistry) by Migita, et al. (published by Kyoritsu Shuppan, 1968). A representative synthetic method is a liquid-phase acetylating method using carboxylic acid anhydride, acetic acid and a sulfuric acid catalyst.

A specific method for preparing the above cellulose acylate is that a cellulose material such as cotton wool linter or wood pulp is subjected to a pre-treatment with an appropriate amount of acetic acid and poured into a previously cooled mixed carboxylating solution to esterify whereupon a complete cellulose acylate (in which sum of degrees of acylation for 2-, 3- and 6-positions is nearly 3.00) is synthesized. The above-mentioned mixed carboxylating solution usually contains acetic acid as a solvent, carboxylic acid anhydride as an esterifying agent and sulfuric acid as a catalyst. It is usual that the carboxylic acid anhydride is used in a stoichiometrically excessive amount than the sum of cellulose reacting therewith and water existing in the system. After completion of the esterifying reaction, an aqueous solution of a neutralizing agent (such as carbonate, acetate or oxide of calcium, magnesium, iron, aluminum or zinc) for hydrolysis of the carboxylic anhydride and for neutralization of a part of the esterifying catalyst remaining in the system in excessive amounts. After that, the resulting complete cellulose is saponified and aged by keeping at 50 to 90° C. in the presence of a small amount of a catalyst for acetylating reaction (usually, it is sulfuric acid remaining there) so as to convert to a cellulose acylate having desired degree of acyl substitution and degree of polymerization. At the stage when the desired cellulose acylate is prepared, the catalysts remaining in the system are completely neutralized using the aforementioned neutralizing agent or, without neutralization, the cellulose acylate solution is poured into water or diluted sulfuric acid (or water or diluted sulfuric acid is poured into a cellulose acylate solution) so that the cellulose acylate is separated followed by subjecting to washing or stabilizing treatment whereupon the aforementioned specific cellulose acylate is able to be produced.

In the aforementioned cellulose acylate film, it is preferred that the polymer component constituting the film substantially comprises the above-mentioned specific cellulose acylate. The term "substantially" means not less than 55% by mass (preferably not less than 70% by mass or, still more preferably, not less than 80% by mass) of the polymer component.

It is preferred that the cellulose acylate is used in a form of particles. It is preferred that not less than 90% by mass of the particles used have particle size of 0.5 to 5 mm. It is also preferred that not less than 50% by mass of the particles used have particle size of 1 to 4 mm. It is preferred that the cellulose acylate particles have nearly spherical shape if at all possible.

Degree of polymerization in terms of a viscosity-average degree of polymerization of the cellulose acylate used in the present invention is preferably 200 to 700, more preferably 250 to 550, still more preferably 250 to 400 and, particularly preferably, 250 to 350. The average degree of polymerization is able to be measured by a limiting viscosity method by Uda et al. (Kazuo Uda and Hideo Saito, *Seni Gakkai Shi*, volume 18, number 1, pages 105 to 120, 1962). Further detailed description therefor is available in Japanese Patent Laid-Open No. 09/095,538.

When low-molecular components are removed, average molecular weight (degree of polymerization) becomes high although viscosity becomes low as compared with common cellulose acylate and, therefore, the aforementioned cellulose acylate wherefrom low-molecular components are removed is useful. A cellulose acylate having less low-molecular components is able to be prepared by removal of low-molecular components from cellulose acylate synthesized by a common method. Removal of low-molecular components is able to be conducted by washing of cellulose acylate with an appropriate organic solvent. In the manufacture of cellulose acylate containing little low-molecular components, it is preferred that amount of sulfuric acid in the acetylation is adjusted to an extent of 0.5 to 25 part(s) by mass to 100 parts by mass of cellulose acylate. When amount of a sulfuric acid catalyst is made within the above-mentioned range, it is possible to synthesize cellulose acylate which is preferred in view of molecular weight distribution (having uniform molecular weight distribution) as well. When used in the manufacture of cellulose acylate, its water content is preferably not more than 2% by mass, still more preferably not more than 1% by mass and, particularly preferably, not more than 0.7% by mass. Cellulose acylate usually contains water and the water content has been known to be 2.5 to 5% by mass. When water content of cellulose acylate is made as above in the present invention, it is necessary to dry and there is no particular limitation for a method thereof so far as the desired water content is achieved.

With regard to those cellulose acylates of the present invention, their material cotton and synthetic method are mentioned in detail in pages 7 to 12 of *Journal of Technical Disclosure* No. 2001-1745 (published on Mar. 15, 2001 by the JIII).

Each of the optical characteristics Re retardation value and Rth retardation value of the cellulose ester film of the present invention satisfies the following formulae (V) and (VI), respectively.

$$5 \text{ nm} \leq Re_{(590)} \leq 200 \text{ nm} \quad (V)$$

$$60 \text{ nm} \leq Rth_{(590)} \leq 400 \text{ nm} \quad (VI)$$

More preferably, they satisfy the following formulae (VII) and (VIII).

$$20 \text{ nm} \leq Re_{(590)} \leq 100 \text{ nm} \quad (VII)$$

$$70 \text{ nm} \leq Rth_{(590)} \leq 300 \text{ nm} \quad (VI)$$

In this specification, Re ($\lambda$) and Rth ($\lambda$) show retardation in the face and retardation in the direction of thickness, respectively, at the wavelength of $\lambda$. Re ($\lambda$) is measured by incidence of light of wavelength of $\lambda$ nm into the direction of normal line of the film in Kobra 21 ADH (manufactured by Oji Keisoku Kiki K. K.). Rth ($\lambda$) is calculated by Kobra 21 ADH on the basis of retardation values measured in three directions [i.e., the aforementioned Re ($\lambda$); a retardation value measured by incidence of light of wavelength of $\lambda$ nm in a direction inclined to an extent of +40° to the direction of normal line of the film where inclining axis (rotation axis) which is a retardation phase axis (being able to be judged by Kobra 21 ADH) in the face; and a retardation value measured by incidence of light of wavelength of $\lambda$ nm in a direction inclined to an extent of −40° to the direction of normal line of the film where inclining axis (rotation axis) which is a retardation phase axis in the face], presumed value for average refractive index and inputted film thickness value. With regard to the presumed value for average refractive index used hereinabove, value of "Polymer Handbook" (John Wiley & Sons, Inc.) and value of catalogs of various kinds of optical films may be used. In case the value of an average refractive index is unknown, it is able to be measured by Abbe's refractometer. Values of average refractive index for main optical films will be exemplified as follows. Thus, they are 1.48 for cellulose acetate; 1.52 for cycloolefin polymer; 1.59 for polycarbonate; 1.49 for polymethyl methacrylate; and 1.59 for polystyrene. When presumed values of refractive index as such and film thickness are inputted, Kobra 21 ADH calculates nx, ny and nz. From nx, ny and nz calculated as such, Nz=(nx−nz)/(nx−ny) is further calculated. Incidentally, those measurements were carried out under an atmosphere of 25° C. and 60% relative humidity unless otherwise mentioned.

Dispersion in Re values in total width is preferably ±5 nm and, more preferably, ±3 nm. Dispersion in Rth values is preferably ±10 nm and, more preferably, ±5 nm. Dispersions in Re values and Rth values in the longitudinal direction are also preferred to be within a range of dispersions in the transverse direction.

The cellulose ester film of the present invention is able to be prepared in such a manner that cellulose and, if necessary, an additive are dissolved in an organic solvent and the resulting solution is made into film.

<Additive>

Various kinds of additives corresponding to the use in each preparation step (such as plasticizer, ultraviolet preventer, deterioration preventer, retardation (optical anisotropy) adjusting agent, fine particles, peeling promoter and infrared absorber) may be added to the cellulose acylate solution concerning the present invention and they may be either solid or oil. Thus, there is no particular limitation for melting point and boiling point thereof. Examples are mixing of ultraviolet absorbing materials of not higher than 20° C. and not lower than 20° C. and mixing of plasticizers in the similar manner and they are mentioned, for example, in Japanese Patent Laid-Open No. 2001/151,901. An example of the peeling promoter is ethyl citrate. Infrared absorbers are mentioned, for example, in Japanese Patent Laid-Open No. 2001/194, 522. With regard to the addition thereof, although the additive may be added during any stage in the step for the preparation of a dope, it is also possible that a step for the preparation by addition of the additive is added to the final step for the preparation in the step for the preparation of a dope. There is no particular limitation for the adding amount of each material so far as the function is achieved. When a cellulose acylate film is formed in plural layers, type and adding amount of the additive in each layer may be different. Examples thereof are mentioned, for example, in Japanese Patent Laid-Open No. 2001/151,902 and they are the art which has been known already. It is preferred that, as a result of selection of type and adding amount of the additives, glass transition temperature Tg and elasticity (as measured by a tensile tester) of the cellulose acylate film are adjusted to from 80 to 180° C. and from 1500 to 3000 MPa, respectively.

In more detail, materials which are specifically mentioned in page 16 and thereafter of *Journal of Technical Disclosure* No. 2001/1745 (published by JIII on Mar. 15, 2001) may be used preferably.

<Retardation Expressing Agent>

It is preferred in the present invention to use a retardation expressing agent to express the preferred retardation value. Examples of the retardation expressing agent being able to be used in the present invention are those comprising rod-shape or discotic compound. As to the rod-shaped or discotic compound, a compound having at least two aromatic rings may be used.

Adding amount of the retardation expressing agent comprising a rod-shaped compound to 100 parts by mass of polymer components containing cellulose acylate is preferably 0.1 to 30 part(s) by mass and, more preferably, 0.5 to 20 part(s) by mass.

A discotic retardation expressing agent is added to 100 parts by mass of polymer components containing the aforementioned cellulose acylate within a range of preferably 0.05 to 20 part(s) by mass, more preferably 1.0 to 15 part(s) by mass and, still more preferably, 3.0 to 10 parts by mass.

A discotic compound is better than a rod-shaped compound in view of a property of expressing the Rth retardation and, therefore, it is preferably used especially when a big Rth retardation is necessary.

Two or more retardation expressing agents may be used together.

The aforementioned retardation agent comprising a rod-shaped or discotic compound is preferred that it has a maximum absorption within a wavelength region of 250 to 400 nm and an agent having substantially no absorption in visible area is preferred.

A discotic compound will be illustrated. With regard to a discotic compound, a compound having at least two aromatic rings may be used.

In this specification, "aromatic ring" includes aromatic hetero ring in addition to aromatic hydrocarbon ring.

An aromatic hydrocarbon ring is particularly preferred to be a six-membered ring (that is a benzene ring).

An aromatic hetero ring is usually an unsaturated hetero ring. The aromatic hetero ring is preferably five-membered ring, six-membered ring or seven-membered ring and, more preferably, five-membered ring or six-membered ring. Usually, an aromatic hetero ring has the highest numbers of double bonds. With regard to a hetero atom, the preferred ones are nitrogen atom, oxygen atom and sulfur atom and the particularly preferred one is nitrogen atom. Examples of the aromatic hetero ring include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

Preferred aromatic ring are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring and the particularly preferred one is 1,3,5-triazine ring. To be more specific, the compounds disclosed, for example, in Japanese Patent Laid-Open No. 2001/166,144 may be used as discotic compounds.

Numbers of aromatic ring in the above-mentioned discotic compound is preferably 2 to 20, more preferably 2 to 12, still more preferably 2 to 8 and, most preferably, 2 to 6.

The bonding relationship of the two aromatic rings may be classified into (a) the case where a fused ring is formed, (b) the case where they are bonded by a single bond and (c) the case where they are bonded via a connecting group (no spiro ring is formed because they are aromatic rings). The bonding relationship may be any of (a) to (c).

Examples of the fused ring of (a) (a fused ring of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiopene ring, indolidine ring, benzoxazole ring, benzothiazole ring, benzimidazole ring, benzotriazole ring, purine ring, indazole ring, cromene ring, quinoline ring, isoquinoline ring, quinolidine ring, quinazoline ring, cinnoline ring, quinoxaline ring, phthalazine ring, pteridine ring, carbazole ring, acridine ring, phenantrizine ring, xanthene ring, phenazine ring, phenothiazine ring, phenoxathiin ring and phenoxazine ring. Preferred ones are naphthalene ring, azulene ring, indole ring, benzoxazole ring, benzothiazole ring, benzimidazole ring, benzotriazole ring and quinoline ring.

A single bond of (b) is preferred to be a bond between carbon atoms of two aromatic rings. It is also possible that two aromatic rings are formed by two or more single bonds whereby aliphatic ring or non-aromatic hetero ring is formed between the two aromatic rings.

A connecting group of (c) is also preferred to bond to carbon atoms of the two aromatic rings. The connecting group is preferred to be an alkylene group, an alkenylene group, an alkynylene group, —CO—, —O—, —NH—, —S— or a combination thereof. Examples of the connecting group comprising a combination are shown below. Incidentally, the relationship concerning right and left in the following connecting groups may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the connecting group may be substituted.

Examples of the substituent include halogen atom (F, Cl, Br and I), hydroxyl group, carboxyl group, cyano group, amino group, nitro group, sulfo group, carbamoyl group, sulfamoyl group, ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group and a non-aromatic heterocyclic group.

Carbon atom number(s) of the alkyl group is/are preferred to be 1 to 8. An aliphatic alkyl group is preferred over a cyclic alkyl group and a straight-chain alkyl group is particularly preferred. The alkyl group may have further substituent (such as hydroxyl group, carboxyl group, an alkoxy group or an alkyl-substituted amino group). Examples of the alkyl group (including the substituted alkyl group) are methyl group, ethyl group, n-butyl group, n-hexyl group, 2-hydroxyethyl group, 4-carboxybutyl group, 2-methoxyethyl group and 2-diethylaminoethyl group.

Carbon atom numbers of the alkenyl group are preferred to be 2 to 8. A linear alkenyl group is preferred over a cyclic alkenyl group and a straight-chain alkenyl group is particularly preferred. The alkenyl group may have further substituent. Examples of the alkenyl group include vinyl group, allyl group and 1-hexenyl group.

Carbon atom numbers of the alkynyl group are preferred to be 2 to 8. A linear alkynyl group is preferred over a cyclic alkynyl group and a straight-chain alkynyl group is particularly preferred. The alkynyl group may have further substituent. Examples of the alkynyl group include ethynyl group, 1-butynyl group and 1-hexynyl group.

Carbon atom number(s) of the aliphatic acyl group is/are preferred to be 1 to 10. Examples of the aliphatic acyl group include acetyl group, propanoyl group and butanoyl group.

Carbon atom number(s) of the aliphatic acyloxy group is/are preferred to be 1 to 10. Examples of the aliphatic acyl group include acetoxy group.

Carbon atom number(s) of the alkoxy group is/are preferred to be 1 to 8. The alkoxy group may have further substituent (such as an alkoxy group). Examples of the alkoxy group (including a substituted alkoxy group) include methoxy group, ethoxy group, butoxy group and methoxyethoxy group.

Carbon atom numbers of the alkoxycarbonyl group are preferred to be 2 to 10. Examples of the alkoxycarbonyl group include methoxycarbonyl group and ethoxycarbonyl group.

Carbon atom numbers of the alkoxycarbonylamino group are preferred to be 2 to 10. Examples of the alkoxycarbonylamino group include methoxycarbonylamino group and ethoxycarbonylamino group.

Carbon atom number(s) of the alkylthio group is/are preferred to be 1 to 12. Examples of the alkylthio group include methylthio group, ethylthio group and octylthio group.

Carbon atom number(s) of the alkylsulfonyl group is/are preferred to be 1 to 8. Examples of the alkylsulfonyl group include methanesulfonyl group and ethanesulfonyl group.

Carbon atom number(s) of the aliphatic amido group is/are preferred to be 1 to 10. Examples of the aliphatic amido group include acetamido group.

Carbon atom number(s) of the aliphatic sulfonamido group is/are preferred to be 1 to 8. Examples of the aliphatic sulfonamido group include methanesulfonamide group, butanesulfonamide group and n-octanesulfonamido group.

Carbon atom number(s) of the aliphatic substituted amino group is/are preferred to be 1 to 10. Examples of the aliphatic substituted amino group include dimethylamino group, diethylamino group and 2-carboxyethylamino group.

Carbon atom numbers of the aliphatic substituted carbamoyl group are preferred to be 2 to 10. Examples of the aliphatic substituted carbamoyl group include methylcarbamoyl group and diethylcarbamoyl group.

Carbon atom number(s) of the aliphatic substituted sulfamoyl group is/are preferred to be 1 to 10. Examples of the aliphatic substituted sulfamoyl group include methylsulfamoyl group and diethylsulfamoyl group.

Carbon atom numbers of the aliphatic substituted ureido group are preferred to be 2 to 10. Examples of the aliphatic substituted ureido group include methylureido group.

Examples of the non-aromatic heterocyclic group include piperidino group and morpholino group.

Molecular weight of a retardation expressing agent comprising a discotic compound is preferred to be 300 to 800.

In the present invention, a rod-shaped compound having a linear molecular structure is also able to be preferably used in addition to the aforementioned discotic compound. A linear molecular structure means that, in the thermodynamically most stable structure, molecular structure of a rod-shaped compound is linear. The thermodynamically most stable structure is able to be determined by analysis of crystal structure analysis or by calculation of molecular orbit. For example, when calculation of molecular orbit is conducted using a molecular orbit calculation software (such as Win MOPAC 2000; manufactured by Fujitsu), it is possible to determine the structure of molecule by which heat of formation of a compound is the smallest. The expression that the molecular structure is linear means that, in the thermodynamically most stable structure determined by the calculation as above, the angle constituted by main chain in the molecular structure is 140° or more.

With regard to the rod-shaped compound, that having at least two aromatic rings is preferred and, with regard to the rod-shaped compound having at least two aromatic rings, the compound represented by the following formula (I) is preferred.

$$Ar^1\text{-}L^1\text{-}Ar^2 \qquad \text{Formula (I)}$$

In the formula (I), $Ar^1$ and $Ar^2$ each independently is an aromatic group.

In this specification, an aromatic group includes an aryl group (an aromatic hydrocarbon group), a substituted aryl group, an aromatic heterocyclic group and a substituted aromatic heterocyclic group.

Aryl group and substituted aryl group are preferred over aromatic heterocyclic group and substituted aromatic heterocyclic group. Hetero ring in the aromatic heterocyclic group is usually unsaturated. The aromatic hetero ring is preferably five-membered ring, six-membered ring or seven-membered ring and, more preferably, five-membered ring or six-membered ring. The aromatic hetero ring has usually largest numbers of double bonds. The hetero atom is preferably nitrogen atom, oxygen atom or sulfur atom and, more preferably, nitrogen atom or sulfur atom.

The aromatic ring of the aromatic group is preferably benzene ring, furan ring, thiophene ring, pyrrole ring, oxazole ring, thiazole ring, imidazole ring, imidazole ring, triazole ring, pyridine ring, pyrimidine ring and pyrazine ring and, particularly preferably, benzene ring.

Examples of the substituent for the substituted aryl group and substituted aromatic heterocyclic group are halogen atom (F, Cl, Br and I), hydroxyl group, carboxyl group, cyano group, amino group, an alkylamino group (such as methylamino group, ethylamino group, butylamino group and dimethylamino group), nitro group, sulfo group, carbamoyl group, an alkylcarbamoyl group (such as N-methylcarbamoyl group, N-ethylcarbamoyl group and N,N-dimethylcarbamoyl group), sulfamoyl group, an alkylsulfamoyl group (such as N-methylsulfamoyl group, N-ethylsulfamoyl group and N,N-dimethylsulfamoyl group), ureido group, an alkylureido group (such as N-methylureido group, N,N-dimethylureido group and N,N,N'-trimethylureido group), an alkyl group (such as methyl group, ethyl group, propyl group, butyl group, pentyl group, heptyl group, octyl group, isopropyl group, sec-butyl group, tert-amyl group, cyclohexyl group and cyclopentyl group), an alkenyl group (such as vinyl group, allyl group and hexenyl group), an alkynyl group (such as ethynyl group and butynyl group), an acyl group (such as formyl group, acetyl group, butyryl group, hexanoyl group and lauryl group), an acyloxy group (such as acetoxy group, butyryloxy group, hexanoyloxy group and lauryloxy group), an alkoxy group (such as methoxy group, ethoxy group, propoxy group, butoxy group, pentyloxy group, heptyloxy group and octyloxy group), an aryloxy group (such as phenoxy group), an alkoxycarbonyl group (such as methoxycarbonyl group, ethoxycarbonyl group, propoxycarbonyl group, butoxycarbonyl group, pentyoxycarbonyl group and heptyloxycarbonyl group), an aryloxycarbonyl group (such as phenoxycarbonyl group), an alkoxycarbonylamino group (such as butoxycarbonylamino group and hexyloxycarbonylamino group), an alkylthio group (such as methylthio group, ethylthio group, propylthio group, butylthio group, pentylthio group, heptylthio group and octylthio group), an arylthio group (such as phenylthio group), an alkylsulfonyl group (such as methylsulfonyl group, ethylsulfonyl group, propylsulfonyl group, butylsulfonyl group, pentylsulfonyl group, hetylsulfonyl group and octylsulfonyl group), an amido group (such as acetamido group, butylamido group, hexylamido group and laurylamido group) and a non-aromatic heterocyclic group (such as morpholyl group and pyrazinyl group).

With regard to a substituent for the substituted aryl group and the substituted aromatic heterocyclic group, preferred ones are halogen atom, cyano group, carboxyl group, hydroxyl group, amino group, alkyl-substituted amino group, an acyl group, an acyloxy group, amide group, an alkoxycarbonyl group, an alkoxy group, an alkylthio group and an alkyl group.

An alkyl moiety of the alkylamino group, alkoxycarbonyl group, alkoxy group and alkylthio group and an alkyl group may be further substituted. Examples of the substituent for the alkyl moiety and for the alkyl group include halogen atom, hydroxyl group, carboxyl group, cyano group, amino group, an alkylamino group, nitro group, sulfo group, carbamoyl group, an alkylcarbamoyl group, sulfamoyl group, an alkylsulfamoyl group, ureido group, an alkylureido group, an alkenyl group, an alkynyl group, an acyl group, an acyloxy group, an acylamino group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. With regard to the substituent for the alkyl moiety and for the alkyl group, preferred ones are halogen atom, hydroxyl group, amino group, an alkylamino group, an acyl group, an acyloxy group, an acylamino group, an alkoxycarbonyl group and an alkoxy group.

In the formula (II), $L^1$ is a divalent connecting group selected from the group consisting of an alkylene group, an alkenylene group, an alkynylene group, —O—, —CO— and a combination thereof.

The alkylene group may have a ring structure. The cyclic alkylene is preferably cyclohexylene group and, particularly preferably, 1,4-cyclohexylene group. With regard to a linear alkylene group, a straight-chain alkylene group is preferred over a branched alkylene group.

Carbon atom number(s) of the alkylene group is/are preferably 1 to 20, more preferably 1 to 15, still more preferably 1 to 10, far more preferably 3 to 8 and, most preferably, 1 to 6.

With regard to the alkenylene group and the alkynylene group, that having a linear structure is preferred over that having a cyclic structure and that having a straight chain structure is more preferred over that having a branched chain structure.

Carbon atom numbers of the alkenylene group and the alkynylene group are preferably 2 to 10, more preferably 2 to 8, still more preferably 2 to 6, far more preferably 2 to 4 and, most preferably, 2 (vinylene or ethynylene).

Carbon numbers of the arylene group are preferably 6 to 20, more preferably 6 to 16 and, still more preferably, 6 to 12.

In the molecular structure of the formula (I), angle formed by $Ar^1$ and $Ar^2$ via $L^1$ is preferred to be 140° or more.

With regard to a rod-shaped compound, the compound represented by the following formula (2) is more preferred.

$Ar^1$-$L^2$-X-$L^3$-$Ar^2$   Formula (2)

In the above formula (2), $Ar^1$ and $Ar^2$ each independently is an aromatic group. Definition and examples of the aromatic group are the same as those for $Ar^1$ and $Ar^2$ of the formula (1).

In the formula (2), $L^2$ and $L^3$ each independently is a divalent connecting group selected from the group consisting of an alkylene group, —O—, —CO— and a combination thereof.

With regard to the alkylene group, that having a linear structure is preferred over that having a ring structure and that having a straight chain structure is preferred over that having a branched chain structure.

Carbon atom number(s) of the alkylene group is/are preferably 1 to 10, more preferably 1 to 8, still more preferably 1 to 6, far more preferably 1 to 4 and, most preferably, 1 or 2 (methylene or ethylene).

$L^2$ and $L^3$ are particularly preferably —O—CO— or —CO—O—.

In the formula (2), X is 1,4-cyclohexylene, vinylene or ethynylene.

Specific examples of the compound represented by the formula (1) or (2) will be shown as hereunder.

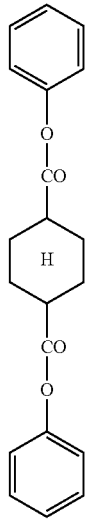

(1)

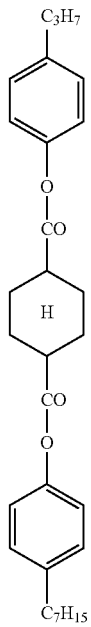

(2)

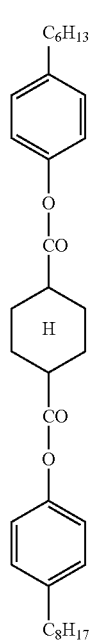
(3)
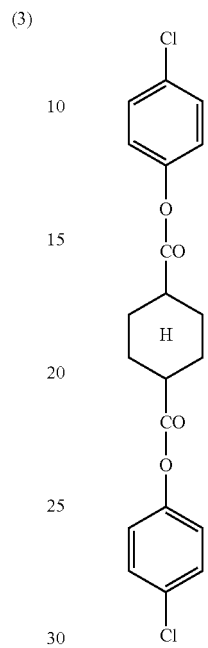
(5)
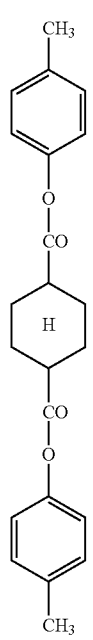
(4)
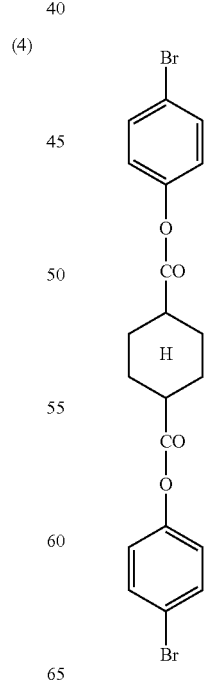
(6)

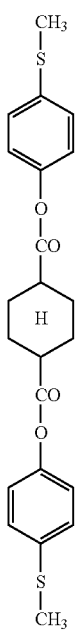
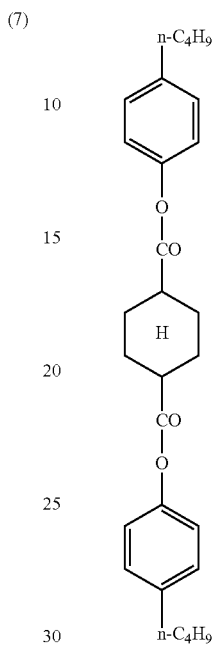
(7)
(8)
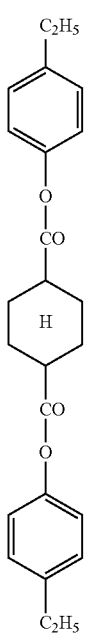
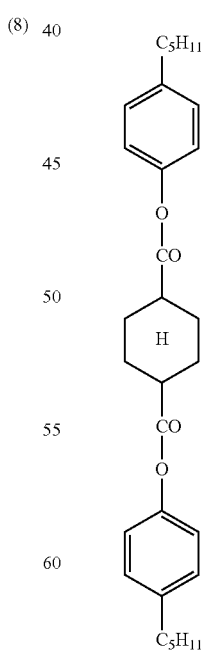
(9)
(10)

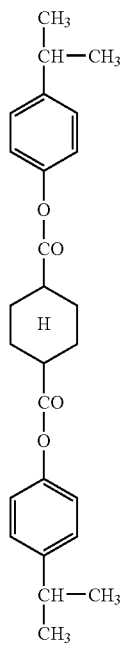
(11)
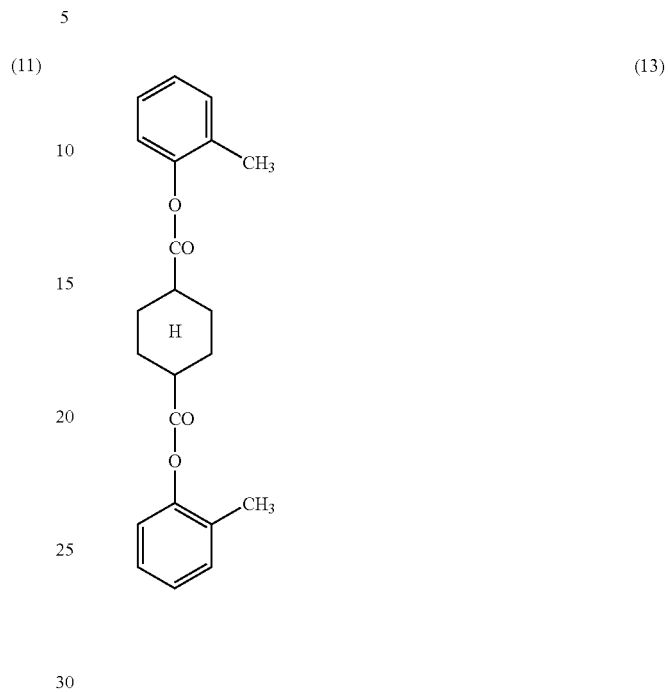
(12)
(13)
(14)
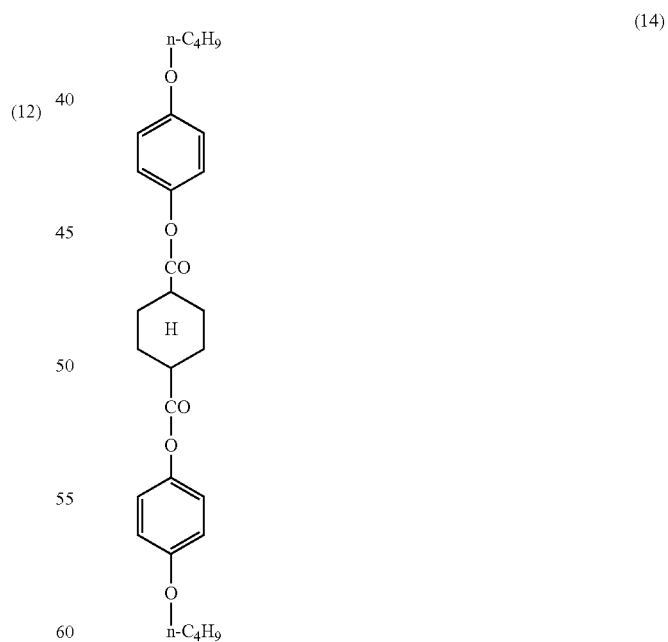

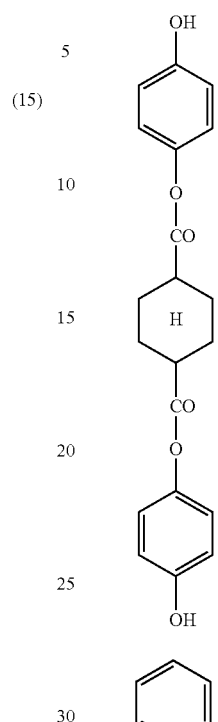
(15)
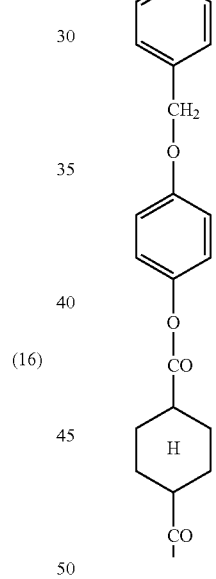
(16)
(17)
(18)
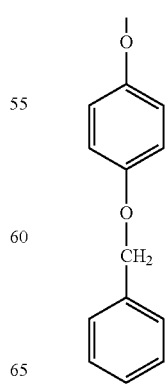

-continued
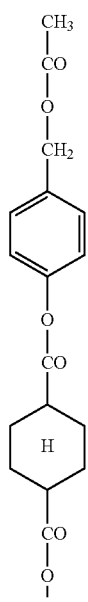
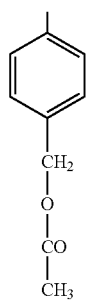
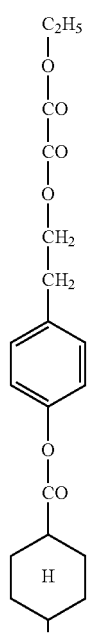
(19)
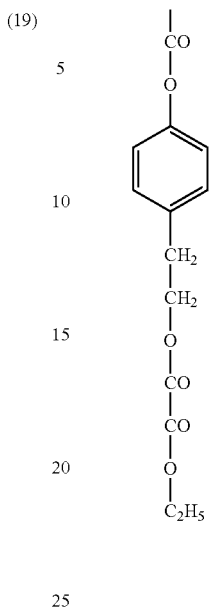
(20)
(21)

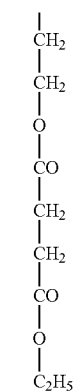
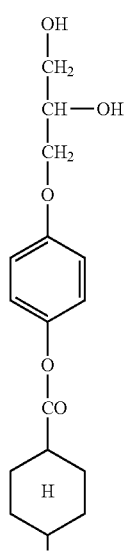
(22)
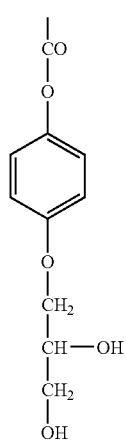
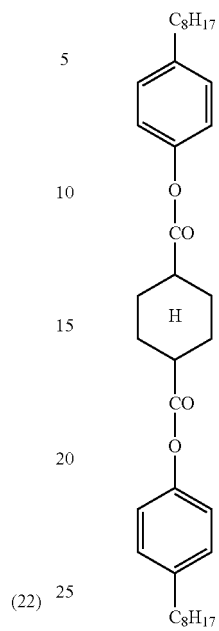
(23)
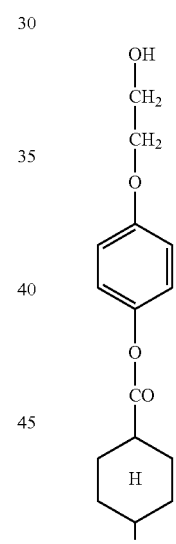
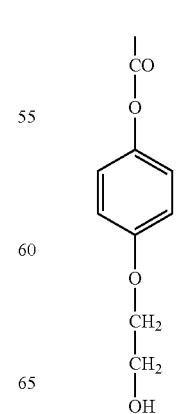
(24)

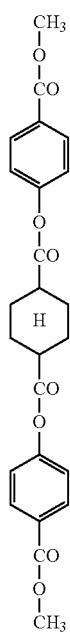
(25)
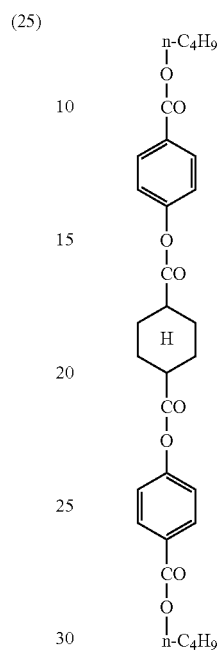
(27)
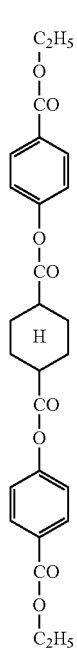
(26)
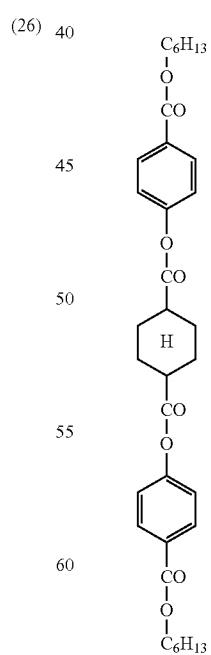
(28)

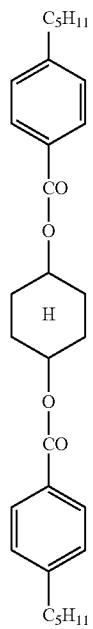 (29)
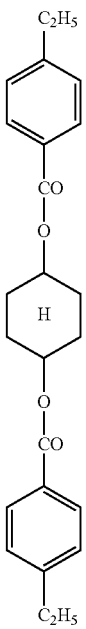 (31)
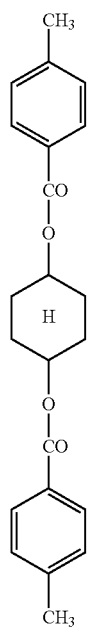 (30)
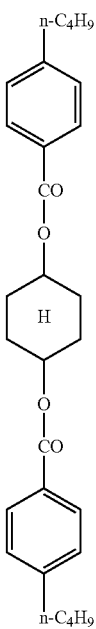 (32)

-continued
(33) 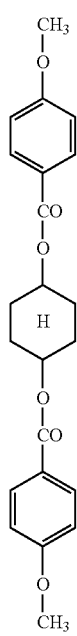
(34) 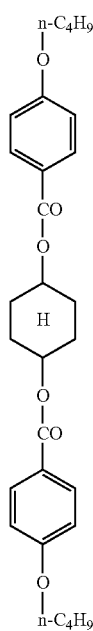
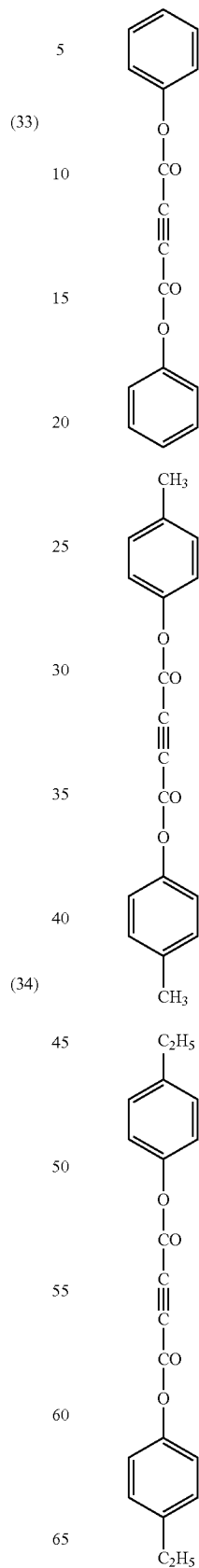
(35)
(36)
(37)

(38)
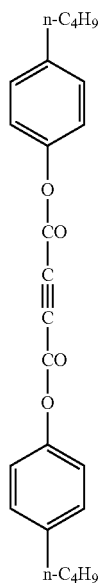
(39)
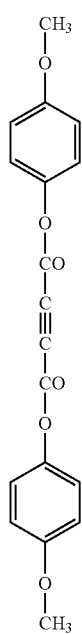
(40)
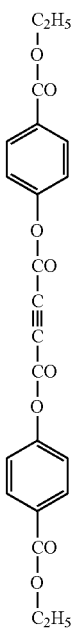
(41)
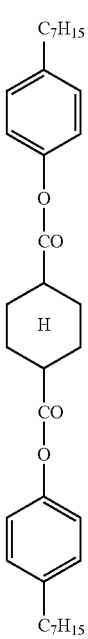

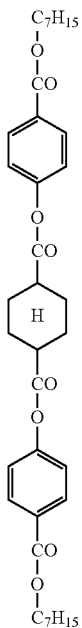
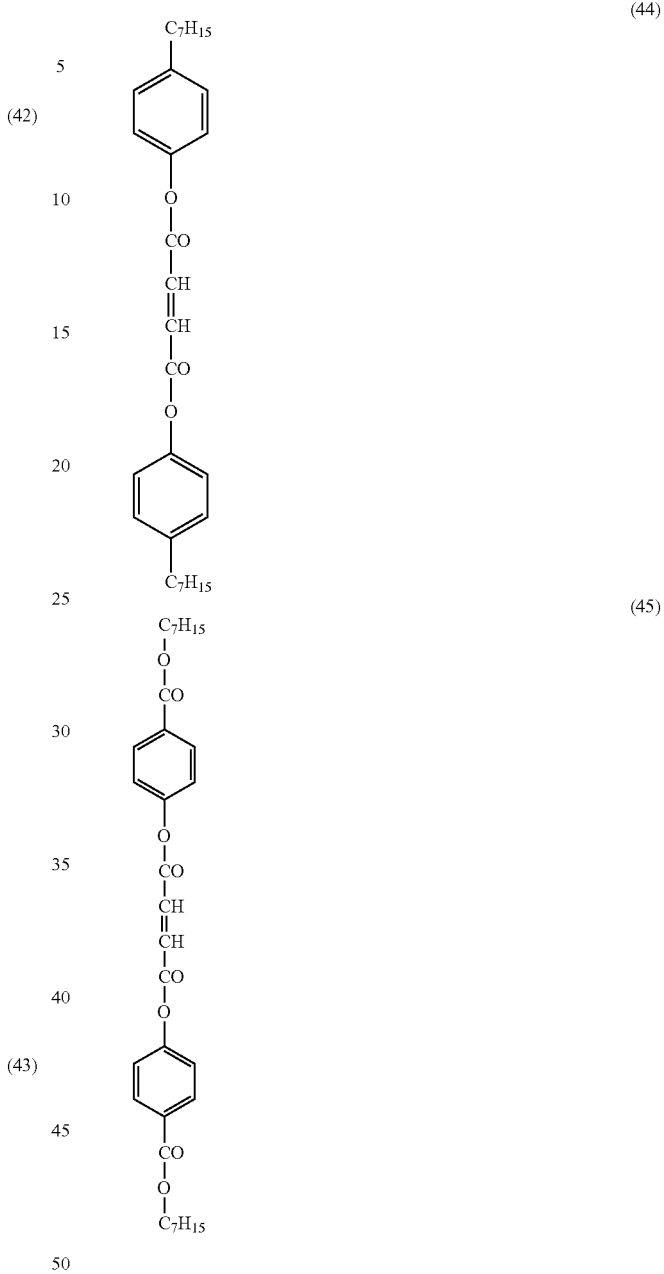

The specific examples (1) to (34), (41) and (42) have two asymmetric carbon atoms at 1- and 4-positions of a cyclohexane ring. However, since the specific examples (1), (4) to (34), (41) and (42) have a molecular structure of a symmetric meso type only, they have no optical isomer (optically active one) but there are only geometric isomers (trans and cis types). Trans type (1-trans) and cis type (1-cis) of the specific example (1) will be shown below.

(1-trans)

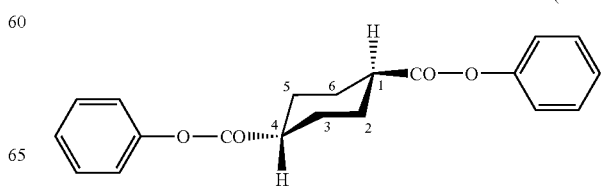

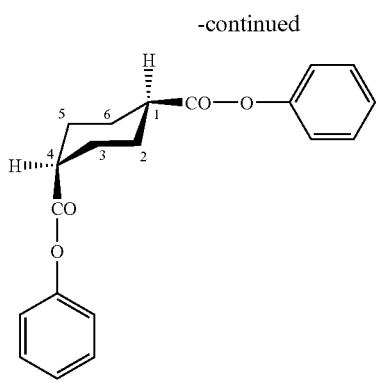
(1-cis)

As mentioned already, a rod-shaped compound is preferred to have a linear molecular structure. Therefore, trans type is preferred over cis type.

The specific examples (2) and (3) have optical isomers in addition to geometrical isomers (four isomers in total). Similarly, trans type is preferred over cis type for the geometrical isomers. With regard to optical isomers, there is no particular difference between them and any of D-, L- and racemic substances may be used.

In the specific examples (43) to (45), there are trans type and cis type in the central vinylene bond. Due to the same reason as mentioned above, trans type is preferred over cis type.

Other preferred compounds are shown below.

(46)
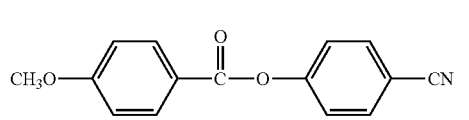

(47)
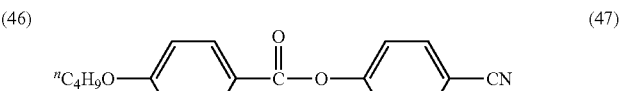

(48)
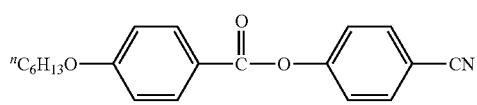

(49)
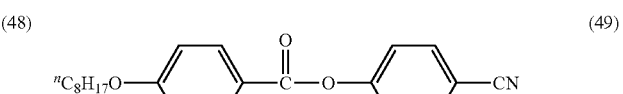

(50)
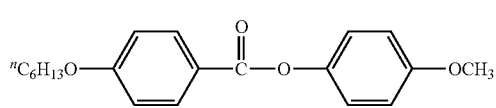

(51)
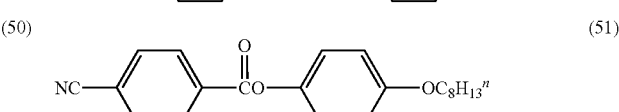

(52)
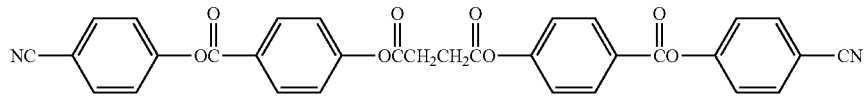

(53)
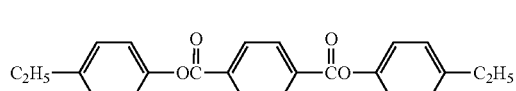

(54)
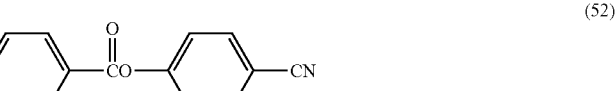

(55)
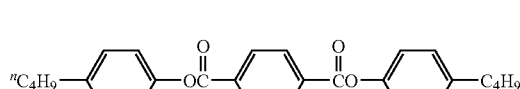

(56)
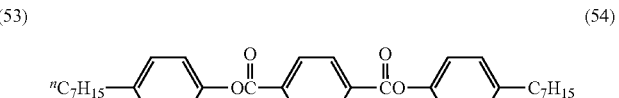

(57)
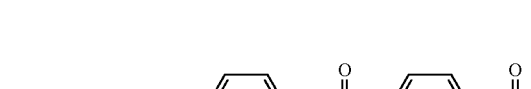

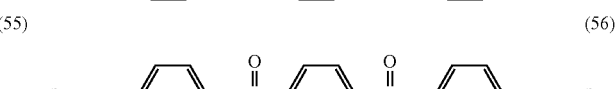

(58)
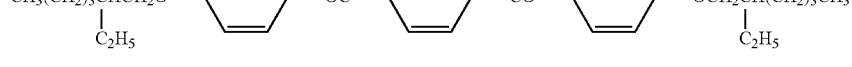

(59)
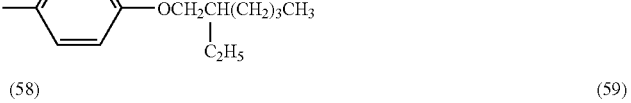

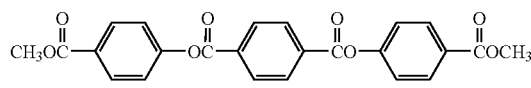

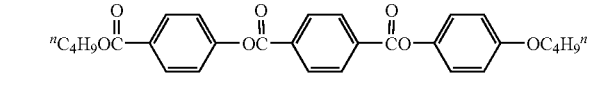

(60)
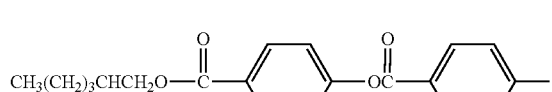

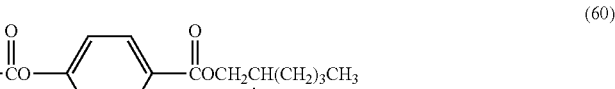

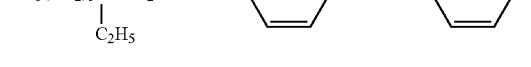

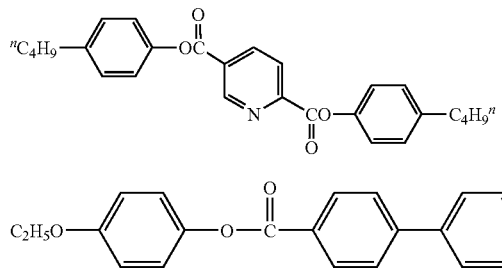
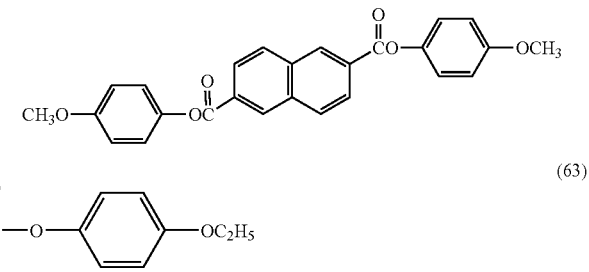

Two or more rod-shaped compounds where maximum absorption wavelength (λ max) in an ultraviolet absorption spectrum of a solution is shorter than 250 nm may be used jointly.

The rod-shaped compound is able to be synthesized by the methods mentioned in the documents. Examples of the documents are *Mol. Cryst. Liq. Cryst.*, vol. 53, page 229 (1979); ibid., vol. 89, page 93 (1982); ibid., vol. 145, page 111 (1987); ibid., vol. 170, page 43 (1989); *J. Am. Chem. Soc.*, vol. 113, age 1349 (1991); ibid., vol. 118, page 5346 (1996); ibid., vol. 92, page 1582 (1970); *J. Org. Chem.*, vol. 40, page 420 (1975); and *Tetrahedron*, vol. 48, no. 16, page 3437 (1992).

<Plasticizer>

A plasticizer is preferred to be a phosphate or a carboxylate. The plasticizer is more preferred to be selected from triphenyl phosphate (TPP), tricresyl phosphate (TCP), cresyl diphenyl phosphate, octyl diphenyl phosphate, diphenyl biphenyl phosphate, trioctyl phosphate, tributyl phosphate, dimethyl phthalate (DMP), diethyl phthalate (DEP), dibutyl phosphate (DBP), dioctyl phosphate (DOP), diphenyl phthalate (DPP), diethyl hexyl phthalate (DEHP), triethyl O-acetylcitrate (OACTE), tributyl O-acetylcitrate (OACTB), acetyl triethyl citrate, acetyl tributyl citrate, butyl oleate, methyl acetyl ricinolate, dibutyl sebacate, triacetin, tributyrin, butyl phthalyl glycolate, ethyl phthalyl ethyl glycolate, methyl phthalyl ethyl glycolate and butyl phthalyl butyl glycolate. It is also preferred that the plasticizer is (di)pentaerythritol esters, glycerol esters and diglycerol esters.

<Ultraviolet Absorber>

With regard to an ultraviolet absorber, any type may be selected depending upon the object and absorbers of a salicylate type, a benzophenone type, a benzotriazole type, a benzoate type, a cyanoacrylate type, a nickel complex salt type, etc. may be used. Preferred ones are a benzophenone type, a benzotriazole type and a salicylate type. Examples of the ultraviolet absorber of a benzophenone type are 2,4-dihydroxybenzophenone, 2-hydroxy-4-acetoxybenzophenone, 2-hydroxy-4-methoxybenzophenone, 2,2'-dihydroxy-4-methoxybenzophenone, 2,2'-dihydroxy-4,4'-methoxybenzophenone, 2-hydroxy-4-n-octoxybenzophenone, 2-hydroxy-4-dodecyloxybenzophenone and 2-hydroxy-4-(2-hydroxy-3-methacryloxy)propoxybenzophenone. Examples of the ultraviolet absorber of a benzotriazole type are 2-(2'-hydroxy-3'-tert-butyl-5'-methylphenyl)-5-chloro-benzotriazole, 2-(2'-hydroxy-5'-tert-butylphenyl)-benzotriazole, 2-(2'-hydroxy-3',5'-di-tert-butylphenyl)-5-chlorobenzotriazole and 2-(2'-hydroxy-5'-tert-octylphenyl)-benzotriazole. Examples of the ultraviolet absorber of a salicylate type are phenyl salicylate, n-octylphenyl salicylate and p-tert-butylphenyl salicylate. Among those exemplified ultraviolet absorbers, particularly preferred ones are 2-hydroxy-4-methoxybenzophenone, 2,2'-dihydroxy-4,4'-methoxybenzophenone, 2-(2'-hydroxy-3'-tert-butyl-5'-methylphenyl)-5-chlorobenzotriazole, 2-(2'-hydroxy-5'-tert-butylphenyl) benzotriazole, 2-(2'-hydroxy-3',5'-di-tert-amylphenyl) benzotriazole and 2-(2'-hydroxy-3',5'-di-tert-butylphenyl)-5-chlorobenzotriazole.

It is preferred in the ultraviolet absorber that plural absorbers having different absorbing wavelengths are compounded and used since that gives a high cutoff effect within a broad wavelength range. In the case of ultraviolet absorber for liquid crystals, it is preferred in view of prevention of deterioration of liquid crystals to use the absorber having an excellent absorbing ability for ultraviolet ray of wavelength of 370 nm or shorter and, in view of displaying property of liquid crystals, to use the absorber having little absorption of visible light of wavelength of 400 nm or longer. Particularly preferred ultraviolet absorbers are the aforementioned compounds of benzotriazole, benzophenone and salicylate types. Compounds of a benzotriazole type are particularly preferred because of their little coloration which is unnecessary to cellulose acylate.

With regard to ultraviolet absorbers, it is also possible to use the compounds mentioned in Japanese Patent Laid-Open Nos. 60/235,852, 03/199,201, 05/1,907,073, 05/194,789, 05/271,471, 06/107,854, 06/118,233, 06/148,430, 07/011, 056, 07/011,055, 07/011,056, 08/029,619, 08/239,509 and 2000/204,183.

Adding amount of the ultraviolet absorber to cellulose phthalate is preferably 0.001 to 5% by mass and, more preferably, 0.01 to 1% by mass. In view of the fact the effect by the addition is fully achieved, not less than 0.001% by mass is preferred and, in view of the fact that bleeding out of the ultraviolet absorber onto the surface of film is able to be suppressed, not more than 5% by mass is preferred.

The ultraviolet absorber may be added together with dissolving of cellulose acylate or added to a dope which was already dissolved. The mode where an ultraviolet absorber solution is added immediately before the casting using a static mixer or the like is particularly preferred since spectroscopic absorption characteristic is able to be easily adjusted.

<Deterioration Preventer>

The aforementioned deterioration preventer is able to prevent deterioration and degradation of cellulose triacetate. Examples of the deterioration preventer are compounds such as butylamine, hindered amine compounds (Japanese Patent Laid-Open No. 08/325,537), guanidine compounds (Japanese Patent Laid-Open No. 05/271,471), UV absorbers of a benzotriazole type (Japanese Patent Laid-Open No. 06/235, 819) and UV absorbers of a benzophenone type (Japanese Patent Laid-Open No. 06/118,233).

<Peeling Promoter>

An example of a peeling promoter is ethyl citrate. Further, an infrared absorber is mentioned, for example, in Japanese Patent Laid-Open No. 2001/194,522.

With regard to the stage when the additive as such is added, although the additive may be added at any time in a step for the preparation of a dope, it is also possible to conduct in such a manner that a step where the additive is added to prepare is further added to the final preparing step for the dope preparation. Adding amount of each material is not particularly limited so far as the function is able to be achieved. When cellulose acylate film is in multiple layers, type and adding amount of the additive in each layer may be different. As mentioned in Japanese Patent Laid-Open No. 2001/151,902, they are the art which has been known already. It is preferred that, by selecting type and adding amount of the additive, glass transition point Tg measured by a dynamic visco-elasticity measuring meter (Vibron DVA-225 (IT Keisoku Seigyo K. K.)) and elasticity measured by a tensile tester (Strograph R2 (Tokyo Seiki)) of the cellulose acetate film are made 70 to 150° C. and 1,500 to 4,000 MPa, respectively. More preferably, glass transition point Tg is 80 to 135° C. and elasticity is 1,500 to 3,000 MPa. Thus, in the cellulose ester film of the present invention, it is preferred that glass transition point Tg and elasticity are made into the above-mentioned ranges.

With regard to the additives, it is also possible to appropriately use the substances mentioned in detail in page 16 and thereafter of *Journal of Technical Disclosure*, No. 2001/1745 (published by JIII on Mar. 15, 2001).

<Fine Particles of Matte Agent>

It is preferred to add fine particles as a matte agent to the cellulose ester film of the present invention. Examples of the fine particles used in the present invention are silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium silicate. With regard to the fine particle, that containing silicon is preferred due to its low turbidity and silicon dioxide is particularly preferred. With regard to the fine particles of silicon dioxide, those having primary average particle size of not more than 20 nm and apparent specific gravity of not more than 70 g/liter are preferred. Fine particles where average particle size of the primary particles is as small as 5 to 16 nm are preferred because they are able to lower the haze of the film. The apparent specific gravity is preferably not less than 90 to 200 g/liter and, more preferably, not less than 100 to 200 g/liter. It is preferred that the apparent specific gravity is bigger because preparation of a dispersion of a high concentration is possible and haze and aggregated product become better.

Amount of the above-mentioned fine particles of silicon dioxide to 100 parts by mass of polymer components including cellulose acylate is preferably 0.01 to 0.3 part by mass.

Those fine particles usually form secondary particles where average particle size is 0.1 to 3.0 μm and those fine particles are present as aggregates of primary particles forming unevenness of 0.1 to 3.0 mμ on the film surface. The secondary average particle size is preferably 0.2 μm to 1.5 mμ, more preferably 0.4 μm to 1.2 μm and, most preferably, 0.6 μm to 1.1 μm. When it is larger than 1.5 μm, haze becomes strong while, when it is smaller than 0.2 μm, an effect for prevention of squeaking becomes poor.

With regard to primary and secondary particle sizes, particles in the film are observed under a scanning electron microscope and diameter of a circle externally touching the particle is defined as the particle size. Further, 200 particles are observed at different places and the mean value thereof is adopted as an average particle size.

With regard to the fine particles of silicon dioxide, commercially available products such as Aerosil R972, R972V, R974, R812, 200, 200V, 300, R202, OX50 and TT600 (manufactured by Nippon Aerosil K. K.) may be used. Fine particles of zirconium oxide are commercially available, for example, under the trade names of Aerosil R976 and R811 (manufactured by Nippon Aerosil K. K.) and they may be used.

Among the above, Aerosil 200V and Aerosil R972V are fine particles of silicon dioxide where primary average particle size is 20 nm or smaller and apparent specific gravity is 70 g/liter or bigger and have a big effect of lowering the abrasion coefficient together with keeping the turbidity of optical film low whereby they are particularly preferred.

In order to prepare a cellulose acylate film having particles where the secondary average particle size is small according to the present invention, there will be several means for the preparation of a dispersion of fine particles. For example, there is a method where a fine particle dispersion in which solvent and fine particles are stirred and mixed is previously prepared and the fine particle dispersion is added to a separately prepared small amount of cellulose acylate solution and dissolved by stirring and then it is mixed with a main cellulose acylate dope solution. In this method, dispersing property of fine particles of silicon dioxide is good and the silicon dioxide fine particles are hardly re-aggregated and, in view of such points, it is a preferred preparing method. Besides that, there is a method where small amount of cellulose acylate is added to a solvent and dissolved therein with stirring, fine particles are added thereto followed by dispersing with a dispersing device and the resulting fine particle-added solution is well mixed with a dope liquid using an in-line mixer. Although the present invention is not limited thereto, concentration of silicon dioxide upon mixing of fine particles of silicon dioxide with a solvent or the like followed by dispersing is preferably 5 to 30% by mass, more preferably 10 to 25% by mass and, most preferably, 15 to 20% by mass. The higher the dispersed concentration, the lower the turbidity of the liquid to the added amount and, as a result, haze and aggregates are better and that is preferred. Adding amount of the matte agent to a dope solution of cellulose acylate is preferably 0.01 to 1.0 $g/m^2$, more preferably 0.03 to 0.3 $g/m^2$ and, most preferably, 0.08 to 0.16 $g/m^2$.

With regard to a lower alcohol used as the solvent, examples of the preferred one are methyl alcohol, ethyl alcohol, propyl alcohol, isopropyl alcohol and butyl alcohol. Although there is no particular limitation for a solvent which is other than the lower alcohol, it is preferred to use a solvent which is used for the formation of film of cellulose acylate.

Now, the aforementioned organic solvent in which the cellulose ester of the present invention is dissolved will be illustrated.

In the present invention, any of a chlorine-type solvent where a chlorine-type organic solvent is a main solvent and a non-chlorine-type solvent where no chlorine-type organic solvent is contained may be used as an organic solvent.

<Chlorine-Type Solvent>

In preparing a solution of cellulose ester according to the present invention, a chlorine-type organic solvent is preferably used as a main solvent. There is no particular limitation of the type of the chlorine-type organic solvent in the present invention provided that the object is able to be achieved within such an extent that cellulose acylate is able to be dissolved, casted and made into film. The chlorine-type organic solvent is preferably dichloromethane or chloroform. Dichloromethane is particularly preferred. There is also no problem in mixing with an organic solvent which is other than the chlorine-type organic solvent. In that case, it is necessary that at least 50% by mass of dichloromethane is used in the total amount of the organic solvents. Other organic solvent which is used together with the chlorine-type organic solvent in the present invention will be mentioned below. Thus, with regard to other preferred organic solvent, a solvent which is selected from $C_{3-12}$ ester, ketone, ether, alcohol, hydrocarbon, etc. is preferred. Such ester, ketone, ether and alcohol may have a cyclic structure. A compound having two or more of any functional group of ester, ketone and ether (i.e., —O—, —CO— and —COO—) may also be used as a solvent and other functional group such as an alcoholic hydroxyl group may have at the same time. In the case of a solvent having two or more functional groups, it is acceptable provided that the carbon atom numbers thereof are within the stipulated range of a compound having any functional group. Examples of an ester having 3 to 12 carbon atoms are ethyl formate, propyl formate, pentyl formate, methyl acetate, ethyl acetate and pentyl acetate. Examples of a ketone having 3 to 12 carbon atoms are acetone, methyl ethyl ketone, diethyl ketone, diisobutyl ketone, cyclopentanone, cyclohexanone and methylcyclohexanone. Examples of an ether having 3 to 12 carbon atoms are diisopropyl ether, dimethoxymethane, dimethoxyethane, 1,4-dioxane, 1,3-dioxolane, tetrahydrofuran, anisole and phenetole. Examples of an organic solvent having two or more kinds of functional groups are 2-ethoxyethyl acetate, 2-methoxyethanol and 2-butoxyethanol.

With regard to an alcohol which is used together with a chlorine-type organic solvent, it may be preferably either straight-chain, branched or cyclic and, among them, a saturated aliphatic hydrocarbon is preferred. Carbon numbers contained in the alcohol are preferably 6 or smaller. Hydroxyl group of the alcohol may be any of primary to tertiary. Examples of the alcohol are methanol, ethanol, 1-propanol, 2-propanol, 1-butanol, 2-butanol, tert-butanol, 1-pentanol, 2-methyl-2-butanol and cyclohexanol. With regard to the alcohol, it is also possible to use a fluorine-type alcohol. Its examples are 2-fluoroethanol, 2,2,2-trifluoroethanol and 2,2,3,3-tetrafluoro-1-propanol. The hydrocarbon may be either straight-chain, branched or cyclic. Among them, it is preferred to use methanol, ethanol, propanol or butanol. The alcohol contained in the organic solvent is preferably 0.1% by mass to 40% by mass, more preferably 10% by mass to 30% by mass and, most preferably, 20% by mass to 30% by mass.

Any of aromatic hydrocarbon and aliphatic hydrocarbon may be used. The aliphatic hydrocarbon may be either saturated or unsaturated. Examples of the hydrocarbon include cyclohexane, hexane, benzene, toluene and xylene.

With regard to a combination of the chlorine-type hydrocarbon with other organic solvent, the following compositions may be listed although they are non-limitative, dichloromethane/methanol (87/13, parts by mass)
dichloromethane/methanol (75/25, parts by mass)
dichloromethane/ethanol (90/10, parts by mass)
dichloromethane/ethanol (80/20, parts by mass)
dichloromethane/propanol (90/10, parts by mass)
dichloromethane/propanol (85/15, parts by mass)
dichloromethane/butanol (95/5, parts by mass)
dichloromethane/butanol (80/20, parts by mass)
dichloromethane/methanol/ethanol/propanol (80/10/5/5, parts by mass)
dichloromethane/methanol/propanol (80/10/10, parts by mass)
dichloromethane/methanol/butanol (80/15/5, parts by mass)
dichloromethane/methanol/ethanol (80/10/10, parts by mass)
dichloromethane/ethanol/butanol (85/10/5, parts by mass)
dichloromethane/methyl ethyl ketone/methanol/ethanol (80/10/5/5, parts by mass)
dichloromethane/acetone/methyl ethyl ketone/isopropanol (75/10/10/5/7, parts by mass)
dichloromethane/cyclopetanone/methanol/isopropanol (80/10/5/8, parts by mass)
dichloromethane/methyl acetate/methanol/hexane (70/20/5/5, parts by mass)
dichloromethane/cyclohexanone/methanol/hexane (70/20/5/5, parts by mass)
dichloromethane/methyl ethyl ketone/acetone/methanol/ethanol (50/20/20/5/5, parts by mass)
dichloromethane/1,3-dioxane/acetone/methanol/ethanol (70/20/5/5, parts by mass)
dichloromethane/dioxane/acetone/methanol/ethanol (60/20/10/5/5, parts by mass)
dichloromethane/acetone/cyclopentanone/ethanol/isobutanol/cyclohexane (65/10/10/5/5/5, parts by mass)
dichloromethane/methyl ethyl ketone/acetone/methanol/ethanol (70/10/10/5/5, parts by mass)
dichloromethane/acetone/ethyl acetate/ethanol/butanol/hexane (65/10/10/5/5/5, parts by mass)
dichloromethane/methyl acetoacetate/methanol/ethanol (65/20/10/5, parts by mass)
dichloromethane/cyclopentanone/ethanol/butanol (65/20/10/5, parts by mass)

<Non-Chlorine Type Solvent>

Now, non-chlorine-type organic solvent which is preferably used for the preparation of cellulose ester of the present invention will be illustrated. There is no particular limitation for the non-chlorine-type organic solvent in the present invention so far as an object is able to be achieved within such an extent that cellulose acylate is dissolved therein and is able to be casted and made into film. With regard to the non-chlorine-type organic solvent, a solvent selected from $C_{3-12}$ ester, ketone and ether is preferred. The ester, ketone and ether may have a cyclic structure. Compound having 2 or more functional groups of ketone and ether (i.e., —O—, —CO— and —COO—) may also be used as a main solvent and may have other functional group such as an alcoholic hydroxyl group. In the case of a main solvent having two or more kinds of functional groups, their carbon numbers may be within a stipulated range of compounds having any functional group. Examples of an ester having 3 to 12 carbon atoms are ethyl formate, propyl formate, pentyl formate, methyl acetate, ethyl acetate and pentyl acetate. Examples of a ketone having 3 to 12 carbon atoms are acetone, methyl ethyl ketone, diethyl ketone, diisobutyl ketone, cyclopentanone, cyclohexanone and methylcyclohexanone. Examples of an ether having 3 to 12 carbon atoms are diisopropyl ether, dimethoxymethane, dimethoxyethane, 1,4-dioxane, 1,3-dioxorane, tetrahydrofuran, anisole and phenetole. Examples of an organic solvent having two or more kinds of functional groups are 2-ethoxyethyl acetate, 2-methoxyethanol and 2-butoxyethanol.

The non-chlorine-type organic solvent used for the above-mentioned acylates is selected from the aforementioned various viewpoints and, preferably, it is as follows. Thus, with regard to a non-chlorine type solvent, a mixed solvent where the aforementioned non-chlorine-type organic solvent is a main solvent is preferred and a mixed solvent comprising three different types of solvents wherein the first solvent is at least one member selected from methyl acetate, ethyl acetate, methyl formate, ethyl formate, acetone, dioxolane and dioxane or a mixed liquid thereof, the second solvent is selected from a $C_{4-7}$ ketone or acetone and the third solvent is selected from a $C_{1-10}$ alcohol or hydrocarbon or, preferably, selected from a $C_{1-8}$ alcohol. When the first solvent is a mixed solution of two or more kinds of solvents, the second solvent may not be necessary. The first solvent is more preferably methyl acetate, acetone, methyl formate, ethyl formate or a mixture thereof while the second solvent is more preferably methyl ethyl ketone, cyclopentanone, cyclohexanone, methyl acetoacetate or a mixed solvent thereof.

An alcohol which is the third solvent may be in straight-chain, branched or cyclic and is particularly preferred to be a saturated aliphatic hydrocarbon. Hydroxyl group of the alcohol may be any of primary to tertiary ones. Examples of the alcohol include methanol, ethanol, 1-propanol, 2-propanol, 1-butanol, 2-butanol, tert-butanol, 1-pentanol, 2-methyl-2-butanol and cyclohexanol. With regard to the alcohol, that of a fluorine type may be used as well. Examples thereof are 2-fluoroethanol, 2,2,2-trifluoroethanol and 2,2,3,3-tetrafluoro-1-propanol. The hydrocarbon may be in straight-chain, branched or cyclic. Any of an aromatic hydrocarbon and an aliphatic hydrocarbon may be used. The aliphatic hydrocarbon may be saturated or unsaturated. Examples of the hydrocarbon include cyclohexane, hexane, benzene, toluene and xylene. The alcohol and hydrocarbon as such which are the third solvent may be used either solely or jointly as a mixture of two or more kinds and are not particularly limited. Examples of preferred specific compound as the third solvent are methanol, ethanol, 1-propanol, 2-propanol, 1-butanol, 2-butanol and cyclohexanol as an alcohol and cyclohexane and hexane and examples of the particularly preferred one are methanol, ethanol, 1-propanol, 2-propanol and 1-butanol.

With regard to the mixing rate of the mixed solvent of the above-mentioned three kinds of solvents, it is preferred that, in the total amount of the mixed solvent, the first solvent is contained in 20 to 95% by mass, the second solvent is contained in 2 to 60% by mass and the third solvent is contained in 2 to 30% by mass and it is more preferred that the first solvent is contained in 30 to 90% by mass, the second solvent is contained in 3 to 50% by mass and the third solvent which is an alcohol is contained in 3 to 25% by mass. It is particularly preferred that the first solvent is contained in 30 to 90% by mass, the second solvent is contained in 3 to 30% by mass and the third solvent is an alcohol and is contained in 3 to 15% by mass. The non-chlorine-type organic solvent used in the present invention as mentioned above are mentioned in detail in pages 12 to 16 of *Journal of Technical Disclosure*, No. 2001/1745 (published by JIII on Mar. 15, 2001). Preferred combinations of non-chlorine-type organic solvents according to the present invention are as follows although they are non-limitative.

methyl acetate/acetone/methanol/ethanol/butanol (75/10/5/5/5 in parts by mass)
methyl acetate/acetone/methanol/ethanol/propanol (75/10/5/5/5 in parts by mass)
methyl acetate/acetone/methanol/butanol/cyclohexane (75/10/5/5/5 in parts by mass)
methyl acetate/acetone/ethanol/butanol (81/8/7/4 in parts by mass)
methyl acetate/acetone/ethanol/butanol (82/10/4/4 in parts by mass)
methyl acetate/acetone/ethanol/butanol (80/10/5/5 in parts by mass)
methyl acetate/methyl ethyl ketone/methanol/butanol (80/10/5/5 in parts by mass)
methyl acetate/acetone/methyl ethyl ketone/ethanol/isopropanol (75/10/10/5/7 in parts by mass)
methyl acetate/cyclopentanone/methanol/isopropanol (80/10/5/8 in parts by mass)
methyl acetate/acetone/butanol (85/5/5 in parts by mass)
methyl acetate/cyclopentanone/acetone/methanol/butanol (60/15/15/5/6 in parts by mass)
methyl acetate/cyclohexanone/methanol/hexane (70/20/5/5 in parts by mass)
methyl acetate/methyl ethyl ketone/acetone/methanol/ethanol (50/20/20/5/5 in parts by mass)
methyl acetate/1,3-dioxolane/methanol/ethanol (70/20/5/5 in parts by mass)
methyl acetate/dioxane/acetone/methanol/ethanol (60/20/10/5/5 in parts by mass)
methyl acetate/acetone/cyclopentanone/ethanol/isobutanol/cyclohexane (650/10/10/5/5/5 in parts by mass)
methyl acetate/methyl ethyl ketone/acetone/methanol/ethanol (50/20/20/5/5 in parts by mass)
methyl acetate/acetone/ethyl acetate/ethanol/butanol/hexane (65/10/10/5/5/5 in parts by mass)
acetone/methyl acetoacetate/methanol/ethanol (65/20/10/5 in parts by mass)
acetone/cyclopentanone/ethanol/butanol (65/20/10/5 in parts by mass)
acetone/1,3-dioxolane/ethanol/butanol (65/20/10/5 in parts by mass)
1,3-dioxolane/cyclohexanone/methyl ethyl ketone/methanol/butanol (55/20/10/5/5/5 in parts by mass)

It is also possible to use a cellulose acylate solution prepared by the following methods.

A method where a cellulose acetate solution is prepared from methyl acetate/acetone/ethanol/butanol (81/8/7/4 in parts by mass) and then filtered and concentrated and, after that, 2 parts by mass of butanol is added thereto.

A method where a cellulose acetate solution is prepared from methyl acetate/acetone/ethanol/butanol (84/10/4/2 in parts by mass) and then filtered and concentrated and, after that, 4 parts by mass of butanol is added thereto.

A method where a cellulose acetate solution is prepared from methyl acetate/acetone/ethanol (84/10/6 in parts by mass) and then filtered and concentrated and, after that, 5 parts by mass of butanol is added thereto.

Besides the aforementioned non-chlorine-type organic solvent of the present invention, it is also possible that dichloromethane is contained in the dope used in the present invention in an amount of not more than 10% by mass of the amount of the total organic solvent.

<Characteristic of a Cellulose Acylate Solution>

With regard to a solution of cellulose acylate, it is preferred to be a solution where cellulose acylate is dissolved in the aforementioned organic solvent in a concentration of 10 to 30% by mass, more preferably 13 to 27% by mass and, particularly preferably, 15 to 25% by mass in view of adaptability for casting for the manufacture of film. A method for making cellulose acylate into the concentration as such may be carried out in such a manner that a predetermined concentration is achieved in the dissolving stage or that a low-concentration solution (such as 9 to 14% by mass) is previously prepared and then the solution is adjusted to the predetermined high concentration by a concentrating step which will be mentioned later. It is also possible that a high-concentration cellulose acylate solution is previously prepared and then various additives are added to give a cellulose acylate solution with a predetermined low concentration. There is no particular problem in any of those methods provided that it is carried out so as to give a cellulose ester solution having a concentration of the present invention.

In the present invention, molecular weight of a cellulose acylate associate in a diluted solution where a cellulose acylate solution is made 0.1 to 5% by mass using an organic solvent of the same composition is preferred to be 150,000 to 15,000,000. More preferably, molecular weight of the associate is 180,000 to 9,000,000. The molecular weight of the associate is able to be determined by a static light scattering method. It is preferred to dissolve to such an extent that an inertia square radius which is determined at the same time is made 10 to 200 nm. More preferred inertia square radius is 20 to 200 nm. It is also preferred to dissolve to such an extent that the secondary virial coefficient is made from $-2 \times 10^{-4}$ to $+4 \times 10^{-4}$ and, more preferably, from $-2 \times 10^{-4}$ to $+2 \times 10^{-4}$.

Now, definitions for molecular weight of associate, inertia square radius and secondary virial coefficient used in the present invention will be illustrated. They are measured using a static light scattering method according to the following method. Measurement is conducted in a diluted region for the convenience of a device and those measured values reflect the behavior of the dope in a high concentration region of the present invention.

Firstly, cellulose acylate is dissolved in a solvent used for a dope to prepare solutions of 0.1% by mass, 0.2% by mass, 0.3% by mass and 0.4% by mass. In order to avoid moisture absorption, weighing is carried out at 25° C. and 10% RH using cellulose acylate dried at 120° C. for 2 hours. With regard to a dissolving method, that which was adopted upon dissolving the dope (dissolving at ambient temperature, dissolving under cooling or dissolving at high temperature) is used. After that, those solution and solvent are filtered through a filter of 0.2 μm made of Teflon. Static light scattering of the filtered solution is measured at 25° C. from 30° to 140° with every 10° using a light scattering measuring device (DLS-700 manufactured by Otsuka Denshi K. K.). The resulting data are analyzed by a Berry plot method. Incidentally, with regard to the necessary refractive index in this analysis, the value for a solvent determined by an Abbe's refractive system and, with regard to concentration gradient (dn/dc) of the refractive index, measurement is conducted using the solvent and the solution used for the light scattering measurement using a differential refractometer (DRM-1021 manufactured by Otsuka Denshi K. K.).

<Method for the Manufacture of Dope>

As hereunder, a method for the manufacture of dope which is preferably used in the present invention will be illustrated by referring to an example which is the case where cellulose ester is used as a polymer although the present invention is not limited by that method. When it is used for a solution film-forming method of the present invention, other polymer may be used as well.

Firstly, a dope is manufactured using the above-mentioned material. The first thing is that a solvent is sent from a solvent tank to a dissolving tank. After that, TAC placed in a hopper is sent to a dissolving tank together with weighing. With regard to an additive solution, its necessary amount is sent from an additive tank to a dissolving tank. Incidentally, with regard to the additive, it is also possible in addition to sending as a solution that, in case the additive is liquid at ambient temperature for example, the additive in such a liquid state is sent to a dissolving tank. When the additive is solid, a method where it is sent to a dissolving tank using a hopper or the like is possible as well. When plural kinds of additives are added, it is also possible that a solution in which plural kinds of additives are dissolved is placed in the additive tank. Alternatively, it is further possible that a solution in which each additive is dissolved is placed in each of many additive tanks and sent to a dissolving tank using each independent pipeline.

In the aforementioned illustration, the order for placing in a dissolving tank is solvent (used in such a sense that a mixed solvent is also included), TAC and additive although the order is not limited thereto. For example, it is also possible that a preferred amount of solvent is sent after TAC is sent to a dissolving tank with weighing. An additive is not always necessary to be previously placed in a dissolving tank but may be mixed with a mixture of TAC and solvent (hereinafter, the mixture as such may also be referred to as a dope) in the latter step.

The dissolving tank is equipped with a jacket which encloses the outer surface thereof and with a first stirrer which is rotated by a motor. It is preferred that the dissolving tank is also equipped with a second stirrer which is rotated by a motor. The first stirrer is preferred to be equipped with an anchor wing while the second stirrer is preferred to be an eccentric stirrer of a dissolver type. A heat-transmitting medium is casted between the dissolving tank and the jacket whereby the temperature of the dissolving tank is adjusted and its preferred temperature range is 10° C. to 55° C. When the type of the first stirrer and the second stirrer is appropriately selected and used, a swollen solution where TAC is swollen in a solvent is prepared.

The swollen solution is sent to a heating device by a pump. The heating device is preferred to be in a piping with a jacket and is more preferred to be in such a constitution that the swollen solution is able to be compressed. As a result of using the heating device as such, the solid in the swollen solution is dissolved under a heating condition or under a compressing/heating condition to give a dope. Hereinafter, this method will be referred to as a dissolving method by heating. In that case, temperature of the swollen solution is preferred to be 50° C. to 120° C. It is also possible to conduct a dissolving method with cooling where the swollen solution is cooled at −100° C. to −30° C. When the dissolving method by heating and the dissolving method by cooling are appropriately selected and conducted, it is now possible that TAC is fully dissolved in a solvent. The dope is made nearly room temperature using a temperature-adjusting machine and then filtered using a filtering device to remove impurities contained in the dope. With regard to a filter used for the filtering device, its average pore size is preferably not larger than 100 μm. Flow rate for the filtration is preferably not less than 50 L/hr. The dope 22 after filtration is sent to a stock tank 21 in the film-manufacturing line 20 and stored there.

Incidentally, in a method as above where a swollen solution is once prepared and then the swollen solution is made into a dope, there may be the case where time needed becomes long when concentration of TAC is raised causing a problem in terms of the manufacturing cost. In such a case, it is preferred that a dope having lower concentration than the aimed concentration is prepared and then a concentrating step for giving the aimed concentration is carried out. When such a method is used, a dope filtered by a filtering device is sent to a flash device and a part of the solvent in the dope is evaporated in the flash device. Solvent gas generated by evaporation is condensed by a condenser (not shown) and the resulting liquid is recovered by a recovering device. The recovered solvent is regenerated as a solvent for preparation of a dope by a regenerating device and is recycled. Such a recycling is effective in terms of the cost.

The condensed dope is discharged from the flash device by a pump. Further, in order to discharge the foams generated in the dope, it is preferred to conduct a defoaming treatment. With regard to this defoaming method, various known methods are applied and an example thereof is an ultrasonic wave irradiation method. The dope is then sent to a filtering device whereupon foreign matters are removed. Temperature of the dope upon filtering is preferred to be 0° C. to 200° C. The dope 22 is sent to a stock tank 21 and stored.

According to the above-mentioned method, a dope where TAC concentration is 5% by mass to 40% by mass is able to be manufactured. More preferably, TAC concentration is from 15% by mass to 30% by mass and, most preferably, it is able to be made within a range of from 17% by mass to 25% by mass. It is preferred that concentration of additives (mainly plasticizer) is made from 1% by mass to 20% by mass where the total solid in the dope is 100%) by mass. With regard to a method for the manufacture of a dope such as dissolving and adding methods of raw materials, starting materials and additives in a solution film-forming method for production of film, filtering method and defoaming, it is mentioned in detail in the paragraphs [0517] to [0616] of Japanese Patent Laid-Open No. 2004/264,464. Such a description is also able to be applied to the present invention.

<Solution Film-Forming Method>

Now a method for the manufacture of film using the dope 22 prepared hereinabove will be illustrated. FIG. 1 is an outline drawing which shows a film manufacturing line 20 although the present invention is not limited to the film manufacturing line as shown in FIG. 1. The film manufacturing line 20 is equipped with stock tank 21, filtering device 30, casting die 31, casting band 34 hung on rotating rollers 32, 33 and tenter-type drier 35. There are also provided ear-cutting device 40, drying chamber 41, cooling chamber 42 and winding chamber 43.

A stirrer 61 rotated by a motor 60 is attached to the stock tank 21. The stock tank 41 is connected to the casting die 31 via pump 62 and filtering device 30.

With regard to a material for the casting die 31, stainless steel of a separated hardening type is preferred and its thermal expansion coefficient is preferred to be not more than $2 \times 10^{-5}$ ($C^{o-1}$). That which has nearly the same anti-corrosive property as SUS 316 in a compulsive corrosion test in an aqueous solution of electrolyte is also able to be used as a material for the casting die 41. There may be also used a thing which has an anti-corrosive property where no pitching (pore) is generated on a gas-liquid surface even when dipped in a mixed solution of dichloromethane, methanol and water for three months. It is preferred to prepare a casting die 31 by subjecting a product of more than one month after casting to a grinding treatment. As a result, the dope 22 uniformly flows in a casting die 31 and generation of scratch or the like on a casted film 69 which will be mentioned later is prevented. It is preferred that the final precision of the casting die 31 at the contacting surface to liquid is not more than 1 µm in terms of surface roughness and not more than 1 µm/m in terms of real straightness in any direction. Clearance of slit of the casting die 31 is made adjustable by an automatic adjustment within a range of 0.5 mm to 3.5 mm. With regard to an angle part of liquid-contacting area of the front end of lip of the casting die 31, its R is made not more than 50 µm throughout the whole width. It is preferred that a shearing rate at the inside of the casting die 31 is adjusted to be 1 (1/sec) to 5,000 (1/sec).

Although there is no particular limitation for the width of the casting die 31, it is preferred to be 1.1- to 2.0-fold of the width of the film which is the final product. It is also preferred that a temperature conditioner (not shown) is attached to the casting die 31 so that the temperature during the film formation is kept at a predetermined temperature. It is further preferred that the casting die 31 in a coat hanger type is used. It is more preferred that the thickness adjusting bolts (heat bolts) are installed with predetermined intervals in the transverse direction of the casting die 31 and that the automated thickness adjusting mechanism by heat bolts is installed in the casting die 31. It is preferred that the heat bolt is set with a profile depending upon the amount of the sending liquid of a pump 62 (preferably, a high-precision pump) according to a previously set program and is subjected to the film formation. It is also acceptable that a feedback control is conducted by an adjusting program based on a profile of a thickness meter (not shown) (such as infrared thickness meter) in a film manufacturing line 20. It is preferred that, except a casting edge part, difference in thickness at any two points in a transverse direction of the product film is adjusted to be within 1 µm and difference between maximum and minimum values in the thickness in a transverse direction is adjusted to be not more than 3 µm or, more preferably, not less than 2 µm. It is preferred to use a thing where thickness precision is adjusted to be not more than ±1.5 µm.

It is more preferred that a hardened film is formed on the front end of lip of the casting die 31. Although there is no particular limitation for the method for the formation of a hardened film, there may be exemplified ceramics coating, hard chromium plating and nitriding treatment. When ceramics is used as a hardened film, it is preferred to be able to be ground, have a low poring rate, be non-fragile, have a good anti-corrosive property, have a good close adhesion to the casting die 31 and have no close adhesion to dope 22. Specific examples thereof are tungsten carbide (WC), $Al_2O_3$, TiN and $Cr_2O_3$ and, among them, WC is particularly preferred. A WC coating is able to be carried out by a sputtering method.

In order to prevent a local drying and solidification of the dope casted out to a slit end of the casting die 31, it is preferred to apply a solvent providing device (not shown) to the slit end. In that case, it is preferred that a solvent which makes the dope soluble (such as a mixed solvent comprising 86.5 parts by mass of dichloromethane, 13 part by mass of acetone and 0.5 part by mass of n-butanol) is provided near the surrounding area of the contact line of three phases formed by both ends of the casting beads, end of die slit and outer air. It is preferred in view of prevention of mixing of foreign substances into the casted film to provide it at the rate of 0.1 mL/min to 1.0 mL/min to each of the ends. Incidentally, with regard to a pump for providing the liquid, it is preferred to use a liquid where a pulsating rate is not more than 5%.

On the lower area of the casting die 31, there is installed a casting band 34 being hung on rotating rollers 32, 33. The rotating rollers 32, 33 are rotated by a driving device which is not shown and, as a result of the rotation, the casting band 34 runs without an end. With regard to the casting band 34, its moving rate or, in other words, casting rate is preferably 10 m/minute to 200 m/minute, more preferably 15 m/minute to 150 m/minute and, most preferably, 20 m/minute to 120 m/minute. In view of productivity of the film, the casting rate is preferred to be not less than 10 m/minute. In view of the outcome that the casting beads are formed in a stable manner and that surface of the casted film 69 becomes good, it is preferred to be not less than 200 m/minute.

It is preferred for adjusting the surface temperature of the casting band 46 to an intended value that the rotating rollers 32, 33 are equipped with a circulating device 63 for the heat transmitting medium. With regard to the casting band 34, it is preferred that the surface temperature thereof is able to be adjusted to −20° C. to 40° C. In the rotating rollers 32, 33 used in this embodiment, a passage (not shown) for a heat transmitting medium is formed and, when a heat transmitting medium kept at a predetermined temperature passes therein, temperature of the rotating rollers 32, 33 is able to be kept at a predetermined value.

Although there is no particular limitation for the width of the casting band 34, it is preferred to use a band where the width is within a range of 1.1- to 2.0-fold of the casting width of the dope 22. It is preferred to be polished so that length is made 20 m to 200 m, thickness is made 0.5 mm to 2.5 mm and surface roughness is made not more than 0.05 µm. The casting band 34 is preferred to be made of stainless steel and, in order to give sufficient anti-corrosive property and strength, it is more preferred to be made of SUS 316. With regard to the casting band, it is preferred to use a thing where total thickness unevenness is not more than 0.5%.

It is also possible that the rotating rollers 32, 33 are directly used as a support. In that case, they are preferred to be able to be rotated at a high precision so that the unevenness in the rotation is not more than 0.2 mm. In that case, it is preferred that the average roughness of the surface of the rotating rollers 32, 33 is made not more than 0.01 µm. Therefore, the surface of the rotating roller is subjected to a chromium plating treatment or the like so that sufficient hardness and durability are endowed thereto. It is necessary that surface deficiency of the supports (casting band 34 and rotating rollers 32, 33) is suppressed to a minimum extent. To be more specific, it is preferred that there is no pinhole of 30 µm or bigger, that pinholes of from 10 µm to smaller than 30 µm are not more than one per $m^2$ and that pinholes of smaller than 10 µm are not more than two per $m^2$.

Casting die 31, casting band 34, etc. are placed in a casting chamber 64. The casting chamber 64 is equipped with a temperature-conditioning device 65 for keeping its inner temperature at a predetermined value and a condenser 66 for condensing and recovering the evaporated organic solvent. Further, a recovering device 67 for recovering the condensed and liquefied organic solvent is installed at the outer area of the casting chamber 64. It is preferred to install a vacuum chamber 68 which is to control the pressure of the back area of the casting beads formed from the casting die 31 to the casting band 34 and, in this embodiment, such a chamber is used too.

Figure 2:
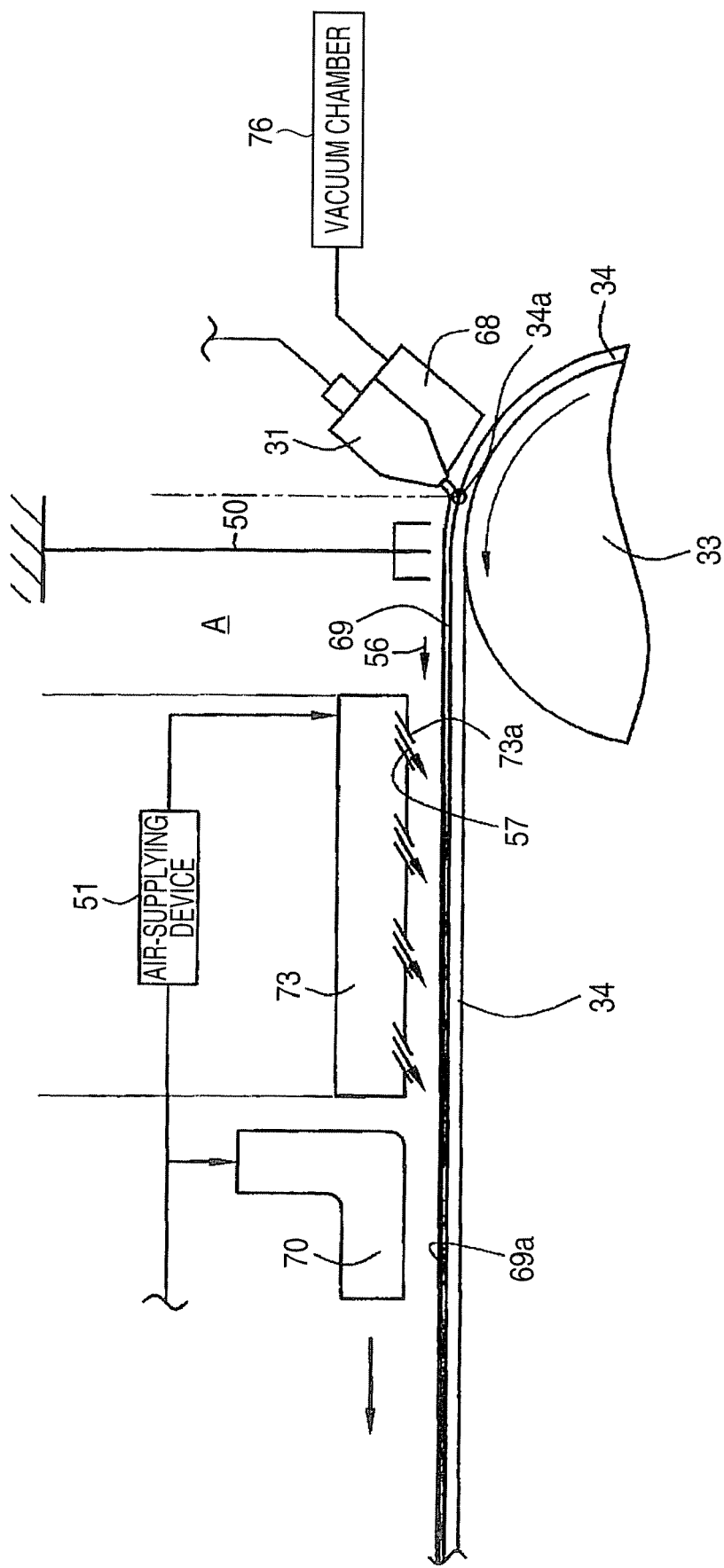
FIG. 2 is a drawing where essential parts of FIG. 1 are enlarged.

In order to evaporate the solvent in the casted film 69, ventilation openings 70, 71, 72 are installed near the surrounding surface of the casting band 34. As shown in FIG. 2, a labyrinth seal 50 is attached near the casting die 31 for suppressing the changes in the face of the casted film 69 by blowing of dry wind onto the casted film 69 immediately after the casting. There is further installed a ventilation opening (hereinafter, it will be referred to as a ventilation opening for quick drying) 73 between the labyrinth seal 50 and the ventilation opening 70. The ventilation opening for quick drying 73 and other ventilation openings 70 to 72 are installed with air-supplying devices 51. The ventilation opening for quick drying 73 has plural nozzles 73a and, when dry wind 57 is applied to the surface of the casted film 69, an initial film 69a is formed on the surface of the casted film 69. There are four nozzles which are installed in the ventilation opening for quick drying 73 although the present invention is not limited thereto. Distance between the labyrinth seal 50 and the ventilation opening for quick drying 73 is defined as L1 (mm). This region is called a natural wind region A. Length of the ventilation opening for quick drying 73 is defined as L2 (mm). A vacuum device (such as blower of a roots type) 76 is connected to a vacuum chamber 68. Time for applying the dry wind 57 to the casted film 69 is preferred to be not shorter than 20 seconds. In view of the outcome that formation of the initial film 69a progresses whereupon a film having a good face is prepared, blowing time of the dry wind 57 is preferred to be not shorter than 20 seconds.

Figure 3A:
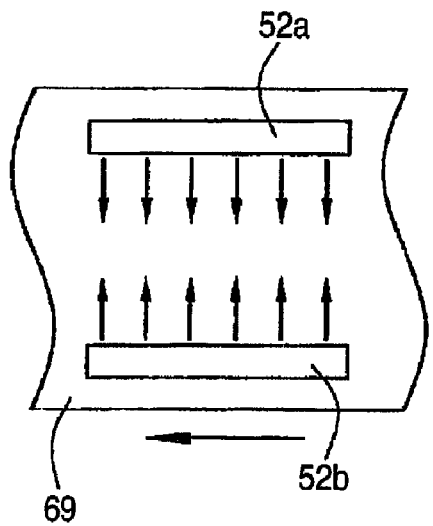
FIG. 3A to 3C are other embodiments how to blow the dry wind for carrying out the solution film-forming method of the present invention.
Figure 3B:
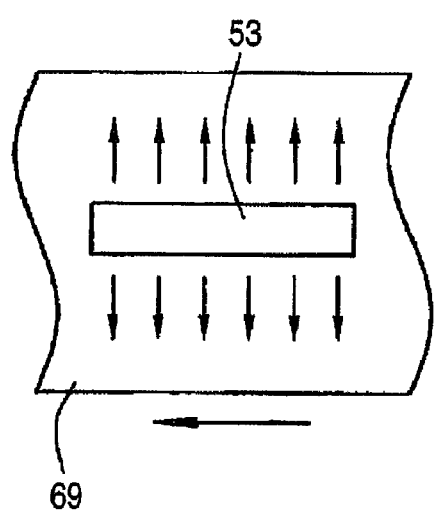
Figure 3C:
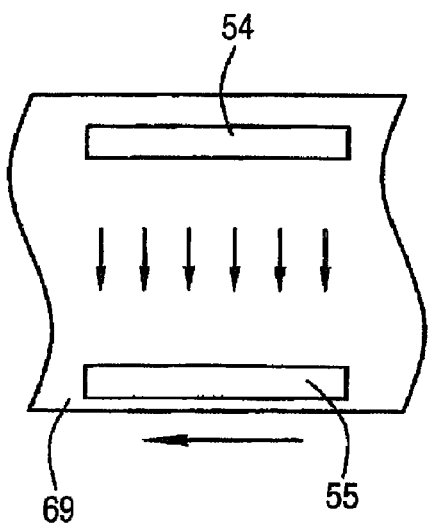

With regard to the blowing direction of dry wind from nozzles, various embodiments may be used as shown in FIG. 3A to 3C. For example, as shown in FIG. 3A, there is a case where dry wind is applied to the central area of the casted film 69 from nozzles 52a, 52b at both ends of the casted film 69. It is also possible that, as shown in FIG. 3B, a nozzle 53 is formed in the central area of the casted film 69 in the transverse direction and dry wind is applied to both ends from the central area. It is further possible that, as shown in FIG. 3C, dry wind is applied to the casted film 69 from the nozzle 54 of the casted film 69 to the suction opening 55. There is no particular limitation for the shape of the nozzle.

A blower 81 is installed at the connecting area 80s and, in the ear-cutting device 40 on the lower stream of a tenter-type drier 35, a crusher 90 for cutting the waste of the side end (called "ear") of the cut-out film 82 is connected.

Many rollers 91 are installed in the drying chamber 41 and, in order to adsorb and recover the solvent gas which is generated by evaporation, an adsorbing and recovering device 92 is attached. Although a cooling chamber 42 is installed at the lower stream of the drying chamber 41 in FIG. 1, it is also possible to install a humidity conditioning chamber (not shown) between the drying chamber 41 and the cooling chamber 42. In the lower stream of the cooling chamber 42, there is installed a compulsory charge-eliminating device (charge-eliminating bar) for adjusting the charge voltage of the film 82 to a predetermined range (such as −3 kV to +3 kV). Although an example where the compulsory charge-eliminating device 93 is placed in the lower stream of the cooling chamber 42 is shown in FIG. 1, there is no limitation to place to such a position only. In this embodiment, rollers 94 for giving knurling by which knurling is given in an embossing process at both ends of the film 82 are appropriately formed in the lower stream of the compulsory charge-eliminating device 93. In the inner area of the winding chamber 43, there are equipped a winding roller 95 for winding the film 82 and a press roller 96 for controlling the tension at the winding.

An example of a method for the manufacture of a film 82 using the above-mentioned film manufacturing line 20 will be illustrated as hereunder. Dope 22 is always made uniform by rotation of the stirrer 61. The dope 22 is able to be mixed with additives such as plasticizer and ultraviolet absorber even at this stirring stage.

The dope 22 is sent to the filtering device 30 by a pump 62 and, after it is filtered there, it is casted onto a casting band 34 from a casting die 31. Driving of the rotating rollers 32, 33 is preferred to be adjusted in such a manner that tension generated in the casting band 34 becomes 104 N/m to 105 N/m. Relative speed difference between the casting band 34 and the rotating rollers 32, 33 is adjusted to be not more than 0.01 m/min. It is preferred that variation in speed of the casting band 34 is made not more than 0.5% and that meander in the transverse direction resulted in one rotation of the casting band 34 is made not more than 1.5 mm. In order to control the meander, it is more preferred that a detector (not shown) for detecting the positions of both ends of the casting band 34 is installed and the feed-back control is conducted at a position controlling machine (not shown) of the casting band 34 based on the measured value so that position of the casting band 34 is adjusted. It is further preferred that, with regard to the casting band 34 immediately beneath the casting die 31, adjustment is conducted so that the variation in the position in upward and downward directions as a result of rotation of the rotating roller 33 is made not more than 200 µm. It is also preferred that temperature of the casting chamber 64 is made −10° C. to 57° C. by a temperature-conditioning device 65. Incidentally, the solvent evaporated in the inner area of the casting chamber 64 is recovered by a recovering device 67, regenerated and recycled as a solvent for the preparation of a dope.

Casting beads are formed from the casting die 31 to the casting band 34 and a casted film 69 is formed on the casting band 34. Temperature of the dope 22 during casting is preferred to be −10° C. to 57° C. In order to make the casting stable, it is preferred that the back of the casting beads is controlled to a desired pressure by a vacuum chamber 68. It is preferred that the back of the beads is made vacuum from the front side to an extent of −2,000 Pa to −10 Pa. It is more preferred that the vacuum chamber 68 is equipped with a jacket (not shown) to control the temperature so that the inner temperature is kept at predetermined temperature. Although there is no particular limitation for the temperature of the vacuum chamber 68, it is preferred to be not lower than the condensing point of the organic solvent used. It is preferred that a suction device (not shown) is attached to an edge part of the casting die 31 so as to keep the shape of the casting beads in a desired one. The amount of the sucking air at the edge is preferred to be within a range of 1 L/min to 100 L/min.

The dope 22 forms casting beads from the casting die 31 and casted onto the casting band 34. Viscosity (as measured by a rheometer) of the dope 22 during the casting is preferably 10 Pa·s to 100 Pa·s, more preferably 12 Pa·s to 50 Pa·s and, most preferably, from 15 Pa·s to 40 Pa·s.

The casting beads form a casted film 69 on the casting band 34. Incidentally, the position where the casting beads attach to the casting band 34 is called a starting position 34a for the casting. Viscosity of the dope 22 is preferably not less than 10 Pa·s due to the reasons that viscosity does not become too low, that unevenness by dry wind is hardly resulted, that the surface of the casted film 69 becomes good and that formation of the initial film 69a is easy. The above is preferred also due to the reasons that amount of the solvent contained therein is not too much, that evaporation of solvent in the initial stage of drying of the casted film 69 does not take place so vigorously, that a poor drying (such as foaming) is hardly resulted and that no large equipment for the recovery of solvent is necessary.

The casted film 69 moves together with movement of the casting band 34. Above the casted film 69, wind of nature (hereinafter, it will be referred to as natural wind) is generated. The region after the casting to the stage where dry wind is sent is called a natural wind region A. In the natural wind region A, a labyrinth seal 50 is installed and it prevents a back run of the natural wind 56 in the lower stream to the place near the casting die 31. The natural wind 56 has a wind velocity of less than 3 m/s in the present invention and the natural wind 56 is usually a weak wind where the velocity is not more than 2 m/s. However, when the natural wind 56 which is a turbulent flow hits the surface of the casted film 69, it results in deterioration of the surface property of the film. Therefore, length L1 (mm) of the natural wind region is to be as short as possible. However, in view of the oriented positions of the devices in the film manufacturing line 20, the length L1 (mm) is preferably not more than 3,000 mm, more preferably not more than 2,000 mm and, still more preferably, not more than 1,000 mm. Time necessary for passing the casted film 69 through the natural wind region is preferably not more than 15 seconds, more preferably not more than 10 seconds and, most preferably, not more than 7 seconds.

After that, the casted film 69 is continuously conveyed to the place where the ventilation opening for quick drying 73 is oriented thereon. Drying air 57 is blown to the casted film 69 from the nozzle 73a of the ventilation opening for quick drying 73. As a result of being hit by drying air 57, the casted film 59 forms an initial film 69a on its surface. As a result of a leveling effect of the initial film 69a, surface of the casted film 69 is made flat and smooth and is dried. Incidentally, formation of the initial film 69a in the present invention is not limited to a method where dry wind 57 is applied. Thus, for example, the initial film 69a may be formed by an infrared ray heater, a microwave heating, etc.

Wind velocity of the drying air 57 is preferably 3 m/s to 15 m/s, more preferably 4 m/s to 12 m/s and, most preferably, 4 m/s to 10 m/s. The wind velocity is preferred to be not less than 3 m/s in view of the outcome that formation of the initial film 69a is smooth and deterioration of surface property of the casted film 69 before formation of initial film is able to be prevented. In addition, in view of the outcome that the drying air 57 does not hit the casted film 69 too much and the initial film 69a with an excellent surface property is formed, the wind velocity is preferred to be not more than 15 m/s.

Gas concentration in the drying air 57 is preferably not more than 25%, more preferably not more than 20% and, most preferably, not more than 18%. The term gas concentration used in the present invention means the volatile solvent component in the drying air 57 as measured by an infrared analytic method. The casted film 69 immediately after its formation contains much amount of solvent. Therefore, the gas concentration in the drying air 57 is preferred to be not more than 25% in view of the outcome that evaporation of the solvent from the casted film 69 containing much amount of solvent is not too slow and formation of the initial film 69a becomes easy.

Temperature of the drying air is preferably 40° C. to 150° C., more preferably 45° C. to 120° C. and, most preferably, 50° C. to 100° C. The temperature is preferred to be not lower than 40° C. in view of the outcome that evaporation of the solvent from the casted film 69 is apt to proceed whereby formation of the initial film 69a with a good film surface is possible. In addition, the temperature is preferred to be not higher than 150° C. in view of the outcome that there is no foaming of solvent or the like in the casted film 69, that there is no sudden evaporation and that formation of the initial film 69a having a good surface property is easy.

In the present invention, time for hitting the natural wind 56 to the casted film 59 is preferably within 15 seconds after the casting, more preferably within 10 seconds and, most preferably, within 7 seconds. It is preferred that the time of hitting the natural wind 56 to the casted film 59 is not more than 15 seconds in view of the outcome that it is a quick drying, formation of uneven thickness on the surface of the casted film 69 before formation of the uniform initial film 69a on the surface of the casted film 69 is able to be avoided and a film 82 having uniform surface property is prepared. Since the drying time is short, productivity of the film 82 is good.

Amount of the solvent contained therein on the basis of the solid when drying of the casted film 69 is initiated is preferably 200% by mass to 500% by mass, more preferably 250% by mass to 450% by mass and, most preferably, 300% by mass to 420% by mass.

A decreasing speed of the solvent remained in the aforementioned casted film 69 during 30 seconds after the drying air 57 is sent to the casted film 69 is preferably 1% by mass/s to 12% by mass/s, more preferably 3% by mass/s to 11% by mass/s and, most preferably, 5% by mass/s to 10% by mass/s. In view of the outcome that retardation of formation of the initial film 69a can be suppressed and formation of the initial film 69a having a sufficient film surface strength is easy, the drying speed is preferred to be not less than 1% by mass/s. In addition, in view of the outcome that formation of the initial film 69a is able to be done uniformly and foaming of the casted film 69 and deterioration of surface property of the film surface can be suppressed, the drying speed is preferred to be not more than 12% by mass/s.

The casted film 69 moves together with running of the casting band 34 and, at that time, drying air hits the casted film 69 from ventilation openings 70, 71, 72 whereupon evaporation of the solvent is promoted. Although the surface property of the casted film 69 may vary as a result of blowing of the drying air, a labyrinth seal 50 suppresses the variation as such. Incidentally, the surface temperature of the casting band 34 is preferred to be $-20°$ C. to $40°$ C.

After the casted film 69 becomes to have a self-supporting property, it is peeled off as a wet film 74 from the casting band 34 by being supported by a peeling roller 75. Amount of the remaining solvent after peeling off is preferred to be 20% by mass to 250% by mass on the basis of solid. After that, the wet film 74 is conveyed on a connecting part 80 where many rollers are installed and sent to a tenter-type drying machine 35. In the connecting part 80, dry wind of desired temperature is blown from a blowing machine 81 so that drying of the wet film 74 is conducted. At that time, temperature of the drying air is preferred to be $20°$ C. to $250°$ C. Incidentally, when a rotating speed of the roller in the lower stream is made quicker than that of the roller in the upper stream in the connecting part 80, it is also possible to give a draw tension to the wet film 74.

The wet film 74 sent to the tenter-type drying machine 35 is dried by being conveyed where both ends thereof are held by clips. It is preferred that the inner area of the tenter-type drying machine 35 is divided into sections of temperature zones and that drying condition is appropriately adjusted for each of the sections. It is also possible that the wet film 74 is stretched to a transverse direction using the tenter-type drying machine 35. It is preferred that one of the casting direction and transverse direction of the wet film 74 is stretched to an extent of 1.01- to 2.0-fold at the connecting part 80 and/or the tenter-type drying machine 35 as mentioned above. Extension to an extent of 1.01- to 1.5-fold is more preferred and that to an extent of 1.01- to 1.3-fold is still more preferred.

After the wet film 74 is dried in a tenter-type drying machine 35 to a predetermined remaining solvent amount, it is sent out to the lower stream side as a film 82. Both side ends of the film 82 are cut by an ear-cutting device 40. The cut side ends are sent to a crusher by a cutter blower which is not shown. The side ends of the film are pulverized by the crusher 90 to give chips. Those chips are recycled for the preparation of a dope and, therefore, this method is effective in view of the cost. Incidentally, although this step of cutting the both side ends is able to be omitted, it is still preferred to conduct the step during in any of the steps from the above-mentioned casting step to the winding step for the film.

The film 82 where both side ends are cut and detached is sent to a drying chamber 41 and dried further. Although there is no particular limitation for the temperature in the drying chamber 41, it is preferred to be within a range of $50°$ C. to $160°$ C. In the drying chamber 41, the film 82 is conveyed together with being wound to the roller 91 and solvent gas which is generated by evaporation here is recovered by being adsorbed with an adsorbing and recovering device 92. The air wherefrom the solvent component is removed is blown again into an inner area of the drying chamber 41 as drying air. Incidentally, it is more preferred that the drying chamber 41 is divided into plural sections for changing the drying temperature. When the film 82 is subjected to a preliminary drying by installing a preliminary drying chamber (not shown) between the ear-cutting device 40 and the drying chamber 41, a sudden rise in the film temperature in the drying chamber 41 is able to be prevented whereby changes in the shape of the film 82 is able to be much more suppressed.

The film 82 is cooled in a cooling chamber 42 down to nearly a room temperature. It is also possible that a humidity adjusting chamber (not shown) is installed between the drying chamber 41 and the cooling chamber 42 and it is preferred that, in this humidity adjusting chamber, air which is adjusted to desired humidity and temperature is blown to the film 82. As a result thereof, generation of curl and generation of poor winding upon winding of the film 82 are able to be suppressed.

Charged voltage during the film 82 is conveyed is made within a predetermined range (such as $-3$ kV to $+3$ kV) by a compulsory charge eliminating device (charge eliminating bar) 93. In FIG. 1, an example where it is installed in the lower stream of the cooling chamber 42 is shown but the position is not limited thereto. It is preferred that a roller 94 for giving knurling is further installed whereby knurling is given to both ends of the film 82 by means of an embossing process. Unevenness of the area which is subjected to knurling is preferred to be 1 μm to 200 μm.

Finally, the film 82 is wound by a winding roller 95 in a winding chamber 43. At that time, it is preferred that winding is conducted by giving a desired tension by a press roller 96. It is more preferred that the tension is gradually changed from the start until the finish of the winding. The wound film 82 is preferred that it is made at least 100 m in the longitudinal direction (casting direction). Width of the film 92 is preferably not less than 600 mm and, more preferably, 1,400 mm to 1,800 mm. The present invention is also effective even when it is more than 1,800 mm. The present invention is also applicable even when a thin film where thickness of the film 82 is 15 μm to 100 μm is manufactured.

In the solution film-forming method of the present invention, it is also possible in casting the dope that two or more kinds of dopes are subjected to a simultaneously layered co-casting or to a successively layered co-casting. It is further possible to combine both co-castings. When the simultaneously layered co-casting is carried out, a casting die with which a feed block is equipped may be used or a casting die of a multi-manifold type may be used. In the film comprising plural layers as a result of a co-casting, it is preferred that at least one of thickness of layer of the air side and thickness of the layer of the support side is 0.5% to 30% of the total thickness of the film.

When a simultaneously layered co-casting is conducted, it is preferred in casting the dope from a die slit to a support that a highly viscous dope is enclosed by a lowly viscous dope. It is preferred that the solid concentration of the dope of the outer layer is lower than the solid concentration of the dope of the inner layer to an extent of 1% by mass or more and it is more preferred to be to an extent of 3% by mass or more. It is also preferred that composing ratio of alcohol is higher in the dope contacting to outside than in the dope inside. Adding amount of alcohol in the dope of outer layer is preferably 1.05- to 6.0-fold, more preferably 1.2- to 4.0-fold and, particularly preferably, 1.5- to 3.0-fold of that in the dope of the inner layer.

From structures of casting die, vacuum chamber, support, etc., co-casting method, peeling-off method, stretching, drying condition in each step, handling method, curl, winding method after correction of flatness to method of recovering the solvent and method of recovering the film are described in detail from paragraph [0617] to paragraph [0889] of Japanese Patent Application No. 2004/264,464. The descriptions as such are also applicable to the present invention.

The present invention also relates to a polarizing plate where the aforementioned cellulose acylate film is used as a protective film of a polarizer.

<Polarizing Plate>

A polarizing plate comprises a polarizer and two transparent protective films placed on both sides thereof. The cellulose ester film of the present invention is able to be used as at least one of the protective films. Common cellulose acetate film may be used for another protective film. Examples of a polarizer are iodine-type polarizer, dye-type polarizer using a dichromatic dye and polyene-type polarizer. Iodine-type polarizer and dye-type polarizer are usually manufactured using a film of a polyvinyl alcohol type. When the cellulose ester film of the present invention is used as a protective film for a polarizer, there is no particular limitation for a method of manufacturing the polarizer but a common method may be used for its manufacture. There is a method where the resulting cellulose acylate film is subjected to an alkali treatment and adhered using an aqueous solution of a completely saponified polyvinyl alcohol on both sides of a polarizer prepared by means of dipping and stretching of a polyvinyl alcohol film in an iodine solution. It is also possible to apply an easily adhering process as mentioned in Japanese Patent Laid-Open Nos. 06/094,915 and 06/118,232 instead of an alkali treatment. Examples of an adhesive used for adhesion of the surface treated with a protective film to a polarizer are an adhesive of a polyvinyl alcohol type such as polyvinyl alcohol and polyvinyl butyral and a latex of a vinyl type such as butyl acrylate. A polarizing plate is composed of a polarizer and protective films which protect the both sides thereof and, further, one side of the polarizing plate is adhered with a protective film while another side is adhered with a separate film. The protective film and the separate film are used with an object of protecting the polarizing plate during shipping, product inspection, etc. of the polarizing plate. In that case, the protective film is adhered with an object of protecting the surface of the polarizing plate and is used for a side which is opposite to the side where the polarizing plate is adhered to the liquid crystal plate. The separate film is used with an object of covering the adhesive layer adhering to the liquid crystal plate and is used on the surface where the polarizing plate is adhered to the liquid crystal plate.

With regard to a method of adhering the cellulose ester film of the present invention to a polarizer, it is preferred to adhere in such a manner that a transmission axis of the polarizer and a retardation phase axis of the cellulose ester film of the present invention coincide. When a polarizing plate prepared under a polarizer crossed nicol is evaluated, it has been found that, in case an orthogonal precision of a retardation phase axis of the cellulose ester film of the present invention with an absorption axis (an axis being orthogonal to a transmittance axis) of a polarizer is more than 1°, polarization degree property under a polarizing plate crossed nicol lowers resulting in light omission. In that case, when it is combined with liquid crystal cell, sufficient black level and contrast are not available. Accordingly, difference between the direction of main refractive index nx of the cellulose ester film of the present invention and the direction of transmittance axis of a polarizing plate is preferably within 1° and, more preferably, within 0.5°.

<Surface Treatment>

The cellulose ester film of the present invention is able to achieve an improvement in adhesive property to various functional layers (such as undercoating layer and back layer) by conducting a surface treatment is conducted if necessary. For example, there may be used glow discharge treatment, ultraviolet irradiation treatment, corona treatment, flame treatment or acid or alkali treatment. The glow discharge treatment mentioned here may be a low-temperature plasma which takes place under low-pressure gas of $10^{-3}$ to 20 Torr or is preferred to be a plasma treatment under atmospheric pressure. Plasma-exciting gas is gas which is excited by plasma under the above-mentioned condition and its examples are argon, helium, neon, krypton, xenon, nitrogen, carbon dioxide, fluorocarbon such as tetrafluoromethane and a mixture thereof. They are mentioned in detail in pages 30 to 32 of *Journal of Technical Disclosure*, No. 2001/1745 (published by JIII on Mar. 15, 2001). Plasma treatment under atmospheric pressure which has been receiving public attention in recent years uses, for example, irradiation energy of 20 to 500 kGy under 10 to 1,000 keV or, more preferably, irradiation energy of 20 to 300 kGy under 30 to 500 keV. Among those, the particularly preferred one is an alkali saponification treatment and is very effective for surface treatment of cellulose acylate film.

The alkali saponification treatment is preferred to be carried out either by a method where cellulose acylate film is directly dipped in a bath of a saponifying solution or by a method where a saponifying solution is applied to cellulose acylate film.

Examples of the method for application are dip coating method, curtain coating method, extrusion coating method, bar coating method and E-type application method. With regard to a solvent for an alkali saponification treatment application solution, it is preferred to select a solvent which has a good wetting property since it is applied to a transparent support of a saponifying solution and is able to keep the surface property good without formation of unevenness on the transparent support surface by a solvent for the saponifying solution. To be more specific, an alcohol-type solvent is preferred and isopropyl alcohol is particularly preferred. It is also possible to use an aqueous solution of surfactant as a solvent. With regard to alkali for the alkali saponification applying solution, alkali which is dissolved in the above-mentioned solvent is preferred and KOH and NaOH are more preferred. The pH of the saponification applying solution is preferably not lower than 10 and, more preferably, not lower than 12. Reaction condition for the alkali saponification is preferably at room temperature for 1 second to 5 minute, more preferably for 5 seconds to 5 minutes and, particularly preferably, for 20 seconds to 3 minutes. After the alkali saponification reaction, it is preferred that the surface which is applied with a saponifying solution is washed with water or is washed with acid followed by washing with water.

As hereunder, the present invention achieving the aforementioned second object of the present invention will be illustrated in detail.

Thus, in a solution film-forming method where a dope containing cyclic polyolefin polymer and solvent is casted from a casting die onto a support running in an endless manner so that a casted film is formed from the dope on the support and the resulting casted film is peeled as a film, dry wind is applied to the casted film and/or a initial film acting as a formation-initiating film of the film is formed on the surface of the casted film and the surface property of the casted film surface is made flat and smooth by a leveling effect of the initial film.

The latter process as mentioned above is as follows. When the casted film is quickly dried, a film (hereinafter, it will be read as an initial film) on the surface of the casted film. Then, as a result of a leveling effect of the initial film, surface of the initial film is made flat and smooth and, at the same time, growth of the film is promoted to give a casted film which is flat and smooth and has a self-supporting property. It has now been found that a film prepared by drying of the casted film has an excellent surface property. Incidentally, the initial film means a film where drying of the surface of the casted film proceeds whereby amount of volatile matters on the surface are low as compared with the central part thereof. The expression saying flat and smooth means that the maximum difference between high and low areas in film thickness (P–V value) within a range of 60 mm diameter taking any point in the film as a center is not more than 1 μm. More preferably, it is not more than 0.8 μm and, still more preferably, not more than 0.6 μm.

It has been also found that generation of unevenness in stripes and spots on the surface of the casted film is able to be suppressed whereby unevenness of the cyclic polyolefin film is able to be reduced when the time where wind having wind velocity of less than 3 m/s (it is called natural wind) is floated on the surface of the casted film during the stage of blowing of dry wind such as during the period until a ventilation opening is made a predetermined time.

A solution casting method will be illustrated in detail later and, as hereunder, preferred embodiments in the present invention will be illustrated.

The aforementioned initial film is preferred to be formed by application of dry wind to the casted film. Before the dry wind is applied to the casted film, time where wind of 3 m/s or less floats on the surface of the casted film is made preferably not longer than 15 seconds, more preferably not longer than 10 seconds and, most preferably, not longer than 7 seconds.

Wind velocity of the above dry wind is preferably from 3 m/s to 15 m/s, more preferably from 4 m/s to 12 m/s and, most preferably, from 4 m/s to 10 m/s.

It is preferred that the above-mentioned dry wind is hit to the above-mentioned casted film for not shorter than 20 seconds. With regard to the upper limit of the time for hitting the dry wind, there is no particular limitation provided that the volatile solvent component is within such an extent that there is no problem for peeling of the casted film (not less than 10% by mass) and, preferably, it is not longer than 20 minutes.

Gas concentration of the dry wind is preferably not more than 25%, more preferably not more than 20% and, most preferably, not more than 18%. Incidentally, in the present invention, the gas concentration means volatile solvent component in the dry wind measured by an infrared analysis method.

With regard to temperature of the above-mentioned dry wind, it is preferably 40° C. to 120° C., more preferably 45° C. to 110° C. and, most preferably, 50° C. to 100° C.

It is preferred that the above-mentioned dry wind is hit onto the surface of the above-mentioned casted film by means of a slit nozzle or a two-dimensional nozzle.

It is preferred that the drying is carried out under a nitrogen atmosphere. Relative humidity at that time is preferably not more than 10%, more preferably not more than 5% and, particularly preferably, not more than 1%.

The initial film is preferred to start in being formed within 15 seconds from the casted film is formed on the support and it is more preferably within 10 seconds and, most preferably, within 7 seconds.

Residual solvent amount of the casted film when drying of surface of the casted film is started is preferably from 200% by mass to 500% by mass, more preferably from 250% by mass to 450% by mass and, most preferably, from 300% by mass to 420%) by mass on a dry weight basis.

With regard to the thickness of the above-mentioned film after being dried, it is usually within a range of 5 μm to 500 μm and preferably within a range of 30 μm to 150 μm and, particularly for liquid crystal display devices, it is preferably within a range of 40 μm to 110 μm.

With regard to a decreasing speed of the solvent contained in the aforementioned casted film during 30 seconds from the supplying of the aforementioned dry wind, it is preferably 0.1% by mass/s to 50% by mass/s on the dry amount basis, and, more preferably, 0.5% by mass/s to 30% by mass/s.

Viscosity of the aforementioned dope upon casting is preferably 10 Pa·s to 200 Pa·s, more preferably 12 Pa·s to 180 Pa·s and, most preferably, 15 Pa·s to 150 Pa·s.

It is preferred that the aforementioned casting is carried out by means of a co-casting.

Running speed of the aforementioned support is preferably 5 m/minute to 200 m/minute, more preferably 10 m/minute to 180 m/minute and, particularly preferably, 15 m/minute to 150 m/minute.

The present invention will be illustrated in detail as hereunder.

(Solution Casting Method)

Figure 7:
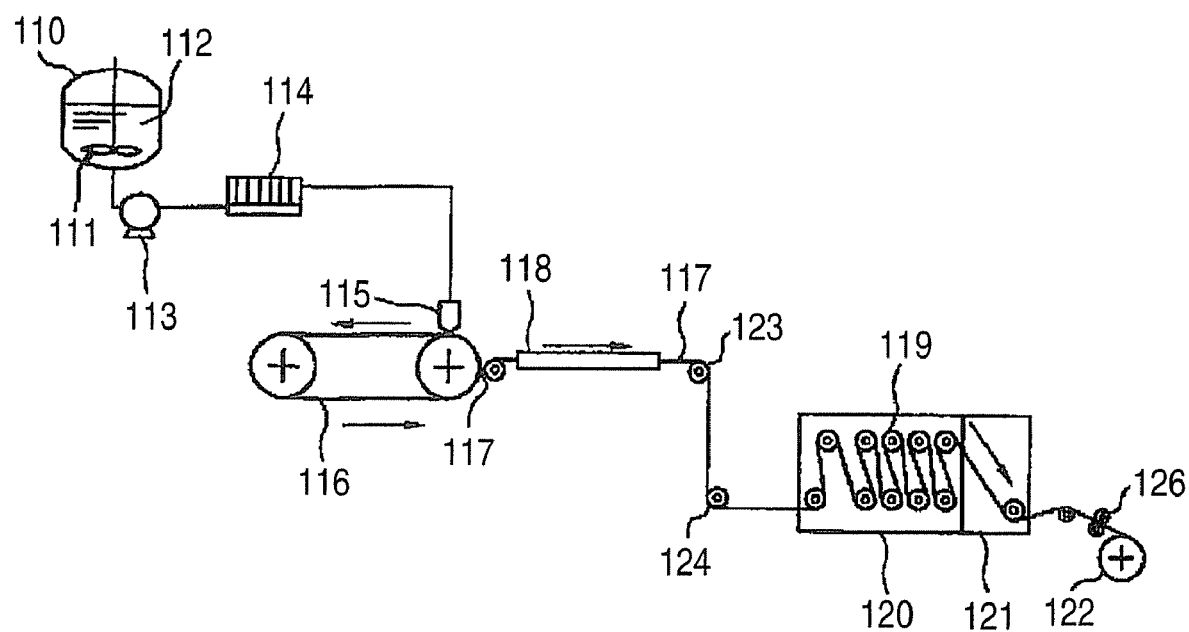
FIG. 7 is an example of the film-forming line of the cyclic polyolefin film of the present invention, wherein 20 denotes a film manufacturing line; 21 denotes a stock tank; 22 denotes a dope.

In the present invention, a cyclic polyolefin solution is used and a cyclic polyolefin film is manufactured using a solution casting method. A solution casting method is excellent in view of flatness and uniformity in film thickness. The solution casting method is particularly preferred in such a respect that film formation is possible even when a cyclic polyolefin polymer where a glass transition temperature (Tg) is as high as 200° C. to 400° C. causing a difficulty in fusion film-forming is used. FIG. 7 shows an example of a film-forming line of a cyclic polyolefin film. Resin of a cyclic polyolefin type and solvent are injected into a mixing tank 110 and stirred with a stirring fan to prepare a dope 112. At that time, the dope 112 may be mixed with additives such as dispersed fine particles, plasticizer and ultraviolet absorber. The dope 112 is sent to a filtering device 114 by a pump 113 and impurities are removed. The dope 112 is further sent to a casting die 115 at a predetermined flow rate and casted onto a belt 116. Solvent is gradually evaporated on the belt 116 which is driven and rotated by a driving device (not shown) whereupon a film 117 is formed. It is also possible to cast on a drum instead of a belt. An art for the manufacture of film of cellulose acylate mentioned in Japanese Patent Laid-Open Nos. 2000/301,555, 2000/301,558, 07/032,391, 03/193,316, 05/086,212, 62/037, 113, 02/276,607, 55/014,101, 01/111,511 and 02/208,650 may be also applied in the present invention.

With regard to a casting method for the solution, there are a method where the prepared dope is uniformly extruded from a pressing die onto a metal support, a method using a doctor blade in which a dope being once casted on a metal support is subjected to adjustment of film thickness by the blade, a method using a reverse roll coater in which adjustment is done by a reversely rotating roll, etc. and a method by a pressing die is preferred. With regard to the pressing die, any of a coat hanger type and a T die type may be preferably used. Besides the methods mentioned hereinabove, various conventionally known methods where cellulose triacetate solution is made into film by casting may be used and, when each condition is set by taking difference in boiling point of the solvent used, etc. into consideration, the same effect as that mentioned in each of the aforementioned patents is able to be achieved. With regard to a metal support running in an endless manner used for the manufacture of cyclic polyolefin film in the present invention, there may be used a drum where its surface is finished into a mirror plane by a chromium plating or a stainless steel belt (may also be called a band) which is made into mirror plane by polishing the surface. With regard to the pressing die using for the manufacture of the cyclic polyolefin film of the present invention, one or more thereof may be installed on the upper part of the metal support. One or two die(s) is/are preferred. When two or more are installed, amount of the casting dope may be divided into each die in various ratios or, from plural precisely quantifying gear pumps, the dope may be sent to the dies in a corresponding ratio. Temperature of the cyclic polyolefin solution used for the casting is preferably −10° C. to 55° C. and, more preferably, 25° C. to 50° C. In that case, it may be the same in all steps or may be different in each passage of the step. If different, it is acceptable when a desired temperature is available immediately before the casting.

With regard to drying of a dope on a metal support concerning the manufacture of a cyclic polyolefin film, there are usually a method where hot wind is hit at the surface side of a metal support (such as drum or band) or, in other words, at a surface of a web located on the metal support, a method where hot wind is hit from the backside of the drum or the band, a liquid heat transmitting method where temperature-controlled liquid is contacted to the backside which is opposite to the casting side of a drop of the band or the drum so that surface temperature is controlled, etc. In the present invention, a method where hot wind is hit to the surface of the web is preferred although other methods are also acceptable or two or more methods may be used together. Surface temperature of the metal support before casting may be any temperature so far as it is not higher than the boiling point of the solvent used for the dope. However, in order to promote the drying or in order to eliminate the fluidity on the metal support, it is preferred to set at the temperature which is lower to an extent of 1° C. to 10° C. from the boiling point of the solvent having the lowest boiling point among the solvents used. That is not however applied to the case where the casting dope is cooled and peeled without drying.

An example of an apparatus which is able to be used for the solution casting film-forming method of the present invention will be shown in FIG. 2.

A method where unevenness in stripes and spots caused by natural wind during the initial stage of the drying is reduced using the method of the present invention will be illustrated in detail although the present invention is not limited to this drawing only.

In order to evaporate the solvent in the casted film 69, a ventilation outlet 70 is installed near the circumference of the casting band 34. As shown in FIG. 2, a labyrinth seal 50 is attached near the casting die 31 in order to suppress the variations of surface state of the casted film 69 by blowing of dry wind to the casted film 69 immediately after casting. Between the labyrinth seal 50 and the ventilation opening 70, a ventilation opening 73 for quick drying (hereinafter, it will be referred to as a ventilation opening for quick drying) is installed. Air-supplying devices 51 are attached to the quick drying ventilation opening 73 and other ventilation openings 70. The quick drying ventilation opening 73 has plural nozzles 73a and, when dry wind 57 is hit to the surface of the casted film 69, an initial film 59a is formed on the surface of the casted film 69. With regard to the nozzles installed in the quick drying ventilation opening 73, there are four in FIG. 2 although the present invention is not limited thereto. Distance between the labyrinth seal 50 and the quick drying ventilation opening 73 is defined as L1 (mm) and its region is called a natural wind region A. Length of the quick drying ventilation opening 73 is defined as L2 (mm). A vacuum device (such as blower of a roots type) 76 is connected to the vacuum chamber 68. Time for hitting the dry wind 57 to the casted film 69 is preferred to be not shorter than 20 seconds. Ventilating time of the dry wind is preferred to be not shorter than 20 seconds in such a view that formation of the initial film 69a proceeds to give a film having a good surface state is produced.

FIG. 3A to 3C are drawings where an example of a ventilation part of a device which is able to be used for a solution casting film-forming method of the present invention is observed from the upper area.

As shown in FIG. 3A to 3C, various modes may be used for the blowing direction of dry wind from a nozzle. For example, as shown in FIG. 3A, dry wind is hit to the central part of the casted film 69 from nozzles 52a, 52b from both ends of the casted film 69. Further, as shown in FIG. 3B, a nozzle 53 is formed at the central part in the width direction of the casted film 69 and dry wind may be hit to both ends from the above-mentioned central part. Furthermore, as shown in FIG. 3C, dry wind may be hit to the casted film 69 to a suction opening 55 from a nozzle 54 of the casted film 59. Incidentally, there is no particular limitation for the shape of the nozzle.

Casted bead is formed from the casting die 31 to the casting band 34 and a casted film 69 is formed on the casted band 34. Temperature of the dope 112 during casting is preferred to be −10° C. to 57° C. In order to stabilize the casting bead, it is preferred that the back side of this casting bead is controlled to a desired pressure value by a vacuum chamber 68. The back side of the bead is preferred to be vacuated as compared with the front side to an extent of −2,000 Pa to −10 Pa. It is also preferred that a jacket (not shown) is attached to the vacuum chamber 68 whereby temperature is controlled so that the inner temperature is kept at a predetermined temperature. Although there is no particular limitation for the temperature of the vacuum chamber 68, it is preferred to be not lower than a condensation point of the organic solvent used. In order to keep the shape of the casting bead in a desired one, it is also preferred to attach a suction device (not shown) at the edge part of the casting die 31. Amount of this edge suction air is preferred to be within a range of 1 L/min to 100 L/min.

The dope 112 forms casting beads from the casting die 31 and casted onto the casting band 34. Viscosity (as measured by a rheometer) of the dope 112 during the casting is preferably 10 Pa·s to 100 Pa·s, more preferably 12 Pa·s to 50 Pa·s and, most preferably, from 15 Pa·s to 40 Pa·s. The casting beads form a casted film 69 on the casting band 34. Incidentally, the position where the casting beads attach to the casting band 34 is called a starting position 34a for the casting. Viscosity of the dope 112 is preferably not less than 10 Pa·s due to the reasons that viscosity is well high, that unevenness by dry wind is hardly resulted, that the surface of the casted film 69 becomes good and that formation of the initial film 69a is easy. The above is preferred also due to the reasons that amount of the solvent contained therein is not too much, that vigorous evaporation of solvent in the initial stage of drying of the casted film 69 is able to be suppressed, that a poor drying (such as foaming) is hardly resulted and that no large equipment for the recovery of solvent is necessary.

The casted film 69 moves together with movement of the casting band 34. Above the casted film 69, wind of nature (hereinafter, it will be referred to as natural wind) is generated. The region after the casting to the stage where dry wind is sent is called a natural wind region A. In the natural wind region A, a labyrinth seal 50 is installed and it prevents a back run of the natural wind 56 in the lower stream to the place near the casting die 31. The natural wind 56 has a wind velocity of less than 3 m/s in the present invention and is usually a weak wind where the velocity is not more than 2 m/s. However, when the natural wind 56 which is a turbulent flow hits the surface of the casted film 69, it results in deterioration of the surface property of the film. Therefore, length L1 (mm) of the natural wind region is to be as short as possible. However, in view of the oriented positions of the devices in the film manufacturing line 20, the length L1 (mm) is preferably not more than 3,000 mm, more preferably not more than 2,000 mm and, still more preferably, not more than 1,000 mm. Time necessary for passing the casted film 69 through the natural wind region is preferably not more than 15 seconds, more preferably not more than 10 seconds and, most preferably, not more than 7 seconds.

After that, the casted film 69 is continuously conveyed to the place where the ventilation opening for quick drying 73 is oriented thereon. Dry wind 57 is blown to the casted film 69 from the nozzle 73a of the ventilation opening for quick drying 73. As a result of being hit by dry wind 57, the casted film 59 forms an initial film 69a on its surface. As a result of a leveling effect of the initial film 69a, surface of the casted film 69 is made flat and smooth and is dried. Incidentally, formation of the initial film 69a in the present invention is not limited to a method where dry wind 57 is applied. Thus, for example, the initial film 69a may be formed by an infrared ray heater, a microwave heating, etc.

Wind velocity of the dry wind 57 is preferably 3 m/s to 15 m/s, more preferably 4 m/s to 12 m/s and, most preferably, 4 m/s to 10 m/s. The wind velocity is preferred to be not less than 3 m/s in view of the outcome that formation of the initial film 69a is smooth and deterioration of surface property of the casted film 69 before formation of initial film is able to be prevented. In addition, in view of the outcome that the dry wind 57 does not hit the casted film 69 too much and the initial film 69a with an excellent surface property is formed, the wind velocity is preferred to be not more than 15 m/s.

Gas concentration in the dry wind 57 is preferably not more than 25%, more preferably not more than 20% and, most preferably, not more than 18%. The term gas concentration used in the present invention means the volatile solvent component in the dry wind 57 as measured by an infrared analytic method. The casted film 69 immediately after its formation contains much amount of solvent. Therefore, the gas concentration in the dry wind 57 is preferred to be not more than 25% in view of the outcome that evaporation of the solvent from the casted film 69 containing much amount of solvent is well quick and formation of the initial film 69a becomes easy.

The above-mentioned drying is preferred to be carried out in a nitrogen atmosphere. Relative humidity at that time is preferably not more than 10%, more preferably not more than 5% and, particularly preferably, not more than 1%.

Temperature of the dry wind is preferably 40° C. to 120° C., more preferably 45° C. to 110° C. and, most preferably, 50° C. to 100° C. The temperature is preferred to be not lower than 40° C. in view of the outcome that evaporation of the solvent from the casted film 69 is apt to proceed whereby formation of the initial film 69a with a good film surface is easy. In addition, the temperature is preferred to be not higher than 120° C. in view of the outcome that there is little risk of sudden evaporation due to foaming of the solvent or the like in a casted film 69 and that formation of the initial film 69a having a good surface property is easy.

In the present invention, time for hitting the natural wind 56 to the casted film 59 is preferably within 15 seconds, more preferably within 10 seconds and, most preferably, within 7 seconds after the casting. It is preferred that the time of hitting the natural wind 56 to the casted film 59 is not more than 15 seconds in view of the outcome that, since it is a quick drying, formation of uneven thickness on the surface of the casted film 69 before formation of the uniform initial film 69a on the surface of the casted film 69 does not take place and a film 82 having uniform surface property is prepared. Further, drying time is short and that is preferred in view of productivity of the film as well.

When a resistance against peeling (peeling load) is big in peeling a semi-dried film form a metal support, the film is irregularly stretched in the direction of film formation to cause an optical unevenness (uneven step by peeling). Especially when a peeling load is high, an area where stretching takes place stepwise and an area where no such an stretching takes place are generated one after another in a direction of film formation whereby distribution is resulted in retardation. When it is installed in a liquid crystal display device, unevenness is noted in lines or in stripes. In order not to cause such a problem, it is preferred that the peeling load of the film is made not more than 0.25N per 1 cm of the peeling width of the film. The peeling load is more preferably not more than 0.2N/cm, still more preferably not more than 0.15N and, particularly preferably, not more than 0.10N. When the peeling load is not more than 0.2N/cm, unevenness caused by peeling is not noted at all even in the case of a liquid crystal display device where unevenness is apt to happen whereby that is particularly preferred. With regard to a method for making the peeling load small, there are a method where a peeling agent is added as mentioned before and a method where solvent composition used is selected. In the case of the present cyclic polyolefin film, the advantage is significant when adding amount of a solvent of an alcohol type is increased.

Measurement of the peeling load is carried out as follows. A dope is dropped onto a metal plate having the same material and surface roughness as those of the metal support of the film-forming device and extended into a uniform thickness using a doctor blade followed by drying. Cuts with uniform width are formed on the film by a cutter knife, front end of the film is peeled by hand and clipped by a clip connected to a strain gauge and changes in the load are measured by pulling up the strain gauge in a direction of 45° obliquely. Volatile matters in the peeled film are also measured. The same measurement is conducted for several times where drying time is changed and the peeling load which is the same time as the residual volatile matters upon peeling in the actual film-forming step is determined. There is a tendency that, when a peeling speed becomes high, the peeling load becomes big and it is preferred to measure at the peeling speed which is near the actual case.

Preferred concentration of the residual volatile matters upon peeling is 20% by mass to 150% by mass. It is more preferably 20% by mass to 120% by mass and, particularly preferably, 20% by mass to 100% by mass. It is preferred to conduct the peeling under high volatile matters in view of the outcome that drying speed is favorable and productivity is improved. On the other hand however, strength and elasticity of the film are small under high volatile matters whereby the product is not resistant to peeling force and is cleaved or stretched. In addition, self-sustaining property after peeling is poor and deformation, wrinkles and clicks are apt to be generated. It also causes a distribution in retardation. Incidentally, volatile matter X on the basis of dry weight of film is calculated by the formula where volatile matter X (%)={(mass (g) of the film sample–B)/B}×100. Mass of the film sample is a value measured by taking out a part of the film before introducing into a tenter as a film sample. B is mass (g) of the sample film after drying in an air constant-temperature chamber at 115° C. for 1 hour.

When the cyclic polyolefin film of the present invention is subjected to an stretching treatment, it is preferred to do that immediately after peeling where solvent still remains sufficiently in the film. Objects of the stretching are (1) to prepare a film having an excellent flatness without wrinkles and deformation and (2) to make the in-plane retardation of the film big. When stretching is carried out with an object of (1), it is preferred that stretching is done at relatively high temperature and that stretching magnification is as low as 1% to 15%. Stretching of 1 to 10% is particularly preferred. When stretching is carried out with objects of both (1) and (2) or with an object of only (2), it is preferred to stretch at relatively low temperature where stretching magnification is 2 to 150%.

When stretching is conducted where solvent still remains in the film, stretching is possible at lower temperature than the dry film. Although cyclic polyolefin contains much polymer having a high glass transition point (Tg), it is able to be stretched at lower temperature than Tg which is specific to the polymer.

Stretching of the film may be either a uniaxial stretching in longitudinal or transverse direction only or a simultaneous or successive biaxial stretching. In double refraction of phase contrast film for VA liquid crystal cell or for OCB liquid crystal cell, the fact that refractive index in the width direction is bigger than that in the longitudinal direction is preferred in view of the outcome that adhesion with polyvinyl alcohol by a roll-to-roll manner is possible. Accordingly, much more stretching in the width stretching is preferred.

Volatile matters in film 117 when the film 117 is introduced into a tenter 118 are preferably 5% by mass to 250% by mass and, particularly preferably, 10% by mass to 120% by mass. When they are more than 250% by mass, a self-supporting property of the film is lost and stretching by the tenter becomes difficult. On the contrary, when they are less than 10% by mass, drying of the film proceeds whereby stretching of the film is difficult.

In the tenter 118, both side rims of the film 117 are clipped by a clip which is not shown and are pulled by a pulling device in the width direction of the film 117 whereby the film 117 is stretched. Although a clip is used in the tenter 118, it is also possible to use a tenter where pin is used instead of the above. Although tension of the film 117 in the width direction during stretching may vary depending upon composition and stretching rate of the film 117, it is preferred to be 250 to 5,000 N/cm$^2$.

As shown in FIG. 7, the film 117 coming out from the tenter 118 is sent to a drying zone 120 by rollers 123, 124, dried together with conveyance with plural rollers 119, cooled down to room temperature by passing through a cooling zone 121 and wound by a winding machine 122. The cyclic polyolefin film is further stretched after drying so as to make the residual volatile matters not more than 2% and then wound. It is also possible to apply knurling on both ends of the film before winding. Preferred width of knurling is 3 mm to 50 mm and, more preferably, 5 mm to 30 mm while height thereof is 1 to 50 μm, preferably 2 to 20 μm and, more preferably, 3 to 10 μm. That may be by a one-side pushing or by a both-side pushing. Protective film or phase contrast film is manufactured using the film 117 which is wound as such.

In the above-mentioned embodiment, a casting die 115 which is used for the formation of film of single-layered film is used but it is also possible to apply the present invention to the case where a plural-layered film is manufactured using a co-casting die of a multi-manifold type. Similarly, it is also possible to use a co-casting die of a feed block type. It is further possible that two casting openings are used and a method where casting is conducted from the second casting die onto a film formed on a support from the first casting die is applied. Incidentally, each casting die uses a coat hanger die although the present invention is not limited thereto but other shape such as T die is also acceptable. It is also possible to use the methods mentioned in Japanese Patent Laid-Open Nos. 61/158,414, 01/122,419 and 11/198,185, Japanese Patent Publication No. 60/027,562, Japanese Patent Laid-Open Nos. 61/094,724, 61/094,725, 61/105,813, 61/158,413, 06/134,933, 56/162,617, 61/094,724 and 61/094,725 and Japanese Patent Publication No. 44/020,235.

(Cyclic Polyolefin Polymer)

In the present invention, the cyclic polyolefin polymer (it may also be referred to as cyclic polyolefin or cyclic polyolefin resin) means a polymer resin having a cyclic olefin structure.

Examples of the polymer resin having a cyclic olefin structure used in the present invention are (1) norbornene polymer, (2) polymer of monocyclic cyclic olefin, (3) polymer of cyclic conjugated diene, (4) vinyl alicyclic hydrocarbon polymer and hydrogenated products of (1) to (4). Polymers which are preferred in the present invention is an addition (co)polymer cyclic polyolefin having at least one repeating unit represented by the following formula (B) and an addition (co) polymer cyclic polyolefin further having at least one repeating unit represented by the following formula (A) if necessary. An open-ring (co)copolymer having at least one repeating unit represented by the formula (C) is also able to be used advantageously.

Formula (A)

Formula (B)

Formula (C)

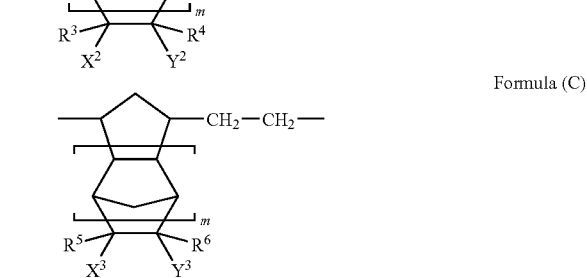

In the formulae, m is an integer of 0 to 4; R$^1$ to R$^6$ each is hydrogen atom or a C$_{1-10}$ hydrocarbon group; X$^1$ to X$^3$ and Y$^1$ to Y$^3$ each is hydrogen atom, a C$_{1-10}$ hydrocarbon group, halogen atom, a C$_{1-10}$ hydrocarbon group substituted with halogen, —(CH$_2$)$_n$COOR$^{11}$, —(CH$_2$)$_n$OCOR$^{12}$, —(CH$_2$)$_n$NCO, —(CH$_2$)$_n$CN, —(CH$_2$)$_n$CONR$^{13}$R$^{14}$, —(CH$_2$)$_n$NR$^{13}$R$^{14}$, —(CH$_2$)$_n$OZ or —(CH$_2$)$_n$W or a group (—CO)$_2$O or (—CO)$^2$NR$^{15}$ constituted from X$^1$ and Y$^1$, X$^2$ and Y$^2$ or X$^3$ and Y$^3$; R$^{11}$, R$^{12}$, R$^{13}$, R$^{14}$ and R$^{15}$ each is hydrogen atom or a C$_{1-10}$ hydrocarbon group; Z is a hydrocarbon group or a hydrocarbon group which is substituted with halogen; W is SiR$^{16}_p$D$_{3-p}$ (R$^{16}$ is a C$_{1-10}$ hydrocarbon group; D is halogen atom, —OCOR$^{16}$ or —OR$^{16}$; and p is an integer of 0 to 3); and n is an integer of 0 to 10.

When a functional group having a high polarizing property is introduced into X$^1$ to X$^3$ and Y$^1$ to Y$^3$, it is possible to make the retardation (Rth) in the thickness direction of an optical film big and to make expressing ability of an in-plane retardation (Re) high. When stretching is conducted during the step of film formation, a film having a big Re expressing property is able to make its Re value big.

As mentioned in Japanese Patent Laid-Open Nos. 01/240, 517, 07/196,736, 60/026,024, 62/019,801, 2003/1,159,767 and 2004/309,979, a hydrogenated product of norbornene polymer is able to be produced by addition polymerization or metathesis ring-opening polymerization of a polycyclic unsaturated compound followed by subjecting to hydrogenation. In the norbornene polymer used in the present invention, $R^5$ to $R^6$ each is preferred to be hydrogen atom or —$CH_3$; $X^3$ and $Y^3$ each is preferred to be hydrogen atom, Cl or —$COOCH_3$; and other groups may be appropriately selected. With regard to the norbornene resin as such, it is sold by JSR with a trade name of Arton G or Arton F and sold by Nippon Zeon with a trade name of Zeonor ZF 14, ZF 16, Zeonex 250 or Zeonex 280 and such ones may be used.

The norbornene (co)polymer is disclosed, for example, in Japanese Patent Laid-Open Nos. 10/007,732 and 2002/504,184, US 2004/4,229,157A and WO 2004/070,463A. It is able to be produced by an addition polymerization of norbornene polycyclic unsaturated compounds. If necessary, it is also possible to conduct an addition polymerization of norbornene polycyclic unsaturated compound with a conjugated diene (such as ethylene, propylene, butane, butadiene or isoprene), a non-conjugated diene (such as ethylidene norbornene) or a linear diene compound (such as acrylonitrile, acrylic acid, methacrylic acid, maleic acid anhydride, acrylate, methacrylate, maleimide, vinyl acetate or vinyl chloride). Such a norbornene addition (co)polymer is sold by Mitsui Chemical with a trade name Apel and there are products with several grades having different glass transition points (Tg) such as APL8008T (Tg 70° C.), APL6013T (Tg 125° C.) or APL6015T (Tg 145° C.). Pellets such as TOPAS 8007, 6013 and 6015 are sold by Polyplastic. Further, Appear 3000 is sold by Ferrania.

Although there is no limitation for the glass transition point (Tg) of the cyclic polyolefin, it is also possible to use a cyclic polyolefin having Tg of as high as 200 to 400° C. for example.

(Fine Particles)

In the present invention, fine particles are able to be added to the above-mentioned cyclic polyolefin resin. As a result of addition of fine particles, dynamic friction coefficient of the film surface lowers whereby stress applied to the film upon film handling is able to be reduced. With regard to the fine particles being able to be used in the present invention, fine particles of organic or inorganic compounds may be used.

With regard to the inorganic compound, preferred ones are silicon-containing compound, silicon dioxide, titanium oxide, zinc oxide, aluminum oxide, barium oxide, zirconium oxide, strontium oxide, antimony oxide, tin oxide, tin antimony oxide, calcium carbonate, talc, clay, calcined kaolin, calcined calcium silicate, hydrated calcium silicate, aluminum silicate, magnesium silicate and calcium phosphate and more preferred ones are a silicon-containing inorganic compound and a metal oxide. Silicon dioxide is used particularly preferably since it is able to reduce the turbidity of the film. With regard to fine particles of silicon dioxide, commercially available products having trade names of, for example, Aerosil R972, R974, R812, 200, 300, R202, OX 50 and TT 600 (manufactured by Nippon Aerosil) are able to be used. With regard to fine particles of zirconium oxide, commercially available products having trade names of, for example, Aerosil R 976 and R 811 (manufactured by Nippon Aerosil) are able to be used.

Examples of the organic compound are polytetrafluoroethylene, cellulose acetate, polystyrene, polymethyl methacrylate, polypropyl methacrylate, polymethyl acrylate, polyethylene carbonate and starch and classified powder thereof may be also listed. It is also possible to use a polymer compound produced by a suspension polymerization method or a polymer compound made into spherical shape by a spray drying method or by a dispersing method.

In view of suppressing the haze low, primary average particle size of those fine particles is preferably 1 to 20,000 nm, more preferably 1 to 10,000 nm, still more preferably 2 to 1,000 nm and, particularly preferably, 5 to 500 nm. Measurement of the primary average particle size of the fine particles is conducted by measuring the average particle size of the particles under a transmission electron microscope. Purchased fine particles are often aggregated and it is preferred to disperse them by a known method before use. It is preferred to make the secondary particle size by dispersing 200 to 1,500 nm and, more preferably, 300 to 1,000 nm. Adding amount of the fine particles to 100 parts by mass of the cyclic polyolefin is preferably 0.01 to 0.3 part by mass, more preferably 0.05 to 0.2 part by mass and, most preferably, 0.08 to 0.12 part by mass.

The range of haze of the cyclic polyolefin film to which the fine particles are added is preferably not more than 2.0%, more preferably not more than 1.2% and, particularly preferably, not more than 0.5%. Dynamic friction coefficient of the cyclic polyolefin film to which the fine particles are added is preferably not more than 0.5 and, particularly preferably, not more than 0.5. The dynamic friction coefficient is able to be measured using a steel ball according to a method stipulated by JIS or ASTM. Haze is able to be measured using a haze meter of type 1001 DP manufactured by Nippon Denshoku Kogyo.

(Solvent)

Now, a solvent in which the cyclic polyolefin of the present invention is dissolved will be mentioned. In the present invention, there is no particular limitation for the solvent used so far as an object is able to be achieved within such a range that the cyclic polyolefin is able to be dissolved, casted and made into film. With regard to the solvent used in the present invention, examples of the preferred ones are those selected from chlorine solvent such as dichloromethane and chloroform and a linear hydrocarbon, cyclic hydrocarbon, aromatic hydrocarbon, ester, ketone and ether having 3 to 12 carbons. The ester, ketone and ether may have a cyclic structure. Examples of the linear hydrocarbon having 3 to 12 carbons are hexane, octane, isooctane and decane. Examples of the cyclic hydrocarbon having 3 to 12 carbons are cyclopentane, cyclohexane and derivatives thereof. Examples of the aromatic hydrocarbon having 3 to 12 carbons are benzene, toluene and xylene. Examples of the ester having 3 to 12 carbons are ethyl formate, propyl formate, pentyl formate, methyl acetate, ethyl acetate and pentyl acetate. Examples of the ketone having 3 to 12 carbons are acetone, methyl ethyl ketone, diethyl ketone, diisobutyl ketone, cyclopentanone, cyclohexanone and methylcyclohexanone. Examples of the ether having 3 to 12 carbons are diisopropyl ether, dimethoxymethane, dimethoxyethane, 1,4-dioxane, 1,3-dioxolane, tetrahydrofuran, anisole and phenetole. Examples of the organic solvent having two or more kinds of functional groups are 2-ethoxyethyl acetate, 2-methoxyethanol and 2-butoxyethanol. Preferred boiling point of the organic solvent is 35° C. to 150° C. With regard to the solvent used in the present invention, two or more kinds of solvents may be used by mixing for adjustment of solution property such as drying property and viscosity. It is also possible to add a poor solvent so far as the cyclic polyolefin is dissolved in the mixed solvent.

Preferred poor solvent is able to be appropriately selected depending upon the polymer species. An alcohol may be advantageously used therefor in case a chlorine organic solvent is used as a good solvent. With regard to the alcohol, it may be preferably either linear, branched or cyclic and, among them, a saturated aliphatic hydrocarbon is preferred. Hydroxyl group of the alcohol may be any of primary to tertiary. Examples of the alcohol include methanol, ethanol, 1-propanol, 2-propanol, 1-butanol, 2-butanol, tert-butanol, 1-pentanol, 2-methyl-2-butanol and cyclohexanol. Fluorine alcohol may be also used as an alcohol. Examples thereof are 2-fluoroethanol, 2,2,2-trifluoroethanol and 2,2,3,3-tetrafluoro-1-propanol. Among the poor solvent, a monohydric alcohol is used particular preferably since it has an effect of reducing the friction resistance. Particularly preferred alcohol varies depending upon the selected good solvent and, when dry load is taken into consideration, an alcohol where boiling point is not higher than 120° C. is preferred, a monohydric alcohol having 1 to 6 carbon(s) is more preferred and an alcohol having 1 to 4 carbon(s) is particularly preferred. The particularly preferred mixed solvent in view of preparation of a cyclic polyolefin solution is a combination where dichloromethane is a main solvent and one or more kind(s) of alcohol(s) selected from methanol, ethanol, propanol, isopropanol and butanol is/are poor solvent(s).

(Additives)

Various additives (such as deterioration preventer, ultraviolet preventer, retardation (optical isomerism) adjusting agent, peeling promoter, plasticizer and infrared absorber) depending upon the use in each preparation step may be added to the cyclic polyolefin solution of the present invention and they may be either solid or oily. Thus, there is no particular limitation for melting and boiling points thereof. Examples are mixing of ultraviolet absorbing materials having melting points of lower than 20° C. and not lower than 20° C. and similar mixing of deterioration preventers. Further, the infrared absorbing dye is mentioned, for example, in Japanese Patent Laid-Open No. 2001/194,522. Timing for the addition thereof may be in any stage in the preparing step for a cyclic polyolefin solution (dope) and it is also possible to add a step where additive is added and prepared to the final preparation step for the dope preparing step. There is no particular limitation for the adding amount of each material so far as the function is achieved. When the cyclic polyolefin film is made from plural layers, type and adding amount of the additive for each of layers may be different.

(Deteriorating Preventer)

Publicly known preventers for deterioration (oxidation) such as antioxidant of a phenol type or a hydroquinone type including 2,6-di-tert-butyl-4-methylphenol, 4,4'-thiobis-(6-tert-butyl-3-methylphenol), 1,1'-bis(4-hydroxyphenyl)-cyclohexane, 2,2'-methylenebis(4-ethyl-6-tert-butylphenol), 2,5-di-tert-butylhydroquinone and pentaerythrityl tetrakis[3-(3,5-di-tert-butyl-4-hydroxyphenyl)propionate may be added to the cyclic polyolefin solution of the present invention. It is also preferred to add an antioxidant of a phosphorus type such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol phosphite and bis(2,4-di-tert-butylphenyl)pentaerythritol phosphite. Adding amount of the antioxidant to 100 parts by mass of the cyclic polyolefin is 0.05 to 5.0 part(s) by mass.

(Ultraviolet Absorber)

In the cyclic polyolefin solution of the present invention, an ultraviolet absorber is preferably used in view of prevention of deterioration of polarizing plate, liquid crystal, etc. With regard to the ultraviolet absorber, that where absorption of visible light of not shorter than 400 nm wavelength is preferably used in view of good absorption of ultraviolet ray of not longer than 370 nm wavelength and good liquid crystal displaying property. Specific examples of the ultraviolet absorber preferably used in the present invention are hindered phenol compound, oxybenzophenone compound, benzotriazole compound, salicylate compound, benzophenone compound, cyanoacrylate compound and nickel complex compound. Examples of the hindered phenol compound are 2,6-di-tert-butyl-p-cresol, pentaerythritol tetrakis[3-(3,5-di-tert-butyl-4-hydroxyphenyl)propionate], N,N'-hexmethylenebis (3,5-di-tert-butyl-4-hydroxy-hydrocinnamide), 1,3,5-trimethyl-2,4,6-tris(3,5-di-tert-butyl-4-hydroxybenzyl) benzene and tris(3,5-di-tert-butyl-4-hydroxybenzyl) isocyanurate. Examples of the benzotriazole compound are 2-(2'-hydroxy-5'-methylphenyl)benzotriazole, 2,4-methylenebis(4-(1,1,3,3-tetramethylbutyl)-6-(2H-benzo-triazole-2-yl)phenol), (2,4-bis(n-octylthio)-6-(4-hydroxy-3,5-dei-tert-butylanilino)-1,3,5-triazine, triethylene glycol bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol and pentaerythritol tetrakis[3-(3,5-di-ter-butyl-4-hydroxyphenyl)propionate]. Adding amount of such an ultraviolet preventer in terms of mass rate to the cyclic polyolefin is preferably 1 ppm to 1.0% and, more preferably, 10 to 1,000 ppm.

(Retardation Expressing Agent)

In order to express a retardation value in the present invention, a compound having at least two aromatic rings is able to be used as a retardation expressing agent. When a retardation expressing agent is used, it is preferred to use within a range of 0.05 to 20 part(s) by mass, more preferably within a range of 0.1 to 10 part(s) by mass, still more preferably within a range of 0.2 to 5 part(s) by mass and, most preferably, within a range of 0.5 to 2 part(s) by mass to 100 parts by mass of the polymer. Two or more kinds of retardation expressing agents may be used jointly.

The retardation expressing agent is preferred to have a maximum absorption within a wavelength region of 250 to 400 nm and is preferred to have substantially no absorption in a visible region.

The "aromatic ring" in this specification includes an aromatic hetero ring in addition to an aromatic hydrocarbon ring. It is particularly preferred that the aromatic hydrocarbon ring is a six-membered ring (i.e., a benzene ring). The aromatic hetero ring is usually an unsaturated hetero ring. The aromatic hetero ring is preferably five-, six- or seven-membered ring and, more preferably, five- or six-membered ring. The aromatic hetero ring usually has the biggest numbers of double bonds. With regard to the hetero atom, preferred ones are nitrogen atom, oxygen atom and sulfur atom and particularly preferred one is nitrogen atom. Examples of the aromatic hetero ring include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring. With regard to the aromatic ring, preferred ones are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring and particularly preferred one is 1,3,5-triazine ring. To be more specific, compounds disclosed in, for example, Japanese Patent Laid-Open No. 2001/166,144 may be used preferably.

Numbers of the aromatic rings in the retardation expressing agent are preferably 2 to 20, more preferably 2 to 8 and, most preferably, 2 to 6. The bonding relationship of the two aromatic rings may be classified into (a) the case where a fused ring is formed, (b) the case where they are bonded by a single bond and (c) the case where they are bonded via a connecting group (no spiro ring is formed because they are aromatic rings). The bonding relationship may be any of (a) to (c).

Examples of the fused ring of (a) (a fused ring of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolidine ring, benzoxazole ring, benzothiazole ring, benzimidazole ring, benzotriazole ring, purine ring, indazole ring, cromene ring, quinoline ring, isoquinoline ring, quinolidine ring, quinazoline ring, cinnoline ring, quinoxaline ring, phthalazine ring, pteridine ring, carbazole ring, acridine ring, phenantrizine ring, xanthene ring, phenazine ring, phenothiazine ring, phenoxathiin ring and phenoxazine ring. Preferred ones are naphthalene ring, azulene ring, indole ring, benzoxazole ring, benzothiazole ring, benzimidazole ring, benzotriazole ring and quinoline ring.

A single bond of (b) is preferred to be a bond between carbon atoms of two aromatic rings. It is also possible that two aromatic rings are formed by two or more single bonds whereby aliphatic ring or non-aromatic hetero ring is formed between the two aromatic rings.

A connecting group of (c) is also preferred to bond to carbon atoms of the two aromatic rings. The connecting group is preferred to be an alkylene group, an alkenylene group, an alkynylene group, —CO—, —O—, —NH—, —S— or a combination thereof. Examples of the connecting group comprising a combination are shown below. Incidentally, the relationship concerning right and left in the following connecting groups may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the connecting group may be substituted. Examples of the substituent include halogen atom (F, Cl, Br and I), hydroxyl group, carboxyl group, cyano group, amino group, nitro group, sulfo group, carbamoyl group, sulfamoyl group, ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group and a non-aromatic heterocyclic group.

Carbon atom number(s) of the alkyl group is/are preferred to be 1 to 8. An aliphatic alkyl group is preferred over a cyclic alkyl group and a straight-chain alkyl group is particularly preferred. The alkyl group may have further substituent (such as hydroxyl group, carboxyl group, an alkoxy group or an alkyl-substituted amino group). Examples of the alkyl group (including the substituted alkyl group) are methyl group, ethyl group, n-butyl group, n-hexyl group, 2-hydroxyethyl group, 4-carboxybutyl group, 2-methoxyethyl group and 2-diethylaminoethyl group.

Carbon atom numbers of the alkenyl group are preferred to be 2 to 8. A linear alkenyl group is preferred over a cyclic alkenyl group and a straight-chain alkenyl group is particularly preferred. The alkenyl group may have further substituent. Examples of the alkenyl group include vinyl group, allyl group and 1-hexenyl group. Carbon atom numbers of the alkynyl group are preferred to be 2 to 8. A linear alkynyl group is preferred over a cyclic alkynyl group and a straight-chain alkynyl group is particularly preferred. The alkynyl group may have further substituent. Examples of the alkynyl group include ethynyl group, 1-butynyl group and 1-hexynyl group.

Carbon atom number(s) of the aliphatic acyl group is/are preferred to be 1 to 10. Examples of the aliphatic acyl group include acetyl group, propanoyl group and butanoyl group. Carbon atom number(s) of the aliphatic acyloxy group is/are preferred to be 1 to 10. Examples of the aliphatic acyl group include acetoxy group. Carbon atom number(s) of the alkoxy group is/are preferred to be 1 to 8. The alkoxy group may have further substituent (such as an alkoxy group). Examples of the alkoxy group (including a substituted alkoxy group) include methoxy group, ethoxy group, butoxy group and methoxyethoxy group. Carbon atom numbers of the alkoxycarbonyl group are preferred to be 2 to 10. Examples of the alkoxycarbonyl group include methoxycarbonyl group and ethoxycarbonyl group.

Carbon atom numbers of the alkoxycarbonylamino group are preferred to be 2 to 10. Examples of the alkoxycarbonylamino group include methoxycarbonylamino group and ethoxycarbonylamino group.

Carbon atom number(s) of the alkylthio group is/are preferred to be 1 to 12. Examples of the alkylthio group include methylthio group, ethylthio group and octylthio group. Carbon atom number(s) of the alkylsulfonyl group is/are preferred to be 1 to 8. Examples of the alkylsulfonyl group include methanesulfonyl group and ethanesulfonyl group. Carbon atom number(s) of the aliphatic amide group is/are preferred to be 1 to 10. Examples of the aliphatic amide group include acetamide group. Carbon atom number(s) of the aliphatic sulfonamide group is/are preferred to be 1 to 8. Examples of the aliphatic sulfonamide group include methanesulfonamide group, butanesulfonamide group and n-octanesulfonamide group. Carbon atom number(s) of the aliphatic substituted amino group is/are preferred to be 1 to 10. Examples of the aliphatic substituted amino group include dimethylamino group, diethylamino group and 2-carboxyethylamino group.

Carbon atom numbers of the aliphatic substituted carbamoyl group are preferred to be 2 to 10. Examples of the aliphatic substituted carbamoyl group include methylcarbamoyl group and diethylcarbamoyl group. Carbon atom number(s) of the aliphatic substituted sulfamoyl group is/are preferred to be 1 to 10. Examples of the aliphatic substituted sulfamoyl group include methylsulfamoyl group and diethylsulfamoyl group. Carbon atom numbers of the aliphatic substituted ureido group are preferred to be 2 to 10. Examples of the aliphatic substituted ureido group include methylureido group.

Examples of the non-aromatic heterocyclic group include piperidino group and morpholino group. Molecular weight of a retardation expressing agent is preferred to be 300 to 800.

In the present invention, a rod-shaped compound having a linear molecular structure is also able to be preferably used in addition to the compound using a 1,3,5-triazine ring. A linear molecular structure means that, in the thermodynamically most stable structure, molecular structure of a rod-shaped compound is linear. The thermodynamically most stable structure is able to be determined by analysis of crystal structure analysis or by calculation of molecular orbit. For example, when calculation of molecular orbit is conducted using a molecular orbit calculation software (such as Win MOPAC 2000; manufactured by Fujitsu), it is possible to determine the structure of molecule by which heat of formation of a compound is the smallest. The expression that the molecular structure is linear means that, in the thermodynamically most stable structure determined by the calculation as above, the angle constituted by main chain in the molecular structure is 140° or more.

With regard to a rod-shaped compound having at least two aromatic rings, a compound represented by the following formula (D) is preferred.

  $Ar^1$-$L^1$-$Ar^2$     Formula (D)

In the formula (D), $Ar^1$ and $Ar^2$ each independently is an aromatic group. In this specification, an aromatic group includes an aryl group (an aromatic hydrocarbon group), a substituted aryl group, an aromatic heterocyclic group and a substituted aromatic heterocyclic group. Aryl group and substituted aryl group are preferred over aromatic heterocyclic group and substituted aromatic heterocyclic group. Hetero ring in the aromatic heterocyclic group is usually unsaturated. The aromatic hetero ring is preferably five-membered ring, six-membered ring or seven-membered ring and, more preferably, five-membered ring or six-membered ring. The aromatic hetero ring has usually largest numbers of double bonds. The hetero atom is preferably nitrogen atom, oxygen atom or sulfur atom and, more preferably, nitrogen atom or sulfur atom. The aromatic ring of the aromatic group is preferably benzene ring, furan ring, thiophene ring, pyrrole ring, oxazole ring, thiazole ring, imidazole ring, imidazole ring, triazole ring, pyridine ring, pyrimidine ring and pyrazine ring and, particularly preferably, benzene ring.

In the formula (D), $L^1$ is a divalent connecting group selected from the group consisting of an alkylene group, an alkenylene group, an alkynylene group, —O—, —CO— and a combination thereof. The alkylene group may have a ring structure. The cyclic alkylene is preferably cyclohexylene group and, particularly preferably, 1,4-cyclohexylene group. With regard to a linear alkylene group, a straight-chain alkylene group is preferred over a branched alkylene group. Carbon atom number(s) of the alkylene group is/are preferably 1 to 20, more preferably 1 to 15, still more preferably 1 to 10, far more preferably 1 to 8 and, most preferably, 1 to 6.

With regard to the alkenylene group and the alkynylene group, that having a linear structure is preferred over that having a cyclic structure and that having a straight chain structure is more preferred over that having a branched chain structure. Carbon atom numbers of the alkenylene group and the alkynylene group are preferably 2 to 10, more preferably 2 to 8, still more preferably 2 to 6, far more preferably 2 to 4 and, most preferably, 2 (vinylene or ethynylene). Carbon numbers of the arylene group are preferably 6 to 20, more preferably 6 to 16 and, still more preferably, 6 to 12. In the molecular structure of the formula (D), angle formed by $Ar^1$ and $Ar^2$ via $L^1$ is preferred to be 140° or more.

With regard to a rod-shaped compound, the compound represented by the following formula (E) is more preferred.

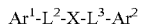 $Ar^1$-$L^2$-X-$L^3$-$Ar^2$     Formula (E)

In the above formula (E), $Ar^1$ and $Ar^2$ each independently is an aromatic group. Definition and examples of the aromatic group are the same as those for $Ar^1$ and $Ar^2$ of the formula (D).

In the formula (E), $L^2$ and $L^3$ each independently is a divalent connecting group selected from the group consisting of an alkylene group, —O—, —CO— and a combination thereof. With regard to the alkylene group, that having a linear structure is preferred over that having a ring structure and that having a straight chain structure is preferred over that having a branched chain structure. Carbon atom number(s) of the alkylene group is/are preferably 1 to 10, more preferably 1 to 8, still more preferably 1 to 6, far more preferably 1 to 4 and, most preferably, 1 or 2 (methylene or ethylene). $L^2$ and $L^3$ are particularly preferably —O—CO— or —CO—O—. In the formula (E), X is 1,4-cyclohexylene, vinylene or ethynylene. Two or more kinds of rod-shaped compounds where maximum absorption wavelength (λ max) in an ultraviolet absorption spectrum of the solution is in shorter wavelength than 250 nm may be used jointly. Adding amount of the retardation expressing agent to the amount of the cyclic polyolefin is preferably 0.1 to 30% by mass or, more preferably, 0.5 to 20% by mass.

(Peeling Promoter)

With regard to additives which make the peeling resistance of the cyclic polyolefin film small, those having a significant effect have been abundantly found in surfactants. As to the preferred peeling agent, surfactant of a phosphate type, surfactant of a carboxylic acid or carboxylate type, surfactant of a sulfonic acid or sulfonate type and surfactant of a sulfate type are effective. Surfactant of a fluorine type where a part of hydrogen atoms connecting to hydrocarbon chain of the above-mentioned surfactant is substituted with fluorine atom is also effective. The peeling agent will be exemplified as hereunder.

RZ-1: $C_8H_{17}O$—P(=O)—$(OH)_2$
RZ-2: $C_{12}H_{25}O$—P(=O)—$(OK)_2$
RZ-3: $C_{12}H_{25}OCH_2CH_2O$—P(=O)—$(OK)_2$
RZ-4: $C_{15}H_{31}(OCH_2CH_2)_5O$—P(=O)—$(OK)_2$
RZ-5: $\{C_{12}H_{25}O(CH_2CH_2O)_5\}_2$—P(=O)—OH
RZ-6: $\{C_{18}H_{35}(OCH_2CH_2)_8O\}_2$—P(=O)—$ONH_4$
RZ-7: (tert-$C_4H_9$)$_3$—$C_6H_2$—$OCH_2CH_2O$—P(=O)—$(OK)_2$
RZ-8: (iso-$C_9H_{19}$—$C_6H_4$—O—$(CH_2CH_2O)_5$—P(=O)—(OK)(OH)
RZ-9: $C_{12}H_{25}SO_3Na$
RZ-10: $C_{12}H_{25}OSO_3Na$
RZ-11: $C_{17}H_{33}COOH$
RZ-12: $C_{17}H_{33}COOH.N(CH_2CH_2OH)_3$
RZ-13: iso-$C_8H_{17}$—$C_6H_4$—O—$(CH_2CH_2O)_3$—$(CH_2)_2SO_3Na$
RZ-14: (iso-$C_9H_{19}$)$_2$—$C_6H_3$—O—$(CH_2CH_2O)_3$—$(CH_2)_4SO_3Na$
RZ-15: Sodium triisopropylnaphthalenesulfonate
RZ-16: Sodium tri-tert-butylnaphthalenesulfonate
RZ-17: $C_{17}H_{33}CON(CH_3)CH_2CH_2SO_3Na$
RZ-18: $C_{12}H_{25}$—$C_6H_4SO_3.NH_4$ Adding amount of the peeling promoter to the cyclic polyolefin is preferably 0.05 to 5% by mass, more preferably 0.1 to 2% by mass and, most preferably, 0.1 to 0.5% by mass.

(Plasticizer)

Generally, the cyclic polyolefin resin is less soft and flexible as compared with cellulose acetate and, when bending stress or shear stress is applied to a film, cracks or the like are apt to be generated in the film. When making into an optical film, cracks are apt to be formed in the cut area and scraps are apt to be generated. The generated scraps pollute the optical film and cause an optical deficiency. In order to improve such problems, a plasticizer is able to be added. Specific examples thereof are compounds of a phthalate type, a trimellitate type, an aliphatic dibasic acid ester type, an orthophosphoric acid type, an acetate type, a polyester epoxylated ester type, a ricinolate type, a polyolefin type and a polyethylene glycol type.

The plasticizer which is able to be used is preferred to be selected from compounds which are liquid at ambient temperature and ordinary pressure boiling at not lower than 200° C. With regard to specific compound names, the followings may be exemplified. Thus, examples of an aliphatic dibasic acid ester type are dioctyl adipate (230° C./760 mmHg), dibutyl adipate (145° C./4 mmHg), di-2-ethylhexyl adipate (335° C./760 mmHg), dibutyl diglycol adipate (130 to 240° C./2 mmHg), di-2-ethylhexyl azelate (220 to 245° C./4 mmHg) and di-2-ethylhexyl sebacate (377° C./760 mmHg); examples of a phthalate type are diethyl phthalate (298° C./760 mmHg), diheptyl phthalate (235 to 245° C./10 mmHg), di-n-octyl phthalate (210° C./760 mmHg) and diisodecyl phthalate (420° C./760 mmHg); and examples of a polyolefin type are paraffin wax (average molecular weight: 330 to 600; melting point: 45 to 80° C.; such as normal paraffin, isoparaffin and cycloparaffin, liquid paraffin (JIS K2231 ISO VG 8, VG 15, VG 32, VG 68, VG 100, etc.), paraffin pellets (melting points: 56 to 58° C., 58 to 60° C., 60 to 62° C., etc.), chlorinated paraffin, low-molecular polyethylene, low-molecular polypropylene, low-molecular polyisobutene, hydrogenated polybutadiene, hydrogenated polyisoprene and squalane.

Adding amount of the plasticizer to the cyclic polyolefin resin is 0.5 to 40% by mass, preferably 1.0 to 30.0% by mass and, more preferably, 3.0 to 20.0% by mass. When the amount of the plasticizer is less than the above, a plasticizing effect is insufficient and processing adaptability is not improved. When it is more than that, there may be the case where the plasticizer is separated and eluted whereupon optical unevenness, pollution to other parts, etc. are generated and that is not preferred.

(Preparation of a Dope)

With regard to the preparation of the cyclic polyolefin solution (dope) of the present invention, there are a method by stirring and dissolving at room temperature, a method where polymer is swollen by stirring at room temperature, then cooled down to −20° C. to −100° C. and heated again up to 20° C. to 100° C. to dissolve, a dissolving method at high temperature where dissolving is conducted at the temperature of not lower than the boiling point of the main solvent in a tightly closed container, a method where dissolving is conducted at high temperature up to critical point of the solvent under high pressure, etc. In the case of a polymer having a good solubility, dissolving at room temperature is preferred while, in the case of a polymer having a poor solubility, it is preferred to dissolve by heating in a tightly closed container. When dichloromethane is selected as a main solvent, many cyclic polyolefins are able to be dissolved by heating at 20° C. to 100° C.

Viscosity of the cyclic polyolefin of the present invention is preferred to be within a range of 1 Pa·s to 500 Pa·s at 25° C. More preferably, it is within a range of 5 Pa·s to 200 Pa·s. Measurement of viscosity was conducted as follows. Thus, 1 mL of a sample solution was measured using steel cone of 4 cm diameter/20 directly with a rheometer (CLS 500) (both manufactured by TA Instruments). Measurement was started after the sample solution was previously kept warm until constant liquid temperature is achieved at the temperature for the initiation of the measurement.

In order to dissolve more easily, it is acceptable to concentrate using a concentrating means. Although there is no particular limitation for a method of concentration, it is conducted, for example, by a method where a solution of low concentration is introduced between a pipe and a rotating locus of outer circumference of rotating fan which rotates in the circumferential direction of the inner part thereof and, at the same time, difference in temperature is applied to the solution and the solvent is evaporated to give a solution of high concentration (e.g., Japanese Patent Laid-Open No. 04/259,511) and a method where heated solution in low concentration is blown into a container from a nozzle, the solvent is subjected to a flash evaporation until it hits the inner wall of the container from a nozzle and, at the same time, solvent vapor is taken out from the container to take out the solution in high concentration from the bottom of the container (a method mentioned, for example, in U.S. Pat. Nos. 2,541,012, 2,858,229, 4,414,341 and 4,504,355).

Before casting, it is preferred that foreign matters such as non-dissolved things, trash and impurities are removed by filtration from the solution using an appropriate filtering material such as wire gauze or flannel. For the filtration of a cyclic polyolefin solution, a filter having an absolute filtering precision of 0.1 µm to 100 µm is preferably used and, more preferably, a filter having an absolute filtering precision of 0.5 µm to 25 µm is used. Thickness of the filter is preferably 0.1 mm to 10 mm and, more preferably, 0.2 mm to 2 mm. In that case, filtration is conducted with a filtering pressure of preferably not higher than 1.6 MPa, more preferably not higher than 1.3 MPa, still more preferably not higher than 1.0 MPa and, particularly preferably, not higher than 0.6 MPa. With regard to the filtering material, conventionally known materials such as glass fiber, cellulose fiber, filter paper and fluorine resin including ethylene tetrafluoride resin may be preferably used and ceramics, metal, etc. may be also used preferably.

Viscosity of the cyclic polyolefin solution immediately before formation of the film may be within such a range that casting is possible upon manufacture of film and, usually, it is preferably prepared within a range of 5 Pa·s to 1,000 Pa·s, more preferably 15 Pa·s to 500 Pa·s and, still more preferably, 30 Pa·s to 200 Pa·s. Although the temperature at that time is not particularly limited so far as the temperature upon casting, it is preferably −5° C. to 70° C. and, more preferably, −5° C. to 35° C.

(Thickness of Cyclic Polyolefin Film)

Thickness of the finished (after being dried) cyclic polyolefin film of the present invention varies depending upon the object of use and it is usually within a range of 5 µm to 500 µm and preferably within a range of 30 µm to 150 µm. Particularly for liquid crystal display devices, it is preferred to be 40 µm to 110 µm.

Adjustment of thickness of the film is conducted in such a manner that solid concentration contained in the dope, slit interval of cap of the die, pushing pressure from the die, speed of the metal support, etc. are adjusted so that desired thickness and the thickness distribution of the present invention are achieved. Width of the cyclic polyolefin film prepared as such is preferably 0.5 µm to 3 m, more preferably 0.6 µm to 2.5 m and, still more preferably, 0.8 µm to 2.2 m. With regard to the length, it is preferred to wind at 100 m to 10,000 m, more preferably at 500 in to 7,000 m and, still more preferably, at 1,000 m to 6,000 m per roll. Dispersion of Re values as a whole is preferably ±5 nm and, more preferably, ±3 nm. Dispersion of Rth values is preferably ±10 nm and, still more preferably, ±5 nm. Dispersion of Rth values and Re values in the longitudinal direction is also preferred to be within a range of dispersion in the width direction.

(Optical Characteristics of Cyclic Polyolefin Film)

Preferred optical characteristics of the cyclic polyolefin film of the present invention vary depending upon the use of the film. When it is used as a protective film for polarizing plate, in-plane retardation (Re) is preferably not more than 5 nm and, more preferably, not more than 3 nm. Retardation in the width direction (Rth) is preferably not more than 50 nm, more preferably not more than 35 nm and, particularly preferably, not more than 10 nm.

When the cyclic polyolefin film is used as an optical compensation film (phase contrast film), ranges of Re and Rth vary depending upon the type of the phase contrast film and various needs are available. It is however preferred that 0 nm$\leq$Re$\leq$100 nm and 40 nm$\leq$Rth$\leq$400 nm. In the case of a TN mode, 0 nm$\leq$Re$\leq$20 nm and 40 nm$\leq$Rth$\leq$80 nm are more preferred while, in the case of a VA mode, 20 nm$\leq$Re$\leq$80 nm and 80 nm$\leq$Rth$\leq$400 nm are more preferred. Particularly preferred range in a VA mode is 30 nm$\leq$Re$\leq$75 nm and 120 nm$\leq$Rth$\leq$250 nm. When compensation is done by one sheet of phase contrast film or by two sheets of phase contrast films, the ranges where 50 nm$\leq$Re$\leq$75 nm and 180 nm$\leq$Rth$\leq$250 nm and the ranges where 30 nm$\leq$Re$\leq$50 nm and 80 nm$\leq$Rth$\leq$140 nm, respectively are more preferred embodiments in the case of compensation film of a VA mode in view of color shift upon black display and of visual angle dependency of contrast.

The cyclic polyolefin film of the present invention is able to achieve desired optical characteristics when step conditions such as polymer structure used, type and adding amount of additives, stretching ratio and residual volatile substances upon peeling are appropriately adjusted. For example, when residual volatile matters upon peeling are adjusted to within a range of 40 to 85% by weight, it is possible to broadly control the Rth which is the retardation in the thickness direction to an extent of 180 to 300 nm. Generally, the more the residual volatile matters upon peeling, the smaller the Rth while, the less the residual volatile matters upon peeling, the more the Rth. For example, when drying time on a metal support is made short and residual volatile matters upon peeling are made much, it is able to be freely conducted to moderate the surface orientation and to lower the Rth and, when the step conditions are adjusted, it is possible to express various retardations corresponding to various uses.

[Retardations, Re and Rth]

In this specification, Re and Rth show retardation in the face and retardation in the direction of thickness, respectively, at the wavelength of $\lambda$. Re is measured by incidence of light of wavelength of $\lambda$ nm into the direction of normal line of the film in Kobra 21 ADH (manufactured by Oji Keisoku Kiki K. K.). Rth is calculated by Kobra 21 ADH on the basis of retardation values measured in three directions [i.e., the aforementioned Re; a retardation value measured by incidence of light of wavelength of $\lambda$ nm in a direction inclined to an extent of +40° to the direction of normal line of the film where inclining axis (rotation axis) which is a retardation phase axis (being able to be judged by Kobra 21 ADH) in the face; and a retardation value measured by incidence of light of wavelength of $\lambda$ nm in a direction inclined to an extent of −40° to the direction of normal line of the film where inclining axis (rotation axis) which is a retardation phase axis in the face]. With regard to the presumed value for average refractive index used hereinabove, value of "Polymer Handbook" (John Wiley & Sons, Inc.) and value of catalogs of various kinds of optical films may be used. In case the value of an average refractive index is unknown, it is able to be measured by Abbe's refractometer. When presumed values of refractive index as such and film thickness are inputted, Kobra 21 ADH calculates nx, ny and nz.

(Polarizing Plate)

A polarizing plate usually has a polarizer and two transparent protective films placed on both sides thereof. The cellulose ester film of the present invention is able to be used as both or one of the protective films. Common cellulose acetate film, etc. may be used for another protective film. Examples of a polarizer are iodine-type polarizer, dye-type polarizer using a dichromatic dye and polyene-type polarizer. Iodine-type polarizer and dye-type polarizer are usually manufactured using a film of a polyvinyl alcohol type. When the cellulose ester film of the present invention is used as a protective film for a polarizer, it is preferred that the film is subjected to a surface treatment which will be mentioned later and then the treated surface of the film and a polarizer are adhered using an adhesive. Examples of an adhesive used therefor are an adhesive of a polyvinyl alcohol type such as polyvinyl alcohol, polyvinyl butyral and a latex of a vinyl type such as butyl acrylate and gelatin. A polarizing plate is composed of a polarizer and protective films which protect the both sides thereof and, further, one side of the polarizing plate is adhered with a protective film while another side is adhered with a separate film. The protective film and the separate film are used with an object of protecting the polarizing plate during shipping, product inspection, etc. of the polarizing plate. In that case, the protective film is adhered with an object of protecting the surface of the polarizing plate and is used for a side which is opposite to the side where the polarizing plate is adhered to the liquid crystal plate. The separate film is used with an object of covering the adhesive layer adhering to the liquid crystal plate and is used on the surface where the polarizing plate is adhered to the liquid crystal plate.

With regard to a method of adhering the cellulose ester film of the present invention to a polarizer, it is preferred to adhere in such a manner that a transmission axis of the polarizer and a retardation phase axis of the cyclic polyolefin film of the present invention coincide. When a polarizing plate prepared under a polarizer crossed nicol is evaluated, it has been found that, in case an orthogonal precision of a retardation phase axis of the cyclic polyolefin film of the present invention with an absorption axis (an axis being orthogonal to a transmittance axis) of a polarizer is more than 1°, polarization degree property under a polarizing plate crossed nicol lowers resulting in light omission. In that case, when it is combined with liquid crystal cell, sufficient black level and contrast are not available. Accordingly, difference between the direction of main refractive index nx of the cyclic polyolefin film of the present invention and the direction of transmittance axis of a polarizing plate is preferably within 1° and, more preferably, within 0.5°.

In the measurement of single plate transmittance (TT), parallel transmittance (PT) and crosswise transmittance (CT), UV 3100 PC (manufactured by Shimadzu) may be used. In the measurement, a range within 380 nm to 780 nm is measured and, in all of single plate, parallel and crosswise transmittances, a mean value of ten measurements may be used.

A durability test of the polarizing plate is able to be carried out as follows in such two modes where (1) there is only a polarizing plate and (2) a polarizing plate is adhered to glass using an adhesive. In the measurement of a polarizing plate only, an optical compensation film is combined in such a manner that it is sandwiched between two polarizers and crossed and measurement is conducted after preparing the same two things. In the case of the state being adhered to glass, two samples (about 5 cm×5 cm) where polarizing plate is adhered on glass in such a manner that an optical compensation film comes to the side of the glass were prepared. In the measurement of single plate transmittance, the film side of this sample is set by turning it to light source and measurement is conducted. Each of the two samples was measured and a mean value thereof is used as a transmittance of single plate. Preferred ranges of the polarizing property in the order of single plate transmittance (TT), parallel transmittance (PT) and crosswise transmittance (CT) are $40.5 \leq TT \leq 45$, $32 \leq PT \leq 39.5$ and $CT \leq 1.5$ and more preferred ranges are $41.0 \leq TT \leq 44.5$, $34 \leq PT \leq 39.0$ and $CT \leq 1.3$. In the durability test of polarizing plate, the less the changing value, the better.

(Surface Treatment of Cyclic Polyolefin Film)

In order to improve the adhesive property of a polarizer to a protective film in the present invention, it is preferred to subject the surface of the cyclic polyolefin protective film to a surface treatment. With regard to the surface treatment, any method may be used so far as an adhesive property is able to be improved and examples of the preferred surface treatment are glow charge treatment, ultraviolet irradiation treatment, corona treatment and flame treatment. The glow discharge treatment mentioned hereinabove is the so-called low-temperature plasma which takes place under low-pressure gas. In the present invention, a plasma treatment under ordinary pressure is also preferred. Details of the glow discharge treatment are mentioned in the specifications of U.S. Pat. Nos. 3,462,335, 3,761,299 and 4,072,769 and British Patent No. 891,469. It is also possible to use a method mentioned in Japanese Patent Laid-Open No. 59/556,430 where an atmospheric gas composition for discharge is only gas species generated in a container when the polyester support itself is subjected to a discharge treatment after initiation of discharge. In conducting a vacuum glow discharge treatment, it is also possible to use a method mentioned in Japanese Patent Publication No. 60/016,614 where discharge treatment is conducted when surface temperature of the film is made 80° C. to 180° C.

Degree of vacuum upon a glow discharge treatment is preferably 0.5 Pa to 3,000 Pa and, more preferably, 2 Pa to 300 Pa. Voltage is preferably between 500 V and 5,000 V and, more preferably, 500 V to 3,000 V. Discharge frequency used is from direct current to several thousand MHz, more preferably 50 Hz to 20 MHz and, still more preferably, 1 KHz to 1 MHz. Discharge treatment intensity is preferably 0.01 KV.A.min/m$^2$ to 5 KV.A.min/m$^2$ and, more preferably, 0.15 KV.A.min/m$^2$ to 1 KV.A.min/m$^2$.

In the present invention, it is also preferred to conduct an ultraviolet irradiation method as a surface treatment. For example, it is able to be carried out by a treating method mentioned in Japanese Patent Publication Nos. 43/002,603, 43/002,604 and 45/003,828. A mercury lamp is preferred to be a high-voltage mercury lamp comprising a quartz tube where wavelength of ultraviolet ray is between 180 and 380 nm. With regard to a method for irradiation of ultraviolet ray, a high-voltage mercury light lamp where main wavelength is 365 nm may be used as a light source provided that a raise of surface temperature of a protective film up to around 150° C. causes no problem in terms of property of the support. When a low-temperature treatment is necessary, a low-voltage mercury lamp where main wavelength is 254 nm is preferred. It is also possible to use a high-voltage mercury lamp of a type where non zone is used and a low-voltage mercury lamp. With regard to treating light quantity, adhesive force of the polymer resin film containing a thermoplastic saturated alicyclic structure with the polarizer is improved when the treating light becomes more although there is a problem that, as the light quantity increases, said film is colored and also becomes fragile. Accordingly, a high-voltage mercury lamp where 365 nm is a main wavelength and irradiation light quantity is 20 mJ/cm$^2$ to 10,000 mJ/cm$^2$ is preferred and 50 mJ/cm$^2$ to 2,000 mJ/cm$^2$ is more preferred. In the case of a low-voltage mercury lamp where 254 nm is a main wavelength, the irradiation light quantity is preferably 100 mJ/cm$^2$ to 10,000 mJ/cm$^2$ and, more preferably, 300 mJ/cm$^2$ to 1,50,000 mJ/cm$^2$.

It is also preferred in the present invention to conduct a corona discharge treatment as a surface treatment. It is able to be carried out by a method mentioned, for example, in Japanese Patent Publication No. 39/012,838 and Japanese Patent Laid-Open Nos. 47/019,824, 48/028,067 and 52/042,114. With regard to a corona discharge treatment device, there may be used, for example, a solid state corona treating machine, a surface treating machine of a Lepel type, a treating machine of a Vetaphon type manufactured by Pillar. The treatment is able to be carried out under ordinary pressure in air. Discharge frequency during the treatment is 5 KV to 40 KV and, more preferably, 10 KV to 30 KV. Wave shape is preferred to be a countercurrent sine wave. Gap transparent lance of electrode and dielectric roll is 0.1 mm to 10 mm and, more preferably, 1.0 mm to 2.0 mm. Discharge is treated at the upper area of a dielectric support roller located in a discharge zone and treating amount is 0.34 KV.A.min/m$^2$ to 0.4 KV.A.min/m$^2$ and, more preferably, 0.344 KV.A.min/m$^2$ to 0.38 KV.A.min/m$^2$.

It is also preferred in the present invention to conduct a flame treatment as a surface treatment. Although the gas used may be any of natural gas, liquid propane gas and city gas, a mixing ratio to air is important. Because effect of surface treatment by flame treatment is believed to be resulted by plasma containing active oxygen and it is an important point that how much oxygen and plasma activity (temperature) which are important properties of flame are present. The governing factor for the point is the ratio of gas/oxygen and, when the reaction takes place neither excessively nor insufficiently, energy density becomes highest and plasma activity becomes high. To be more specific, a mixing ratio by volume of natural gas/air is preferably from 1/6 to 1/10 and, more preferably, from 1/7 to 1/9. In the case of liquid propane gas/air, it is from 1/14 to 1/22 and, preferably, from 1/16 to 1/19 while, in the case of city gas/air, it is from 1/2 to 1/8 and, preferably, from 1/3 to 1/7. Flame treating amount is within a range of from 1 Kcal/m$^2$ to 50 Kcal/m$^2$ and, more preferably, from 3 Kcal/m$^2$ to 20 Kcal/m$^2$. Distance between the front end of the inner flame of a burner and the film is made preferably 3 cm to 7 cm and, more preferably, 4 cm to 6 cm. Shape of nozzle of a burner is preferred to be a ribbon type of Flinburner (U.S.A.), a multiporous type of Wise (U.S.A.), a ribbon type of Aerogen (U. K.), a zigzag multiporous type of Kasuga Denki (Japan) and a zigzag multiporous type of Koike Sanso (Japan). A backup roll which supports the film in the flame treatment is a hollow roll and is preferred to be cooled with cooling water whereby a treatment at constant temperature of 20° C. to 50° C. at all times is preferred.

With regard to the degree of the surface treatment, although its preferred range varies depending upon the type of the surface treatment and the type of the cyclic polyolefin, it is preferred that, as a result of the surface treatment, contact angle of pure water to the protective film surface which is subjected to the surface treatment is less than 50°. Said angle of contact is more preferably from 25° to less than 45°. When the angle of contact of the protective film surface to pure water is within the above-mentioned range, adhesive strength of the protective film with the polarizing film becomes good.

(Adhesive)

When a polarizer comprising polyvinyl alcohol is adhered to a protective film comprising a surface-treated cyclic polyolefin, it is preferred to use an adhesive containing a water-soluble polymer. With regard to a water-soluble polymer which is preferably used in the above-mentioned adhesive, there may be listed homopolymers or copolymers having ethylenic unsaturated monomers such as N-vinylpyrrolidone, acrylic acid, methacrylic acid, maleic acid, (3-hydroxyethyl acrylate, β-hydroxyethyl methacrylate, vinyl alcohol, methyl vinyl ether, vinyl acetate, acrylamide, methacrylamide, diacetone acrylamide and vinylimidazole or polyoxyethylene, polyoxypropylene, poly-2-methyloxazoline, methyl cellulose, hydroxyethyl cellulose, hydroxypropyl cellulose, gelatin, etc. In the present invention, PVA and gelatin are preferred among the above.

Preferred PVA characteristic when PVA is used as an adhesive is the same as the preferred characteristic of the aforementioned PVA used for polarizer. In the present invention, it is also preferred to use together with a cross-linking agent. Examples of the cross-linking agent which is preferably used together when PVA is used as an adhesive are boric acid, polyvalent aldehyde, polyfunctional isocyanate compound and polyfunctional epoxy compound and, in the present invention, boric acid is particularly preferred. When gelatin is used as an adhesive, it is possible to use the so-called lime-treated gelatin, acid-treated gelatin, enzyme-treated gelatin, gelatin derivative and modified gelatin. Among those gelatins, preferably used ones are lime-treated gelatin and acid-treated gelatin. When gelatin is used as an adhesive, examples of cross-linking agent which is preferably used together are active halogen compound (such as 2,4-dichloro-6-hydroxy-1,3,5-trazine and sodium salt thereof), active vinyl compound (such as 1,3-bisvinylsulfonyl-2-propanol, 1,2-bis(vinylsulfonyl acetamide)ethane, bis(vinylsulfonylmethyl)ether or a vinyl polymer having a vinylsulfonyl group in a side chain), N-carbamoylpyridinium salt (such as (1-morpholinocarbonyl-3-pyridinio)methane sulfonate) and haloamidinium salt (such as 1-(1-chloro-1-pyridinomethylene)pyrrolidium 2-naphthalenesulfonate). In the present invention, active halogen compound and active vinyl compound are used particularly preferably.

Preferred adding amount, to the water-soluble polymer in the adhesive, of the cross-linking agent when the above-mentioned cross-linking agent is used together is 0.1% by mass to less than 40% by mass and, more preferably, 0.5% by mass to less than 30% by mass. It is preferred that an adhesive is applied on at least one of the surfaces of a protective film or a polarizer to form an adhesive layer followed by adhering and it is preferred that an adhesive is applied on the surface-treated side of a protective film to form an adhesive layer followed by adhering on the surface of a polarizer. Thickness of the adhesive layer after drying is preferably 0.01 μm to 5 μm and, particularly preferably, 0.05 μm to 3 μm.

As hereunder, layers and liquid crystal display devices of the present invention achieving the aforementioned first and second objects of the present invention will be illustrated in detail.

<Reflection Preventing Layer>

With regard to a transparent protective film for a polarizing plate located at the opposite side of the cell crystal cell, it is preferred to be equipped with a functional film such as a reflection preventing layer. In the present invention, a reflection preventing layer where at least a light scattering layer and a layer with low refractive index are layered in this order or a reflection preventing layer where a medium refractive layer, a high refractive layer and a lower refractive layer are layered on a transparent protective film in this order is advantageously used. Preferred examples thereof will be mentioned as follows.

Preferred examples of the reflection preventing layer where a light scattering layer and a low-refractive layer are installed on a transparent protective layer will be mentioned. It is preferred that matte particles are dispersed in the light scattering layer, that refractive index of materials other than the matt particles of the light scattering layer is within a range of 1.50 to 2.00 and that refractive index of the low-refractive layer is within a range of 1.35 to 1.49. The light scattering layer may have both antiglare property and hard coat property and may be in a single layer or in plural layers such as two to four layers.

With regard to the reflection preventing layer, a sufficient antiglare property and a uniform matte feeling by naked eye are achieved and preferred when its uneven shape of its surface is designed in such a manner that average roughness of central line Ra is 0.08 to 0.40 μm, average roughness for ten points Rz is not more than ten-fold of Ra, average distance between peak and valley Sm is 1 to 100 μm, standard deviation of the convex height from the deepest area of the unevenness is not more than 0.5 μm, standard deviation of the average distance between peak and valley Sm where central line is a standard is not more than 20 μm and surface having angle of inclination of 0 to 5° is not less than 100%.

In addition, color taste of reflected light under a C light source becomes neutral and is preferred when the ratio of minimum and maximum values in reflectivity within such a range that a* value is −1 to 2, b* value is −3 to 3 and 380 nm to 780 nm is made 0.5 to 0.99. It is further preferred that, when b* value of transmitted light under a C light source is made 0 to 3, yellowish tone of white display when applied to an image display device is reduced.

In addition, it is preferred that, when the standard deviation of illumination distribution when a lattice of 120 μm×40 μm is inserted between the plane light source and the reflection preventing film of the present invention upon measurement of illumination distribution on the film is measured is not more than 20, glittering in case the film of the present invention is applied to the high-precision panel is reduced.

It is preferred that, when the optical characteristic of the reflection preventing layer according to the present invention is made to such as extent that mirror plane reflectivity is not more than 2.5%, transmittance is not less than 90% and 60°-luster is not more than 70%, then reflection of outer light is able to be suppressed and recognition by naked eye is improved. Particularly with regard to a mirror plane reflectivity, it is more preferred to be not more than 1% and most preferred to be not more than 0.5%. It is preferred that prevention of glittering on the high-precision LCD panel and blurring of letter, etc. are achieved when haze is 20% to 50%, ratio of inner haze value to total haze value is from 0.3 to 1, reduction in the haze value from the case where a light scattering is installed to the case where a low-refractive layer is further installed is within 15%, clearness of the transmitted image where comb width is 0.5 mm is 20% to 50% and transmittance ratio of the transmitted light perpendicular to the reflection preventing layer to the transmitted light in the 2° inclination from the perpendicular direction is from 1.5 to 5.0.

<Low-Refractive Layer>

Refractive index of the layer having low refractive index according to the present invention is within a range of preferably 1.20 to 1.49 and, more preferably, 1.30 to 1.44. It is also preferred that the low-refractive layer satisfies the following formula (XI).

$$(m/4) \times 0.7 < n^1 d^1 < (m/4) \times 1.3 \qquad \text{Formula (XI)}$$

In the formula, m is a positive odd number, $n^1$ is refractive index of the low-refractive layer and $d^1$ is film thickness (nm) of the low-refractive layer. $\lambda$ is wavelength and is a value within a range of 500 to 550 nm.

Materials which form the low-refractive layer according to the present invention will be illustrated as follows.

It is preferred that the low-refractive layer according to the present invention contains a fluorine-containing polymer as a low-refractive binder. With regard to the fluorine polymer, the preferred one is a fluorine-containing polymer which is cross-linked by heat of not higher than 70° C. or by ionizing radiation where dynamic abrasion coefficient is 0.03 to 0.20, angle of contact to water is 90 to 120° and slipping-down angle of water is not more than 70°. It is preferred that seal or memo adhered thereto is able to be easily peeled off in case peeling from the commercially available adhesive tape is low when the reflection preventing film according to the present invention is installed to an image display device. It is preferably not more than 5N, more preferably not more than 3N and, most preferably, not more than 1N. When the surface hardness measured by a micro hardness tester is high, scratch is rarely formed and it is preferably not less than 0.3 GPa and, more preferably, not less than 0.5 GPa.

Examples of the fluorine-containing polymer used for the low-refractive layer are hydrolyzed product or dehydrated/condensed product of a silane compound containing a perfluoroalkyl group [such as (heptadecafluoro-1,1,2,2-tetrahydrodecyl)triethoxysilane] and a fluorine-containing copolymer where a constituting unit for giving a cross-linking reactivity to a fluorine-containing monomer unit is a constituting component.

Specific examples of the fluorine-containing monomer are fluoro-olefins (such as fluoroethylene, vinylidene fluoride, tetrafluoroethylene, perfluorooctylethylene, hexafluoropropylene and perfluoro-2,2-dimethyl-1,3-dioxane), partially or completely fluorinated alkyl ester derivatives of (meth) acrylic acid (such as Biscoat 6FM (manufactured by Osaka Yuki Kagaku) and M-2020 (manufactured by Daikin)) and completely or partially fluorinated vinyl ethers. Preferred ones are perfluoro-olefins and, in view of refractive index, solubility, transparency, availability, etc., the particularly preferred one is hexafluoropropylene.

Examples of the constituting unit for giving a cross-linking reaction are a constituting unit prepared by polymerization of a monomer already having a self-cross-linking functional group in a molecule such as glycidyl(meth)acrylate and glycidyl vinyl ether; a constituting unit prepared by polymerization of a monomer having carboxyl group, hydroxyl group, amino group, sulfo group, etc. such as (meth)acrylic acid, methylol(meth)acrylate, hydroxyalkyl(meth)acrylate, allyl acrylate, hydroxyethyl vinyl ether, hydroxybutyl vinyl ether, maleic acid and crotonic acid; and a constituting unit where a cross-linking reactive group such as (meth)acryloyl group is introduced into the aforementioned constituting unit by means of polymerization reaction (such as that the introduction can be done by action of hydroxyl group with acrylic acid chloride).

Besides the above-mentioned fluorine-containing monomer unit and constituting unit for giving a cross-linking reaction, it is also possible to appropriately copolymerize a monomer containing no fluorine atom in view of solubility into a solvent, transparency of the film, etc. There is no particular limitation for the monomer unit which is able to be jointly used and its examples are olefins (such as ethylene, propylene, isoprene, vinyl chloride and vinylidene chloride), acrylates (such as methyl acrylate, ethyl acrylate and 2-ethylhexyl acrylate), methacrylates (such as methyl methacrylate, ethyl methacrylate, butyl methacrylate and ethylene glycol dimethacrylate), styrene derivatives (such as styrene, divinylbenzene, vinyltoluene and $\alpha$-methylstyrene), vinyl ethers (such as methyl vinyl ether, ethyl vinyl ether and cyclohexyl vinyl ether), acrylamides (such as N-tert-butylacrylamide and N-cyclohexylacrylamide), methacrylamides and acrylonitrile derivatives.

A hardening agent may be appropriately used together with the above-mentioned polymer as mentioned in Japanese Patent Laid-Open Nos. 10/025,388 and 10/147,739.

<Light-Scattering Layer>

Light-scattering layer is usually formed with an object that a hard coat property for improving the light scattering property by surface scattering and/or inner scattering and the anti-scratching of the film. Accordingly, it is formed by containing a binder which usually gives a hard coat property, matte particles which give a light-diffusing property and, upon necessity, inorganic fillers for giving high refractive index, preventing the shrinking upon cross-linking and making into high strength.

In view of giving a hard coat property and for suppressing the generation of curl and the deterioration of fragility, film thickness of the light-scattering layer is preferably 1 to 10 µm and, more preferably, 1.2 to 6 µm.

With regard to a binder for the scattering layer, it is preferably a polymer having a saturated hydrocarbon chain or a polyether chain as a main chain and, more preferably, a polymer having a saturated hydrocarbon chain as a main chain. The binder polymer is preferred to have a cross-linking structure. With regard to a binder polymer having a saturated hydrocarbon chain as a main chain, a polymer of ethylenic unsaturated monomer is preferred. With regard to a binder polymer having a saturated hydrocarbon chain as a main chain and having a cross-linking structure, a (co)polymer of monomer having two or more ethylenic unsaturated groups is preferred. In order to make the refractive index of a binder polymer high, it is also possible to select a monomer where its structure contains an aromatic ring or at least one atom selected from halogen atom other than fluorine, sulfur atom, phosphorus atom and nitrogen atom.

Examples of the monomer having two or more ethylenic unsaturated groups are esters of polyhydric alcohol with (meth)acrylic acid [such as ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate], modified products of the above with ethylene oxide, vinylbenzene and its derivatives (such as 1,4-divinylbenzene, 2-acryloylethyl 4-vinylbenzate and 1,4-divinylcyclohexanone), vinylsulfones (such as divinylsulfone), acrylamides (such as methylenebisacrylamide) and methacrylamides. Two or more of the above-mentioned monomers may be used jointly.

Specific examples of the highly refractive monomer are bis(4-methacryloylthiophenyl)sulfide, vinylnaphthalene, vinylphenyl sulfide and 4-methacryloylphenyl 4'-methoxyphenyl thioether. Two or more of those monomers may be used together as well.

Polymerization of the monomer having an ethylenic unsaturated group as such is able to be carried out by irradiation of ionizing radiation of by heating in the presence of an optical radical initiator or a heat radical initiator.

Accordingly, a reflection preventing film is able to be formed when an applying solution containing a monomer having an ethylenic unsaturated group, an optical radical initiator or a heat radical initiator, matte particles and an inorganic filler is prepared and the applying solution is applied on a transparent support followed by subjecting to hardening by a polymerization reaction by means of ionizing radiation or heating. With regard to the optical radical initiator, that which has been already known may be used.

With regard to a polymer having polyether as a main chain, a ring-opened polymer of a multifunctional epoxy compound is preferred. Ring-opening polymerization of the multifunctional epoxy compound is able to be carried out by irradiation of ionizing radiation or by heating in the presence of an optical acid generator or a heat acid generator.

Accordingly, a reflection preventing film is able to be formed when an applying solution containing a multifunctional epoxy compound, an optical acid generator or a hot acid generator, matte particles and an inorganic filler is prepared and the applying solution is applied on a transparent support followed by hardening by polymerization reaction by means of ionizing radiation or heating.

In place of or in addition to a monomer having two or more ethylenic unsaturated groups, a monomer having a cross-linking functional group may be used to introduce a cross-linking functional group into a polymer and, as a result of the reaction of the cross-linking functional group, a cross-linking structure may be introduced into a binder polymer Examples of the cross-linking functional group include isocyanate group, epoxy group, aziridine group, oxazoline group, aldehyde group, carbonyl group, hydrazine group, carboxyl group, methylol group and active methylene group. Vinylsulfonic acid, acid anhydride, cyanoacrylate derivative, melamine, etherified methylol, ester, urethane and metal alkoxide such as tetramethoxysilane may also be used as monomers for introducing a cross-linking structure. It is also possible to use a functional group showing a cross-linking property as a result of decomposition reaction such as a blocked isocyanate group. Thus, with regard to a cross-linking functional group in the present invention, not only that which directly reacts but also that which shows reactivity after being decomposed may be used.

When a binder polymer having such a cross-linking functional group is heated after being applied, it is able to form a cross-linking structure.

With an object of giving an anti-glare property, it is preferred that the light scattering layer contains matte particles such as particles of inorganic compound or resin particles which are larger than filler particles and have an average particle size of usually 1 to 10 μm or, preferably, 1.5 to 7.0 μm.

Specific examples of the above-mentioned matte particles are particles of inorganic compound such as silica particles and $TiO_2$ particles; and resin particles such as acrylate particles, cross-linked acrylate particles, polystyrene particles, cross-linked styrene particles, melamine resin particles and benzoguanamine resin particles. Among them, cross-linked styrene particles, cross-linked acrylate particles, cross-linked acrylstyrene particles and silica particles are particularly preferred. With regard to shape of the matte particles, any of spherical and amorphous shapes may be used.

It is also possible to simultaneously use two or more kinds of matte particles having different particle sizes. Matte particles having larger particle size are able to give antiglare property while those having smaller particle size are able to give other optical characteristics.

With regard to a particle size distribution of the above-mentioned matte particles, it is most preferred to be in a mono-dispersed state and, with regard to particle size of each of the particles, the nearer, the better. For example, when particles having bigger particle size to an extent of 20% as compared with the average particle size are defined as coarse particles, ratio of the coarse particles in total particle numbers is preferably not more than 1%, more preferably not more than 0.1% and, still more preferably, not more than 0.01%. Matte particles having such a particle size distribution is able to be prepared by classification after the conventional synthetic reaction and, when classifying times are increased or classifying degree is made high, it is possible to prepare a matte agent having more preferred distribution.

The above-mentioned matte particles are contained in a light-scattering layer so as to make the matte particle amount preferably 10 to 1,000 mg/m$^2$ or, more preferably, 100 to 700 mg/m$^2$.

Particle size distribution of the matte particles is measured by a Coulter counter method and the distribution measured is calculated into a particle number distribution.

In order to enhance the refractive index of the light-scattering layer, it is preferred that the layer contains an inorganic filler comprising at least one kind of oxide of metal selected from titanium, zirconium, aluminum, indium, zinc, tin and antimony where the average particle size is usually not more than 0.2 μm, preferably not more than 0.1 μm and, more preferably, not more than 0.06 μm in addition to the above-mentioned matte particles.

On the contrary, in a light-scattering layer using highly refractive matte particles in order to increase the difference in refractive indexes from matte particles, it is preferred to use an oxide of silicon for keeping the refractive index of the layer low. Preferred particle size thereof is the same as that in the case of the aforementioned inorganic filler.

Specific examples of the inorganic filler used in the light-scattering layer are $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are particularly preferred in view of making the refractive index high. It is also preferred that surface of said inorganic filler is subjected to a silane coupling treatment or a titanium coupling treatment and it is preferred to use a surface treating agent having a functional group which is able to react with a binder species on the filler surface.

Adding amount of the inorganic filler as such in the total mass of the light-scattering layer is preferably 10 to 90%, more preferably 20 to 80% and, particularly preferably, 30 to 75%.

The filler as such does not cause scattering since its particle size is well smaller than wavelength of light and a dispersion in which said filler is dispersed in a binder polymer acts as an optically uniform substance.

Refractive index of bulk of a mixture of the binder and the inorganic filler in the light-scattering layer is preferably 1.48 to 2.00 and, more preferably, 1.50 to 1.80. In order to make the refractive index within the above range, types of the binder and the inorganic filler and amount ratio thereof may be appropriately selected. How to select them is able to be easily aware of by means of previous experiments.

In order to ensure the surface uniformity particularly uneven coating, uneven drying and point deficiency, the light-scattering layer is preferred when an application composition for formation of antiglare layer contains any of or both of the surfactants of a fluorine type and a silicone type. The surfactant of a fluorine type is used particularly preferably because, by less adding amount, it is able to give an effect of improving the surface disadvantage such as uneven coating, uneven drying and point deficiency of the reflection preventing film of the present invention. The object is that a high-speed application adaptability is given together with an increase in uniformity of the surface whereby productivity is enhanced.

Now, a reflection preventing layer in which a medium refractive layer, a high refractive layer and a low refractive layer are layered in this order on a transparent protective film will be illustrated.

It is preferred that the reflection preventing layer comprising a layer constitution in the order of at least medium refractive layer, high refractive layer and low refractive layer (the outermost layer) on a substrate is designed so as to give a refractive index satisfying the following relation.

(Refractive index of high refractive layer)>(Refractive index of medium refractive layer)>(Refractive index of transparent support)>(Refractive index of low refractive layer)

A hard coat may be also installed between the transparent support and the medium refractive layer. Furthermore, a medium refractive hard coat layer, a high refractive layer and a low refractive layer may be used as well (refer, for example, to Japanese Patent Laid-Open Nos. 08/122,504, 08/110,401, 10/300,902, 2002/243,906 and 2000/111,706). Each layer may be further equipped with other functions and examples thereof are an anti-dirt low refractive layer and an antistatic high refractive layer (e.g., Japanese Patent Laid-Open Nos. 10/206,603 and 2002/243,906).

Haze of the reflection preventing film is preferably not more than 5% and, more preferably, not more than 3%. Strength of the film in accordance with a pencil hardness test as stipulated by JIS K 5400 is preferably not softer than H, more preferably not softer than 2H and, most preferably, not softer than 3H.

<High Refractive Layer and Medium Refractive Layer>

A layer having a high refractive index of reflection preventing film is preferred to be composed of a hardening film containing at least matrix binder and superfine particles of inorganic compound having a high refractive index where average particle size is not more than 100 nm.

With regard to the fine particles of inorganic compound having a high refractive index, an inorganic compound where refractive index is not less than 1.65 is preferably exemplified and that where refractive index is not less than 1.9 is more preferably exemplified. Examples are oxide of Ti, Zn, Sb, Sn, Zr, Ce, Ta, La, In, etc. and a compounded oxide containing those metals.

Examples of making into such superfine particles are means where particle surface is treated with a surface treating agent (such as silane coupling agent mentioned in Japanese Patent Laid-Open Nos. 11/295,503, 11/153,703 and 2000/009,908; and anionic compound or organic metal coupling agent mentioned in Japanese Patent Laid-Open No. 2000/310,432, etc.), means where a core-shell structure in which high refractive particles form a core is adopted (Japanese Patent Laid-Open Nos. 2001/166,104, 2001/310,432, etc.) and means where specific dispersing agent is used together (Japanese Patent Laid-Open No. 11/153,703, U.S. Pat. No. 6,210,858, Japanese Patent Laid-Open No. 2002/2776069, etc.).

With regard to a material which forms a matrix, conventionally known thermoplastic resin, hardening resin coat, etc. may be exemplified. In addition, at least one kind of composition selected from a composition containing a multifunctional compound having at least two radical polymerizable and/or cation polymerizable polymerizing groups and an organometallic compound having a hydrolysable group as well as partially condensed product thereof is preferred. For example, compositions mentioned in Japanese Patent Laid-Open Nos. 2000/047,004, 2001/315,242, 2001/031,871, 2001/296,401, etc. may be listed.

A hardening film prepared from a metal alkoxide composition and colloidal metal oxide prepared from hydrolyzed condensate of metal alkoxide is also preferred. It is mentioned, for example, in Japanese Patent Laid-Open No. 2001/293,818.

Refractive index of the high refractive layer is usually 1.70 to 2.20. Thickness of the high refractive layer is preferably 5 nm to 10 µm and, more preferably, 10 nm to 1 µm.

Refractive index of the medium refractive layer is adjusted so as to make the value between the refractive index of the low refractive layer and that of the high refractive layer. Refractive index of the medium refractive layer is preferably 1.50 to 1.70. Thickness thereof is preferably 5 nm to 10 µm and, more preferably, 10 nm to 1 µm.

<Low Refractive Layer>

In the above-mentioned constitution, the low refractive layer is successively layered on the high refractive layer. Refractive index of the low refractive layer is preferably 1.20 to 1.55. More preferably, it is 1.30 to 1.50.

It is preferred to construct as an outermost layer having an anti-scratch property and an anti-dirt property. With regard to a means for greatly enhancing the anti-scratch property, endowment of sliding property to the surface is effective and conventionally known means for making film thin comprising introduction of silicone, introduction of fluorine, etc. may be applied.

Refractive index of a fluorine-containing compound is preferably 1.35 to 1.50. More preferably, it is 1.36 to 1.47. With regard to the fluorine-containing compound, a compound containing cross-linking or polymerizable functional group containing 35 to 80% by mass of fluorine atom is preferred.

Examples thereof are compounds mentioned in paragraphs [0018] to [0026] of Japanese Patent Laid-Open No. 09/222, 503, paragraphs [0019] to [0030] of Japanese Patent Laid-Open No. 11/038,202, paragraphs [0027] to [0028] of Japanese Patent Laid-Open No. 2001/040,284 and Japanese Patent Laid-Open No. 2000/248,102.

With regard to a silicone compound, a compound having a polysiloxane structure and containing hardenable functional group or polymerizable functional group in a polymer chain whereby a cross-linking structure is available in a film is preferred. Examples thereof are a reactive silicone (such as Silaplane manufactured by Chisso) and polysiloxane having silanol groups at both ends (Japanese Patent Laid-Open No. 11/245,403, etc.).

It is preferred that the cross-linking or polymerizing reaction of polymer of fluorine-containing and/or siloxane having cross-linking or polymerizing group is carried out by irradiation of light or by heating together with or after application of an application composition for the formation of the outermost layer containing polymerization initiator, sensitizer, etc.

Hardened film by a sol-gel conversion which hardens by a condensation reaction of an organometallic compound such as a silane coupling agent with a silane coupling agent containing specific fluorine-containing hydrocarbon group in the co-presence of a catalyst is also preferred.

Examples are silane compounds containing a polyfluoroalkyl group or a partially hydrolyzed condensate thereof (compounds mentioned in Japanese Patent Laid-Open Nos. 58/142,958, 58/147,483, 58/147,474, 09/157,582, 11/106,704, etc.) and silyl compounds containing poly(perfluoroalkyl ether) group which is a fluorine-containing long-chain group (compounds mentioned in Japanese Patent Laid-Open Nos. 2000/117,902, 2001/048,590 and 2000/053,804).

The low refractive layer may contain fillers (low refractive inorganic compounds where average size of primary particles is 1 to 150 nm such as silicone dioxide (silica) and fluorine-containing particles (e.g., magnesium fluoride, calcium fluoride and barium fluoride), organic fine particles mentioned in paragraphs [0020] to [0038] of Japanese Patent Laid-Open No. 11/003,820, etc.), silane coupling agent, sliding agent, surfactant, etc. as an additive other than the above-mentioned ones.

When a low refractive layer is located at the lower layer of the outermost layer, the low refractive layer may be formed by a gas-phase method (such as vacuum coating method, sputtering method, ion plating method and plasma CVD method). An application method is preferred in view of low production cost.

Film thickness of the low refractive layer is preferably 30 to 200 nm, more preferably 50 to 150 nm and, most preferably, 60 to 120 nm.

It is also possible that hard coat layer, forward scattering layer, primer layer, antistatic layer, undercoating layer, protective layer, etc. is formed.

<Hard Coat Layer>

Usually, a hard coat layer is formed on the surface of the transparent support for endowing physical strength to a transparent protective film in which a reflection preventing layer is installed. It is particularly preferred to install between the transparent support and the above-mentioned high refractive layer. A hard coat layer is preferred to be formed by a cross-linking reaction of a hardening compound using light and/or heat or by a polymerization reaction. With regard to a hardening functional group, an optically polymerizable functional group is preferred while, with regard to an organometallic compound containing a hydrolysable functional group, an organic alkoxysilyl compound is preferred.

Specific examples of those compounds are the same as those exemplified in the high refractive layer. Examples of a specific constitutional composition of a hard coat layer are those mentioned in Japanese Patent Laid-Open No. 2002/144,913 and 2000/009,908 and WO 00/46617.

A high refractive layer may be used as a hard coat layer as well. In such a case, it may be formed by finely dispersing the fine particles followed by being made to contain in a hard coat layer using a means mentioned in the hard refractive layer.

When a hard coat layer is contained with particles of an average particle size of 0.2 to 10 μm for example, it is also able to be used as an antiglare layer (which will be mentioned later) to which an antiglare function is endowed.

Film thickness of a hard coat layer is able to be appropriately designed according to its use. Film thickness of a hard coat layer is preferably 0.2 to 10 μm and, more preferably, 0.5 to 7 μm.

Strength of a hard coat layer by a pencil hardness test in accordance with JIS K 5400 is preferably not softer than H, more preferably not softer than 2H and, most preferably, not softer than 3H. Further, that where abraded amount of a test piece before and after the tapered test in accordance with JIS K 5400 is smaller is better.

<Antistatic Layer>

When an antistatic layer is installed, it is preferred to endow electric conductivity where volume resistivity is not more than $10^{-8}$ ($\Omega$ cm$^{-3}$). Although it is possible to endow volume resistivity of $10^{-8}$ ($\Omega$ cm$^{-3}$) by the use of moisturizing substance, water-soluble inorganic salt, some kinds of surfactant, cationic polymer, anionic polymer, colloidal silica, etc., its dependency on temperature and humidity is high and there are some cases where a sufficient electric conductivity is not ensured at low humidity. Therefore, metal oxide is preferred as a material for an electrically conductive layer. When a metal oxide which is not colorized is used as a material for an electrically conductive layer, coloration of the film is able to be suppressed as a whole and that is preferred. Examples of metal which forms a metal oxide without coloration are Zn, Ti, Al, In, Si, Mg, Ba, Mo, W and V and it is preferred to use a metal oxide containing the above-mentioned one as a main component. Specific examples of the preferred one are ZnO, $TiO_2$, $SnO_2$, $Al_2O_3$, $In_2O_3$, $SiO_2$, MgO, BaO, $MoO_3$ and $V_2O_5$ as well as a compounded oxide thereof and particularly preferred ones are ZnO, $TiO_2$ and $SnO_2$. With regard to examples where heteroatom is contained, addition of Al, In, etc. to ZnO, addition of Sb, Nb, halogen atom, etc. to $SnO_2$ and addition of Nb, TA, etc. to $TiO_2$ are effective. Further, as mentioned in Japanese Patent Publication No. 59/006,235B, it is also possible to use a material where the above-mentioned metal oxide is adhered to other crystalline metal particles or fiber-shaped substance (such as titanium oxide). Incidentally, volume resistance value and surface resistance value are different property values and are unable to be simply compared as they are. However, when electric conductivity of not lower than $10^{-8}$ ($\Omega$ cm$^{-3}$) is ensured, said electrically conductive layer has to have surface resistance value of not more than about $10^{-10}$ ($\Omega$/□) or, more preferably, $10^{-8}$ ($\Omega$/□). It is necessary that surface resistance value of the electrically conductive layer is measured as a value when the antistatic layer is used as an outermost layer and that is able to be measured at the stage during the formation of the layered film mentioned in this patent.

<Liquid Crystal Display Device>

The cellulose ester film or the cyclic polyolefin film and a polarized plate using said film in accordance with the present invention are able to be used for liquid crystal cells and liquid crystal display devices of various display modes. Various display modes such as TN (twisted nematic), IPS (in-plane switching), FLC (ferroelectric liquid crystal), AFLC (anti-ferroelectric liquid crystal), OCB (optically compensatory bend), STN (super twisted nematic), VA (vertically oriented) and HAN (hybrid oriented nematic) have been proposed. Among them, OCB mode and VA mode are able to be preferably used.

Liquid crystal cell of an OCB mode is a liquid crystal display device using liquid crystal cell in a bend-oriented mode where rod-shaped liquid crystal molecules are oriented in substantially reversed directions (symmetrically) in upper and lower areas of the liquid crystal cell. Liquid crystal cell of an OCB mode is disclosed in the specifications of U.S. Pat. Nos. 4,583,825 and 5,410,422. Since rod-shaped liquid crystal molecules are symmetrically oriented in upper and lower areas of the liquid crystal cell, liquid crystal cell in a bend orientation mode has an optically self-compensation function. Therefore, this liquid crystal mode is also called as an OCB (optically compensatory bend) liquid crystal mode. Liquid crystal display device of a bend orientation mode has an advantage that response speed is high.

In a liquid crystal cell of a VA mode, rod-shaped liquid crystalline molecules are oriented substantially vertically when no voltage is applied. In addition to (1) a liquid crystal cell of a VA mode in a narrow sense where rod-shaped liquid crystalline molecules are oriented substantially vertically when no voltage is applied and, when voltage is applied, they are oriented substantially horizontally (mentioned in Japanese Patent Laid-Open No. 02/176,625), liquid crystal cell of a VA mode further includes (2) liquid crystal cell (of an MVA mode) where a VA mode is made into a multi-domain for expansion of visual angle (mentioned in SID 97, *Digest of Tech. Papers* (preliminary reports), 28 (1997)845), (3) liquid crystal cell of a mode (n-ASM mode) where rod-shaped liquid crystalline molecules are oriented substantially vertically when no voltage is applied and, when voltage is applied, they are twisted and subjected to a multi-domain orientation (mentioned in preliminary reports of Seminar of Japan Liquid Crystal, 58-59 (1998) and (4) liquid crystal cell of a survival mode (reported at the LCD International 98).

Liquid crystal display device of a VA mode has liquid crystal cell and two polarized plates which are oriented at both ends thereof. In a liquid crystal cell, liquid crystal is carried between two electrode substrates. In an embodiment of the liquid crystal display device of a transmission type, the polymer film of the present invention is oriented in one sheet between liquid crystal cell and one of the polarizing plates or oriented in two sheets between liquid crystal cell and each of both polarizing plates.

In another embodiment of the liquid crystal display device of the present invention, an optically compensatory sheet comprising the polymer film of the present invention is used as a transparent protecting film for a polarizing plate oriented between liquid crystal cell and polarizer. The above-mentioned polymer film may be used only for a transparent protective film of one polarizing plate (between liquid crystal cell and polarizer) or it may be used for two transparent protective films of both polarizing plates (between liquid cell and polarizer). When the above-mentioned polymer film is used only for one polarizing plate, it is particularly preferred that said film is used as a protective film at the side of liquid crystal cells of the polarizing plate of the side of back light of the liquid crystal cell. The protective film may be a common cellulose ester film and is preferably thinner than the polymer film of the present invention. For example, 40 to 80 μm is preferred and commercially available KC4UX2M (40 μm, manufactured by Konica Opt), KC5UX (60 μm, manufactured by Konica Opt), TD 80 (80 μm, manufactured by Fuji Photo Film), etc. may be listed although they are non-limitative.

(Optical Compensation Film)

In a liquid crystal display device of an OCB mode or in a TN liquid crystal display device, an optical compensation film is used for expanding a visual angle. With regard to an optical compensation film for an OCB cell, there is used a film installed with an optical anisotropic layer where a discotheque liquid crystal is fixed by subjecting to a hybrid orientation on an optically uniaxial or biaxial film. With regard to an optical compensation film for a TN cell, there is used a film installed with an optical anisotropic layer where a discotheque liquid crystal is fixed by subjecting to a hybrid orientation on a film being optically isotropic or having an optical axis in a thickness direction. The cyclic polyolefin film of the present invention is useful for the preparation of the above-mentioned optical compensation film for an OCB cell or optical compensation film for a TN cell.

Preferred retardation values of the optical compensation film are as mentioned already.

EXAMPLES

Now the present invention will be specifically illustrated by way of the following Examples but the present invention is not limited to those Examples.

Example 1-1

Manufacture of Films of Cellulose Acylate Films F1 to F23

(1) Cellulose Acylate

Cellulose acylates having different acyl-substituting degrees as shown in Table 1-1 were prepared. Sulfuric acid (7.8 parts by mass to 100 parts by mass of cellulose) was added as a catalyst and a carboxylic acid was added to conduct the acylation reaction at 40° C. After that, amount of the sulfuric acid catalyst, amount of water and aging time were adjusted whereby total substitution degree and substitution degree at 6-position were adjusted. Aging temperature conducted was 40° C. Low-molecular components of cellulose acylate were removed by washing with acetone. In the table, CAB is an abbreviation for cellulose acetate butyrate (cellulose ester derivative where acyl group comprises acetate and butyryl group), CAP is an abbreviation for cellulose acetate propionate (cellulose ester derivative where acyl group comprises acetate group and propionyl group) and CTA is an abbreviation for cellulose triacetate (cellulose ester derivative where acyl group comprises acetate group only). They are called a cotton material in the following illustration.

TABLE 1-1

| Cotton No. | Cotton | Substituent A | Deg of Substn A | Substituent B | Deg of Substn B | Total Deg of Substn (A + B) | Deg of Substn at 6-Position | (Deg of Substn at 6-Position)/(Total Deg of Substn) |
|---|---|---|---|---|---|---|---|---|
| CA 1 | CTA | Ac | 2.81 | — | 0 | 2.81 | 0.895 | 0.319 |
| CA 2 | CTA | Ac | 2.87 | — | 0 | 2.87 | 0.888 | 0.309 |
| CA 3 | CAP | Ac | 1.9 | Pr | 0.8 | 2.7 | 0.897 | 0.332 |
| CA 4 | CAP | Ac | 0.18 | Pr | 2.47 | 2.65 | 0.883 | 0.333 |
| CA 5 | CAB | Ac | 0.3 | Bu | 2.5 | 2.8 | 0.890 | 0.318 |
| CA 6 | CAB | Ac | 1.1 | Bu | 1.6 | 2.7 | 0.881 | 0.326 |

(2) Composition (2-1) Cellulose Acylate Solution

The following composition was poured into a mixing tank, stirred to dissolve the components, heated at 90° C. for about 10 minutes and filtered through filter paper of average pore size of 34 μm and through a sintered metal filter of average pore size of 10 μm.

| Cellulose Acylate Solution | |
| --- | --- |
| Cellulose acylate mentioned in Table 1-1 | 100.0 parts by mass |
| Triphenyl phosphate | 7.9 parts by mass |
| Biphenyl diphenyl phosphate | 3.9 parts by mass |
| Methylene chloride | 403.0 parts by mass |
| Methanol | 60.2 parts by mass |

(2-2) Dispersion of Matte Agent

The following composition containing the cellulose acylate solution prepared by the above method was poured into a dispersing machine to prepare a matte agent dispersion.

| Dispersion of Matte Agent | |
| --- | --- |
| Silica particles of average particle size 16 nm (Aerosil R972 manufactured by Nippon Aerosil) | 2.0 parts by mass |
| Methylene chloride | 72.4 parts by mass |
| Methanol | 10.8 parts by mass |
| Cellulose acylate solution | 10.3 parts by mass |

The above-mentioned cellulose acylate solution (100 parts by mass) and 1.35 parts by mass of a matte agent dispersion were mixed to prepare a dope for preparation of film. This dope was used for the preparation of films of F14 to F17, F20 and F21.

(2-3) Retardation Expressing Agent Solution A

Then the following composition containing the cellulose acylate solution prepared by the above method was poured into a mixing tank and dissolved by stirring with heating to prepare a retardation expressing agent solution A.

| Retardation Expressing Agent Solution A | |
| --- | --- |
| Retardation expressing agent A | 20.0 parts by mass |
| Methylene chloride | 58.3 parts by mass |
| Methanol | 8.7 parts by mass |
| Cellulose acylate solution | 12.8 parts by mass |

The aforementioned cellulose acylate solution (100 parts by mass), 1.35 parts by mass of a matte agent dispersion and a retardation expressing agent solution A in the ratio as shown in Table 1-2 were mixed to prepare a dope for preparation of film. The dope was used for the preparation of films F1 to F10, F13, F18, F19, F22 and F23.

Retardation Expressing Agent A

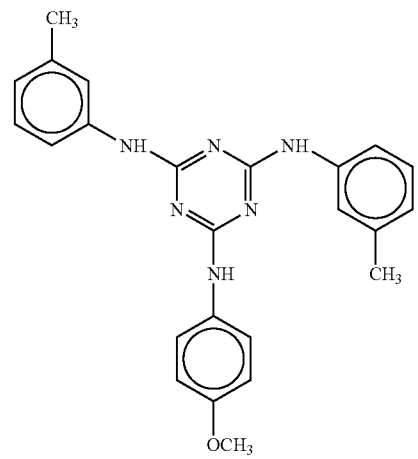

(2-4) Retardation Expressing Agent Solution B

The following composition containing the cellulose acylate solution prepared by the above-mentioned method was poured into a mixing tank and dissolved by heating with stirring to prepare a retardation expressing solution B.

| Retardation Expressing Agent Solution B | |
| --- | --- |
| Retardation expressing agent A | 8.0 parts by mass |
| Retardation expressing agent B | 12.0 parts by mass |
| Methylene chloride | 58.3 parts by mass |
| Methanol | 8.7 parts by mass |
| Cellulose acylate solution | 12.8 parts by mass |

The aforementioned cellulose acylate solution (100 parts by mass), 1.35 parts by mass of a matte agent dispersion and a retardation expressing agent solution B in the ratio as shown in Table 1-2 were mixed to prepare a dope for preparation of film. The dope was used for the preparation of films F11 and F12.

Adding ratio of the retardation expressing agent was shown in Table 1-2 in terms of parts by mass when amount of the cellulose acylate was made 100 parts by mass.

Retardation Expressing Agent B

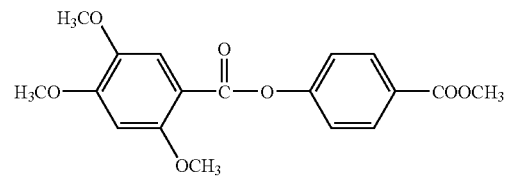

TABLE 1-2

| Film No. | Cotton No. | REA Soln | Adding Amt of REA (mass %) | Passing Time thru Natural wind Region (sec) | Wind velocity of Drying Air (m/s) | Temp of Drying Air (°C.) | Stretching Rate (-fold) |
|---|---|---|---|---|---|---|---|
| F 1 | CA 1 | A | 6.5 | 5 | 8 | 100 | 1.25 |
| F 2 | CA 1 | A | 6.5 | 5 | 8 | 100 | 1.30 |
| F 3 | CA 1 | A | 6.5 | 5 | 8 | 100 | 1.17 |
| F 4 | CA 1 | A | 6.5 | 15 | 8 | 120 | 1.25 |
| F 5 | CA 1 | A | 6.5 | 5 | 8 | 120 | 1.25 |
| F 6 | CA 1 | A | 6.5 | 5 | 20 | 100 | 1.25 |
| F 7 | CA 1 | A | 6.5 | 30 | 8 | 100 | 1.25 |
| F 8 | CA 1 | A | 6.5 | 5 | 8 | 25 | 1.25 |
| F 9 | CA 1 | A | 6.5 | 30 | 3 | 25 | 1.25 |
| F 10 | CA 1 | A | 6.5 | 40 | 10 | 120 | 1.25 |
| F 11 | CA 1 | B | 7.0 | 5 | 8 | 100 | 1.25 |
| F 12 | CA 1 | B | 7.0 | 40 | 10 | 120 | 1.25 |
| F 13 | CA 2 | A | 2.7 | 5 | 8 | 100 | 1.25 |
| F 14 | CA 2 | — | — | 5 | 8 | 100 | 1.07 |
| F 15 | CA 2 | — | — | 40 | 10 | 120 | 1.07 |
| F 16 | CA 3 | — | — | 5 | 8 | 100 | 1.25 |
| F 17 | CA 3 | — | — | 40 | 10 | 120 | 1.25 |
| F 18 | CA 4 | A | 3.0 | 5 | 8 | 100 | 1.15 |
| F 19 | CA 4 | A | 3.0 | 40 | 10 | 120 | 1.15 |
| F 20 | CA 5 | — | — | 5 | 8 | 100 | 1.20 |
| F 21 | CA 5 | — | — | 40 | 10 | 120 | 1.20 |
| F 22 | CA 6 | A | 5.0 | 5 | 8 | 100 | 1.20 |
| F 23 | CA 6 | A | 5.0 | 40 | 10 | 120 | 1.20 |

REA: Retardation expressing agent

Example 1-2

Formation of Film for Polymer Films F27 to F43

(1) Polymer

The cotton mentioned in Table 1-1 and the cyclic polyolefin mentioned hereinafter are called polymer materials.

<Preparation of Cyclic Polyolefin Polymer (P-1)>

Pure toluene (100 parts by mass) and 100 parts by mass of methyl norbornenecarboxylate were placed in a reactor. Then 0.225 mmol % (by mass to the monomer) of tri(pentafluorophenyl) boron and 25 mmol % (by mass to the monomer) of ethyl hexanoate-Ni dissolved in toluene and 0.25 mmol % (by mass to the monomer) of triethyl aluminum were placed in a reactor. They were made to react for 18 hours by stirring at room temperature. After completion of the reaction, the reaction mixture was poured into an excessive ethanol to give a polymer precipitate. The precipitate was purified and the resulting polymer (P-1) was dried in vacuo at 65° C. for 24 hours.

(2) Composition (2-1) Preparation of Polymer Solutions (D1) (D2)

The following composition was poured into a mixing tank followed by stirring to dissolve the components, heated at 90° C. for about 10 minutes and filtered through filter paper of average pore size of 34 μm and a sintered metal filter of average pore size of 10 μm.

(2-1-1) Polymer Solution (D1) for Formation of Film of Polymer Films F28, F30, F32, F34, F36, F38 and F40

| Polymer Solution (D1) | |
|---|---|
| Cellulose acylates mentioned in Tables 1-1 to 1-3 | 100.0 parts by mass |
| Triphenyl phosphate | 7.9 parts by mass |
| Biphenyl diphenyl phosphate | 3.9 parts by mass |
| Methylene chloride | 403.0 parts by mass |
| Alcohol having 6 or less carbon(s)* | 60.2 parts by mass |

*"Alcohol having 6 or less carbon(s)" used for each film is mentioned in Table 1-3.

(2-1-2) Polymer Solution (D2) for Formation of Film of Polymer Films F27, F29, F31, F33, F35, F37, F39 and F41

| Polymer Solution (D2) | |
|---|---|
| Cellulose acylates mentioned in Tables 1-1 to 1-3 | 100.0 parts by mass |
| Triphenyl phosphate | 7.9 parts by mass |
| Biphenyl diphenyl phosphate | 3.9 parts by mass |
| Methylene chloride | 347.4 parts by mass |
| Alcohol having 6 or less carbon(s)* | 115.8 parts by mass |

*"Alcohol having 6 or less carbon(s)" used for each film is mentioned in Table 1-3.

(2-2) Preparation of Polymer Solution (D3)

The following composition was poured into a mixing tank followed by stirring to dissolve the components and filtered through filter paper of average pore size of 34 μm and a sintered metal filter of average pore size of 10 μm.

(2-2-1) Polymer Solution (D3) for Preparation of Polymer Film F42

| Polymer Solution (D3) | |
|---|---|
| Cyclic polyolefin (P-1) | 150.0 parts by mass |
| Dichloromethane | 391.5 parts by mass |
| Methanol | 58.5 parts by mass |

(2-2-2) Polymer Solution (D4) for Preparation of Polymer Film F43

| Polymer Solution (D4) | |
|---|---|
| Cyclic polyolefin (P-1) | 150.0 parts by mass |
| Dichloromethane | 337.5 parts by mass |
| Methanol | 112.5 parts by mass |

(2-3) Dispersion of Matte Agent

After that, the following composition containing the polymer solution prepared by the above method wad poured into a dispersing machine to prepare a dispersion of matte agent.

(2-3-1) Dispersion of Matte Agent (M1) for the Preparation of Polymer Films F18, F30, F32, F34, F36, F38 and F40

| Dispersion of Matte Agent (M1) | |
|---|---|
| Silica particles of av. particle size of 16 nm (Aerosil R972 manufd by Nippon Aerosil) | 2.0 parts by mass |
| Methylene chloride | 72.4 parts by mass |
| Alcohol* of less than 6 carbon(s) used in (2-1-1) | 10.8 parts by mass |
| Polymer solution (D1) | 10.3 parts by mass |

*"Alcohol having 6 or less carbon(s)" used for each film is mentioned in Table 1-3.

(2-3-2) Dispersion of Matte Agent (M2) for the Preparation of Film of Polymer Films F27, F29, F31, F33, F35, F37, F39 and F41

| Dispersion of Matte Agent (M2) | |
|---|---|
| Silica particles of av. particle size of 16 nm (Aerosil R972 manufd by Nippon Aerosil) | 2.0 parts by mass |
| Methylene chloride | 62.8 parts by mass |
| Alcohol* of less than 6 carbon(s) used in (2-1-1) | 20.8 parts by mass |
| Polymer solution (D2) | 10.3 parts by mass |

*"Alcohol having 6 or less carbon(s)" used for each film is mentioned in Table 1-3.

(2-3-3) Dispersion of Matte Agent (M3) for the Preparation of Film of Polymer Film F42

| Dispersion of Matte Agent (M3) | |
|---|---|
| Silica particles of av. particle size of 16 nm (Aerosil R972 manufd by Nippon Aerosil) | 2.0 parts by mass |
| Methylene chloride | 72.4 parts by mass |
| Alcohol* of less than 6 carbon(s) used in (2-1-1) | 10.8 parts by mass |
| Polymer solution (D3) | 10.3 parts by mass |

*"Alcohol having 6 or less carbon(s)" used for each film is mentioned in Table 1-3.

The above-mentioned polymer solution (D3) (100 parts by mass) and 1.35 parts by mass of a dispersion of matte agent (M3) were mixed and the resulting dope for the preparation of film was used for the preparation of F42 film.

(2-3-4) Dispersion of Matte Agent (M4) for the Preparation of Film of Polymer Film F43

| Dispersion of Matte Agent (M4) | |
|---|---|
| Silica particles of av. particle size of 16 nm (Aerosil R972 manufd by Nippon Aerosil) | 2.0 parts by mass |
| Methylene chloride | 62.4 parts by mass |
| Alcohol* of less than 6 carbon(s) used in (2-1-1) | 20.8 parts by mass |
| Polymer solution (D2) | 10.3 parts by mass |

*"Alcohol having 6 or less carbon(s)" used for each film is mentioned in Table 1-3.

The above-mentioned polymer solution (D4) (100 parts by mass) and 1.35 parts by mass of a dispersion of matte agent (M4) were mixed and the resulting dope for the preparation of film was used for the preparation of F43 film.

(2-4) Retardation Expressing Agent Solution C

Then the following composition containing the polymer solution prepared by the above method was poured into a mixing tank and dissolved by heating with stirring to prepare a retardation expressing agent solution (C)

(2-4-1) Retardation Expressing Agent Solution (C1) for the Preparation of Polymer Films F28, F30, F34, F36, F38 and F40

| Retardation expressing agent A | 20.0 parts by mass |
|---|---|
| Methylene chloride | 58.3 parts by mass |
| Alcohol* of less than 6 carbon(s) used in (2-1-1) | 8.7 parts by mass |
| Polymer solution (D1) | 12.8 parts by mass |

*"Alcohol having 6 or less carbon(s)" used for each film is mentioned in Table 1-3.

The above-mentioned polymer solution (D1) (100 parts by mass), 1.35 parts by mass of a matte agent dispersion (M1) and a retardation expressing agent solution (C1) in an amount as shown in Table 1-3 were mixed to prepare a dope for the preparation of film. This dope was used for the preparation of films F28, F30, F32, F34, F36, F38 and F40.

(2-4-2) Retardation Expressing Agent Solution (C2) for the Preparation of Polymer Films F29, F31, F33, F35, F37, F 39 and F41

| Retardation expressing agent A | 20.0 parts by mass |
|---|---|
| Methylene chloride | 50.25 parts by mass |
| Alcohol* of less than 6 carbon(s) used in (2-1-1) | 16.75 parts by mass |
| Polymer solution (D2) | 12.8 parts by mass |

*"Alcohol having 6 or less carbon(s)" used for each film is mentioned in Table 1-3.

The above-mentioned polymer solution (D2) (100 parts by mass), 1.35 parts by mass of a matte agent dispersion (M2) and a retardation expressing agent solution (C2) in an amount as shown in Table 1-3 were mixed to prepare a dope for the preparation of film. This dope was used for the preparation of films F27, F31, F33, F35, F37, F39 and F41.

A method for casting the solution will be mentioned in detail later and, with regard to drying and stretching condition in the manufacture of film by casting of the solution, the same conditions as in the case of the polymer film F4 were used.

TABLE 1-3

| Film No. | Polymer No. | Alcohol Species | Alcohol Concn (mass %) | Added Amt of Retardation Expressing Agent (mass %) |
|---|---|---|---|---|
| F4 | CA1 | methanol | 13 | 6.5 |
| F27 | CA1 | methanol | 25 | 6.5 |
| F28 | CA1 | ethanol | 13 | 6.5 |
| F29 | CA1 | ethanol | 25 | 6.5 |
| F30 | CA1 | butanol | 13 | 6.5 |

TABLE 1-3-continued

| Film No. | Polymer No. | Alcohol Species | Alcohol Concn (mass %) | Added Amt of Retardation Expressing Agent (mass %) |
|---|---|---|---|---|
| F31 | CA1 | butanol | 25 | 6.5 |
| F32 | CA2 | methanol | 13 | 6.5 |
| F33 | CA2 | methanol | 25 | 6.5 |
| F34 | CA3 | methanol | 13 | 6.5 |
| F35 | CA3 | methanol | 25 | 6.5 |
| F36 | CA4 | methanol | 13 | 6.5 |
| F37 | CA4 | methanol | 25 | 6.5 |
| F38 | CA5 | methanol | 13 | 6.5 |
| F39 | CA5 | methanol | 25 | 6.5 |
| F40 | CA6 | methanol | 13 | 6.5 |
| F41 | CA6 | methanol | 25 | 6.5 |
| F42 | P1 | methanol | 13 | 0 |
| F43 | P1 | methanol | 25 | 0 |

(3) Casting (3-1) Preparation of Dope

The aforementioned plural solvents were mixed and well stirred in a 4,000-L dissolving tank made of stainless steel having a stirring fan to give a mixed solvent. With regard to the materials for the solvents, water content of not more than 0.5% by mass was used for all of them. Then flaky powder of the cotton material was gradually added from a hopper. The cotton material powder was poured into a dissolving tank and dispersed for 30 minutes under the condition where a core-eccentric stirrer of a dissolver type stirring at the peripheral speed of 5 m/sec in initial stage and a stirrer having an anchor wing in a central axis stirring at the peripheral speed of 1 m/sec. Temperature at the initiation of the dispersing was 25° C. and the finally reached temperature was 48° C. Then a previously prepared additive solution (matte agent dispersion or, in some cases, a mixed solution of matte agent dispersion and retardation expressing agent) was sent thereto by adjusting the sending amount of the additive to the tank so as to make the total amount 2,000 kg. After dispersing of the additive solution finished, a high-speed stirring stopped. Then the peripheral speed of the anchor wing was made 0.5 m/sec and stirring was carried out for 100 minutes more to swell the cotton material powder whereupon a swollen solution was prepared. Until the swelling finished, the inner area of the dissolving tank was pressurized up to 0.12 MPa by nitrogen gas. At that time, the oxygen concentration in the inner area of the dissolving tank was less than 2 vol. % keeping the state where there was no problem in terms of explosion. Water content in the swollen solution was 0.3% by mass.

(3-2) Dissolving and Filtering

The swollen solution was sent to a jacketed pipe of the dissolving tank. The swollen solution was heated up to 50° C. in the jacketed pipe and further heated up to 90° C. with a pressure of 2 MPa to dissolve completely. Heating time in this case was 15 minutes. Temperature of the dissolved solution was raised up to 36° C. and passed through a filtering device having a filter material of 8 μm nominal pore size to give a dope (hereinafter, it will be referred to as a dope before concentration). At that time, primary side pressure and secondary side pressure in the filtering device were made 1.5 MPa and 1.2 MPa, respectively. With regard to filter, housing and pipe exposed to high temperature, those made of Hastelloy (trade name) alloy having a high corrosion resisting property were utilized and those equipped with a jacket in which heat-transmitting medium for keeping the temperature and for heating were used.

(3-3) Concentrating, Filtering, Defoaming and Additives

The dope before concentrating prepared as such was subjected to a flash evaporation in a flash device being made into ordinary pressure at 80° C. and the evaporated solvent was recovered by a condenser. Solid concentration of a dope 22 after flashing was 21.8% by mass. Incidentally, the condensed solvent was recovered by a recovering device so as to recycle as a solvent for the preparation of a dope. After regenerating it in a regenerating device, the solvent was sent to a solvent tank. In the recovering device and the regenerating device, distillation and dehydration were carried out. A flash tank in the flash device was equipped with a stirrer (not shown) wherein a stirring axis is equipped with an anchor wing and the dope 22 which was flashed at the peripheral speed of 0.5 m/sec was stirred by that stirrer to conduct a defoaming. Temperature of the dope 22 in the flash tank was 25° C. and an average retention time of the dope 22 in the tank was 50 minutes. The dope 22 was collected and its shear viscosity measured at 25° C. was 450 Pa·s at a shear velocity of 10 (sec$^{-1}$).

Then the dope 22 was irradiated with a weak ultrasonic wave so that defoaming was conducted. After that, it was passed through a filtering device under a state of being pressurized at 1.5 MPa using a pump. In the filtering device, the dope was firstly passed through a sintered fiber metal filter having a normal pore size of 10 μm and then passed through a sintered fiber filtrate having a normal pore size of 10 μm. Primary side pressures for each were 1.5 MPa and 1.2 MPa while secondary side pressures for each were 1.0 MPa and 0.8 MPa. Temperature of the dope after filtration was adjusted to 36° C. and the dope 22 was sent into a 2,000-L stock tank 21 made of stainless steel to store. The stock tank 21 had a stirrer 61 where an anchor wing was installed at the central axis and stirring was conducted at peripheral speed of 0.3 m/sec at all times. Incidentally, in the preparation of the dope from the dope before concentration, there was no problem such as corrosion at the part contacting to the dope at all.

A mixed solvent A comprising 87.0 parts by mass of methylene chloride and 1.30 parts by mass of methanol was also prepared.

(3-4) Extruding, Immediately-Before Adding, Casting and Bead Vacuum

Film 82 was manufactured using a film manufacturing line 20 shown in FIG. 1. A dope 22 in a stock tank 21 was sent to a filtering device 30 using a highly precise gear pump 62. The gear pump 62 has a function of increasing the pressure of the primary side of the pump 62 and sending of the liquid was done by conducting a feedback control to the upper stream side so that the pressure of the primary side became 0.8 MPa. With regard to the gear pump 62, that where a volume efficiency was 99.2% and variation rate of discharging amount was within 0.5% was used. Discharging pressure was 1.5 PMa. The dope 22 passing through the filtering device 30 was sent to a casting die 31.

In the casting die 31, flow amount of the dope 22 was adjusted at the discharge opening of the casting die 31 to conduct the casting so that width became 1.8 m and film thickness of dried film became 80 μm. Viscosity of the dope 22 at that time was 20 Pa·s. Casting width of the dope 22 from the discharge opening of the casting die 31 was made 1,700 mm. Casting rate was made 20 m/min. In order to adjust the temperature of the dope 22 at 36° C., a jacket (not shown) was installed in the casting die 31 and inlet temperature of the heat transmitting medium to be supplied into the jacket was made 36° C.

Casting die 31 and piping were always kept at 36° C. during the manufacture of the film. With regard to the casting die 31, there was used a die of a coat hanger type. With regard to the casting die 31, there was used that having a thickness adjusting bolt in a 20-mm pitch and having an automatic thickness-adjusting mechanism by a heat bolt. With regard to the heat bolt, there was used that which is able to settle a profile corresponding to the liquid casting amount of the gear pump 62 by a previously set program and is able to conduct a feedback control by an adjusting program based on the profile of an infrared thickness meter (not shown) on the film manufacturing line 20. In the film wherefrom the terminal area of 20 mm was removed, an adjustment was conducted in such a manner that difference between any two points departing 50 mm each other was made within 1 μm and that deviation of thickness in the width direction was made not more than 3 μm/m. Total thickness was adjusted to be not more than ±1.5%.

At the primary side of the casting die 31, a vacuum chamber 68 was installed for making this area vacuous. Degree of vacuum of this vacuum chamber 68 was adjusted so as to give a pressure difference of 1 Pa to 5,000 Pa before and after the casting bead and said adjustment was conducted depending upon the casting speed. At that time, pressure difference between both sides of the casting bead was set so as to make the length of the casting bead 20 mm to 50 mm. With regard to the vacuum chamber 68, that equipped with a mechanism by which higher temperature than the condensing temperature of the gas around the casting part was used. On the front surface of the bead at the discharge opening of the die, a labyrinth seal 50 (refer to FIG. 2) was installed. Openings were installed at both ends of the die discharge opening of the casting die. Further, the casting die 31 was installed with an edge suction device (not shown) for adjusting the unevenness of both rims of the casting bead.

(3-5) Casting Die

With regard to the material for the casting die 31, there was used stainless steel of a separation hardening type where thermal expansion coefficient was not more than $2 \times 10^{-5}$ (° C.$^{-1}$). This had an anti-corroding property nearly the same as that made of SUS 316 according to a compulsory corrosion test in an aqueous solution of electrolyte. In addition, it has an anti-corrosive property of such an extent that, even when dipped for 3 months in a mixed liquid of dichloromethane, methanol and water, no pitting was generated on the interface between gas and liquid. Precision in the finish of the area of the casting die 31 contacting to the liquid is not more than 1 μm in terms of surface roughness and not more than 1 μm/m in any direction in terms of true straightness and clearance of the slit was adjusted to be 1.5 mm. With regard to the corner part of the area contacting to the liquid at the front end of the lip of the casting die 31, there was used that which was processed so that R throughout whole width was made not more than 50 μm. Shearing speed of the dope 22 in the casting die 31 was within a range of 1 (1/sec) to 5,000 (1/sec). At the front end of the lip of the casting die 31, a WC (tungsten carbide) coating by sputtering was conducted to form a hardened film.

Further, to the discharge opening of the casting die 31, a mixed solvent A for making the dope 22 soluble was supplied in an amount of 0.5 ml/min each to the interfaces of both side ends of the casting bead and the discharge opening so as to prevent the topical drying and solidification of the casting dope 22. Pulsating rate of a pump which supplied the mixed solvent was not more than 5%. In addition, by means of a vacuum chamber 68, pressure of the back side of the casting bead was made lower than the front side to an extent of 150 Pa. A jacket (not shown) was installed for keeping the inner temperature of the vacuum chamber 68 constant at predetermined temperature. Into the jacket, a heat-transmitting medium which was adjusted at 35° C. was supplied. In the aforementioned edge suction device, an edge suction air amount was able to be adjusted so as to make it within a range of 1 L/min to 100 L/min. In this Example, an appropriate adjustment was conducted so as to make it within a range of 30 L/min to 40 L/min.

(3-6) Metal Support

With regard to a support, an endless band made of stainless steel having 2.1 m width and 70 mm length was utilized as a casting band. The casting band 34 was abraded so as to make thickness 1.5 mm and surface roughness not more than 0.05 μm. With regard to its material, that made of SUS 316 having sufficient anti-corrosive property and strength was used. Unevenness in the thickness of the casting band 34 as a whole was not more than 0.5%. The casting band 34 was driven by two rotating rollers 32, 33. Adjustment was conducted at that time so that tension of the casting band 34 in the conveying direction was made $1.5 \times 10^5$ N/m². Adjustment was also conducted so that the relative speed difference between the casting band 34 and the rotating rollers 32, 33 is made not more than 0.01 m/min. At that time, variation in the speed of the casting band 34 was made not more than 0.5%. In addition, positions of both ends of the casting band 34 were detected and controlled so that meandering in the width direction for one rotation was limited to not more than 1.5 mm. Variation in the positions in upward and downward directions for front end of die lip and casting band 34 immediately beneath the casting die 31 was made not more than 200 μm. The casting band 34 was installed in a casting chamber 64 having a suppressing means for wind pressure variation (not shown). A dope 22 was casted from the casting die 31 onto the casting band 34.

In the rotating rollers 32, 33, those into which a heat-transmitting medium was able to be sent was used so that adjustment of temperature of the casting band 34 is able to be carried out. A heat transmitting medium of 5° C. was casted to a rotating roller 33 at the side of the casting die 34 while, to another rotating roller 32, a heat transmitting medium of 40° C. was casted for drying. Surface temperature of the central area of the casting band 34 immediately before the casting was 15° C. and the temperature difference at both ends thereof was not more than 6° C. The casting band 34 is preferred to be without surface deficiency and that having no pinhole of not smaller than 30 μm where pinhole of 10 μm to 30 μm was one pinhole/m² or less while pinhole of smaller than 10 μm was two pinholes/m² or less was used.

(3-7) Casting Drying

Temperature of the casting chamber 64 was kept at 35° C. using a temperature conditioning device 65. A dope 22 was casted on a casting band 34 to form a casted film 69. Further, a ventilation opening for quick drying 73 was attached and dry wind 57 was hit on the surface of the casted film 69 to form a primary film 69*a*. At that time, adjustment was conducted so that passing time of the natural wind region A and temperature and wind velocity of dry wind 57 were made the values mentioned in Table 1-2. Further adjustment was conducted so that wind velocity of natural wind was made not more than 0.2 m/s and gas concentration of the dry wind 57 was made 16%. Drying speed of casted film 69 at the ventilation opening for quick drying 73 was 7% by mass on the basis of dry weight.

Dry wind of 135° C. was blown from the ventilation opening 70 on upper stream of the casting band 34. From the ventilation opening 71 on the lower stream, dry wind of 140° C. was blown and, from the ventilation opening 72 at the lower part of the casting band 34, dry wind of 65° C. was blown. Saturated temperature of each dry wind was near −8° C. in all cases. Oxygen concentration in a dry atmosphere on the casting band 34 was kept at 5% by volume. In order to keep the oxygen concentration at 5% by volume, air was substituted with nitrogen. In order to condense and recover the solvent in the casting chamber 64, a condenser 66 was installed and outlet temperature thereof was set at −10° C.

Variation of static pressure near the casting die 31 was suppressed to not more than ±1 Pa by a labyrinth seal 50. When the solvent ratio in the casted film 69 became 50% by mass on a dry basis, the film was peeled off as a wet film 74 by supporting with a peeling roller 75 from the casting band 34. This solvent content on the dry basis is the value which is calculated by $\{(x-y)/y\} \times 100$ where x is mass of film upon sampling and y is mass of the sampling film after being dried. Peeling tension was $1 \times 10^2 \text{ N/m}^2$ and, in order to suppress the poor peeling, the peeling speed (peeling roller draw) to the speed of the casting band 34 was appropriately adjusted within a range of 100.1% to 110%. Surface temperature of the peeled wet film 74 was 15° C. Solvent gas generated by drying was condensed and liquefied by a condenser 66 of −10° C. and recovered by a recovering device 67. Adjustment was conducted so that water content in the recovered solvent became not more than 0.5%. The drying air wherefrom the solvent was removed was heated again to recycle as a drying wind. The wet film 74 was conveyed via a roller of the connecting part 80 and sent to a tenter-type drying machine 35. In this connecting part 80, dry wind of 40° C. was sent to a wet film 74 from a blower 81. Incidentally, during the conveyance by a roller of the connecting part 80, tension of about 30N was applied to the wet film 74.

(3-8) Tenter Conveying, Drying and Ear-Cutting

The wet film 74 sent to the tenter-type drying machine 35 was conveyed through a drying zone of the tenter-type drying machine 35 where both ends of the film were fixed by clips and, during that period, drying by means of dry wind was conducted. The clips were cooled by supplying a heat transmitting medium of 20° C. Conveyance of the clips was conducted by a chain and variation of speed of the sprocket thereof was not more than 0.5%. Inner area of the tenter-type drying machine 35 was divided into three zones and dry wind temperatures in those zones were made 90° C., 110° C. and 120° C. from the upper stream side. Gas composition of the dry wind was made a saturated gas concentration at −10° C. Average drying speed in the tenter-type drying machine 35 was 120% by mass/min on a dry basis. Condition for the drying zone was adjusted so that the residual solvent amount at outlet of the tenter-type drying machine 35 became 7% by mass. In the tenter-type drying machine 35, stretching in the width direction was also conducted together with conveying. An adjustment was conducted in such a manner that, when width of the wet film 74 before stretching was 100%, width after stretching became the values as mentioned in Table 1-2. Stretching magnification (tenter-driven draw) from the peeling roller 75 to the inlet of the tenter-type drying machine 35 was made 1.02.

Stretching ratio in the tenter-type drying machine 35 was that the difference in the substantial stretching ratios at any two points departing 10 mm or more from the initiating position for biting by clip was not more than 10% and that the difference in the stretching ratios at any two points departing 20 mm was not more than 5%. Here, the stretching ratio is [(stretching magnification)−1]×100. Ratio of the length from initiation position by clipping by clip to releasing position of clipping to the length from inlet to outlet of the tenter-type drying machine 35 is made 90%. Solvent which was evaporated in the tenter-type drying machine 35 was liquefied by condensing at the temperature of −10° C. and recovered. For the recovery by condensation, a condenser was installed and its outlet temperature was set at −8° C. The condensed solvent was adjusted so as to make its water content therein not more than 0.5% by mass followed by being recycled. From the tenter-type drying machine, film 82 was sent out.

Within 30 seconds from the outlet of the tenter-type drying machine 35, cutting of the ears of both ends of the film 82 was carried out by an ear-cutting device 40. Ears of 50 mm on both sides were cut by an NT-type cutter and the cut ears were sent by air to a crusher 90 by a cutter blower (not shown) to disintegrate into chips of about 80 mm² in average. The chips were utilized again as a material for the manufacture of dope together with cotton material powder. Oxygen concentration in the dry atmosphere of the tenter-type drying machine 35 was kept at 5% by volume. In order to keep the oxygen concentration at 5% by volume, air was substituted with nitrogen. Before subjecting to drying at high temperature in a drying chamber 41 which will be mentioned later, the film 82 was preliminarily heated in a preliminary drying chamber (not shown) to which dry wind of 100° C. was supplied.

(3-9) After-Drying and Elimination of Charge

The film 82 was dried at high temperature in a drying chamber 41. The drying chamber was divided into four sections and, to the sections from the upper stream side to the lower stream side, dry wind of 120° C., 130° C., 130° C. and 130° C. was supplied from a blower (not shown). Conveying tension of the film 82 by a roller 91 was made 100 N/m and drying was conducted for about 10 minutes until the final residual solvent amount became 0.3% by mass. A wrap angle (wrapping central angle of the film) of the roller 91 was made 90° and 180°. Material of the roller 91 was made of aluminum or carbon steel and hard chromium plating was applied onto the surface. With regard to the surface shape of the roller 91, that which was flat and that which was subjected to a matte processing by blast were used. Deviation of film position by rotation of the roller 91 was not more than 50 μm in all cases. Selection was conducted so that flexure of the roller by the tension of 100 N/m was not more than 0.5 mm.

Solvent gas contained in dry wind was removed by adsorption and recovery using an adsorptive recovery device 92. An adsorbent used here was active carbon and adsorption was carried out using dry nitrogen. The recovered solvent was recycled as a solvent for the preparation of dope after adjusting the water content to not more than 0.3% by mass. Besides the solvent gas, the dry wind contained plasticizer, UV absorber and other high-boiling substances and, therefore, it was regenerated and recycled after removing them by a pre-adsorber and a cooler which cools and removes them. Conditions for adsorption and desorption were set so as to finally make VOC (volatile organic compounds) in the gas exhausted outside not more than 10 ppm. Amount of the solvent recovered by a condensing method among the total evaporated solvent was 90% by mass and most of the residual one was recovered by means of adsorption and recovery.

The dried film 82 was conveyed to the first moisture-adjusting chamber (not shown). Dry wind of 110° C. was supplied to a connecting part between the drying chamber 41 and the first moisture-adjusting chamber. Air where temperature was 50° C. and dew point was 20° C. was supplied to the first moisture-adjusting chamber. Then the film 82 was conveyed to the second humidity-adjusting chamber (not shown) where generation of curl of film 82 was suppressed. In the second moisture-adjusting chamber, air of 90° C. temperature and 70% humidity was directly hit to the film 82.

(3-10) Knurling and Winding Condition

The film 82 after moisture was adjusted was cooled at not higher than 30° C. in a cooling chamber 42 and subjected to ear-cutting of both sides again by an ear-cutting device (not shown). A compulsory charge-eliminating device (charge-eliminating bar) 93 was installed so that charged voltage of the film 82 during conveying was made within a range of −3 kV to +3 kV at all times. Further, both ends of the film 82 were endowed with knurling using a knurling-applying roller 94. Knurling was endowed by conducting an emboss processing from one side of the film 82, width to which knurling was endowed was 10 mm and pushing pressure by a knurling-endowing roller 94 was set so that height of concave and convex became higher in an extent of 12 μm in average than an average thickness of the film 82.

Then the film 82 was conveyed to a winding chamber 43. Temperature and humidity in a chamber of the winding chamber 43 were adjusted to 28° C. and 70%, respectively. In the inner area of the winding chamber 43, an ionic charge-eliminating device (not shown) was also installed so that charged voltage of the film 82 became −1.5 kV to +1.5 kV. Width of the product of the film (thickness: 80 μm) wound as such was 1475 mm. Diameter of the winding roller 95 used was 169 mm. A tension pattern was provided so as to make the tensions in the beginning and at the end of winding 300 N/m and 200 N/m, respectively. Full length upon winding was 0.3940 m. Variation in width of winding shear upon winding (it may be sometimes called oscillation width) was made ±5 mm. Winding shear period to the winding roller 95 was made 400 m. Pushed pressure of the press roller 96 to the winding roller 95 was set at 50 N/m. In the film 82 upon winding, temperature was 25° C., water content was 1.4% by mass and residual solvent amount was 0.3% by mass. Throughout the whole steps, an average drying speed was 20% by mass/min on a dry basis. In addition, there was neither loose winding nor wrinkle and, even in an impact test of 10 G, no shear in winding took place. Appearance of the roll was also good.

When a film roll of the film 82 was stored for one months in a storing lack of 25° C. temperature and 55% relative humidity and then subjected to the same test as above, no significant change was noted in any case. Further, no adhesion was noted as well in a roll. In addition, after formation of the film 82, no residue of casted film 69 formed from dope on a casting band 34 was noted at all after the peeling.

Example 1-3

Preparation of Polymer Film by a Co-Casting

The polymer solutions as shown below were prepared and subjected to preparation of polymer films F44 to F52 together with polymer solutions D1 to D3 prepared in Example 1-2, matte agent dispersions M1 to M3 and retardation expressing agent solutions C1 to C2.

| Polymer Solution (D5) | |
| --- | --- |
| Cellulose acylate mentioned in Table 1-4 | 100.0 parts by mass |
| Triphenyl phosphate | 7.9 parts by mass |
| Biphenyl diphenyl phosphate | 3.9 parts by mass |
| Methylene chloride | 344.9 parts by mass |
| Alcohol* having 6 or less carbons | 51.5 parts by mass |
| Polymer Solution (D6) | |
| Cyclic polyolefin (P-1) | 150.0 parts by mass |
| Dichloromethane | 462.7 parts by mass |
| Methanol | 69.1 parts by mass |

*"Alcohol having 6 or less carbon(s)" used for each film is mentioned in Table 1-4.

TABLE 1-4

| Film No. | | Polymer Soln Type | Polymer Type | Solid Concn (%) | Alcohol Type | Alcohol Concn (%) | Thickness (%) | Matte Agent Dispersion Type | Adding Amt of Re Expressing Agent A (mass %) |
| --- | --- | --- | --- | --- | --- | --- | --- | --- | --- |
| F44 | Inner layer | D5 | CA1 | 22 | MeOH | 13 | 100 | M1 | 7.5 |
| | Outer layer | — | — | — | — | — | — | — | — |
| F45 | Inner layer | D5 | CA1 | 22 | MeOH | 13 | 97 | — | 7.5 |
| | Outer layer | D1 | CA1 | 19 | MeOH | 13 | 3 | M1 | 7.5 |
| F46 | Inner layer | D5 | CA1 | 22 | MeOH | 13 | 87 | — | 7.5 |
| | Outer layer | D1 | CA1 | 19 | MeOH | 13 | 13 | M1 | 7.5 |
| F47 | Inner layer | D5 | CA1 | 22 | MeOH | 13 | 80 | — | 7.5 |
| | Outer layer | D1 | CA1 | 19 | MeOH | 13 | 20 | M1 | 7.5 |
| F48 | Inner layer | D1 | CA1 | 19 | MeOH | 13 | 80 | — | 7.5 |
| | Outer layer | D2 | CA1 | 19 | MeOH | 25 | 20 | Me | 7.5 |
| F49 | Inner layer | D5 | CA1 | 22 | MeOH | 13 | 80 | — | 7.5 |
| | Outer layer | D2 | CA1 | 19 | MeOH | 25 | 20 | M2 | 7.5 |
| F50 | Inner layer | D5 | CA3 | 22 | MeOH | 13 | 80 | — | — |

TABLE 1-4-continued

| Film No. | | Polymer Soln Type | Polymer Type | Solid Concn (%) | Alcohol Type | Alcohol Concn (%) | Thickness (%) | Matte Agent Dispersion Type | Adding Amt of Re Expressing Agent A (mass %) |
|---|---|---|---|---|---|---|---|---|---|
| | Outer layer | D2 | CA3 | 19 | MeOH | 13 | 20 | M1 | — |
| F51 | Inner layer | D3 | P1 | 25 | MeOH | 13 | 80 | — | — |
| | Outer layer | D6 | P1 | 22 | MeOH | 13 | 20 | M3 | — |

A polymer solution (100 parts by mass) in a combination as shown in Table 1-4, 1.35 parts by mass of a matte dispersion and a retardation expressing agent solution were mixed so as to give the rate as shown in Table 1-4 and the resulting dope for the manufacture of film was used for the production of films F44 to F51.

In the solution casting film formation, the same condition as in the case of the polymer film F4 was adopted to prepare a polymer film F44. In addition, in the solution casting film formation, the same condition as in the case of the polymer film F4 was adopted except that co-casting was also used to prepare polymer films F45 to F51. Constitution of the dope used at that time is shown in Table 1-4.

Example 1-4

Preparation of Optical Compensation Film F26 Having Optically Anisotropic Layer (Saponification Treatment)

The film F3 manufactured in Example 1-1 was passed through dielectric heating rolls each being 60° C. so that surface temperature of the film was raised up to 40° C., applied with the alkali solution of the following composition at the rate of 14 ml/m² using a bar coater, retained for 10 seconds below a steam-type far-infrared heater (manufactured by Noritake Company) heated at 110° C. and applied with pure water at the rate of 3 ml/m² using a bar coater in the same manner. Temperature of the film at that time was 40° C. After that, washing with water using a fountain coater and rinsing using an air knife were repeated for three times and drying was conducted by retaining for 2 seconds in a drying zone of 70° C.

Composition of Alkali Solution>

| Potassium hydroxide | 4.7 parts by mass |
| Water | 15.7 parts by mass |
| Isopropanol | 64.8 parts by mass |
| Propylene glycol | 14.9 parts by mass |
| $C_{16}H_{33}O(CH_2CH_2O)_{10}H$ (surfactant) | 1.0 part by mass |

(Formation of Oriented Film)

An applying solution of the following composition was applied on the cellulose acetate film prepared using a wire bar coater of #14 at the rate of 24 ml/m². It was dried with hot air of 60° C. for 60 seconds and then with hot air of 90° C. for 150 seconds. After that, a longitudinal direction (conveying direction) of the cellulose acetate film was defined as 0° and a rubbing treatment was conducted onto the resulting film in the clockwise 135° direction.

<Composition of Applying Solution for Oriented Film>

| Following modified polyvinyl alcohol | 40 parts by mass |
| Water | 728 parts by mass |
| Methanol | 228 parts by mass |
| Glutaraldehyde (cross-linking agent) | 2 parts by mass |
| Citrate (AS3; Sankyo Kagaku) | 0.69 part by mass |

Modified polyvinyl alcohol

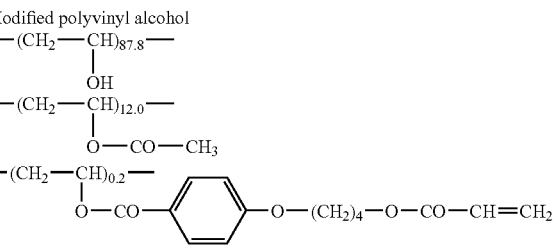

(Formation of Optically Isotropic Layer)

A copolymer containing fluoroaliphatic group (Megafac F780, manufactured by Dainippon Ink and Chemical) (0.1 kg) was added to the applying solution prepared by dissolving 41.01 kg of the following discotheque liquid crystal compound, 4.06 kg of ethylene oxide-modified trimethylolpropane triacrylate (V#360, manufactured by Osaka Yuki Kagaku), 0.29 kg of cellulose acetate butyrate (CAB531-1, manufactured by Eastman Chemical), 1.35 kg of optically polymerization initiator (Irgacure 907, manufactured by Ciba-Geigy), 0.45 kg of sensitizer (Kayacure DETX, manufactured by Nippon Kayaku) and 0.45 kg of citrate (AS3 manufactured by Sankyo Kasei) in 102 kg of methyl ethyl ketone and continuously applied on the oriented film surface of the film 15 being conveyed at 20 m/minute by rotating a wire bar of #2.7 at 391 rotations in the same direction as the conveying direction of the film. During a step of continuous heating from room temperature to 100° C., the solvent was dried, then the wind velocity on the surface of the film to the discotheque liquid crystal compound layer in parallel to the conveying direction was made 1.5 m/sec in a drying zone of 135° C. and heating was conducted for about 90 seconds so that the discotheque liquid compound was oriented. After that, it was conveyed to a drying zone of 80° C., irradiated with ultraviolet ray of 600 mW illuminance for 4 seconds by an ultraviolet irradiating device (ultraviolet lamp: 160 W/cm output and 1.6 m of luminous length) at the state where surface temperature of the film was about 100° C. so that the cross-linking reaction was proceeded and the discotheque liquid compound was fixed to that orientation. After that, it was allowed to cool down to room temperature and wound in a cylindrical shape to give roll-like shape. As such, a roll-shaped optical compensation film F26 was prepared from the film F3 prepared in Example 1-1.

Re retardation value of the optically anisotropic layer measured at the wavelength of 633 mm using an ellipsometer (M-150, manufactured by Nippon Bunko) was 28 nm. An average direction of the molecular symmetric axis of the optically anisotropic layer to the longitudinal direction of the optical compensation film was 45.5°.

Disc-Shaped Liquid Crystalline Compound

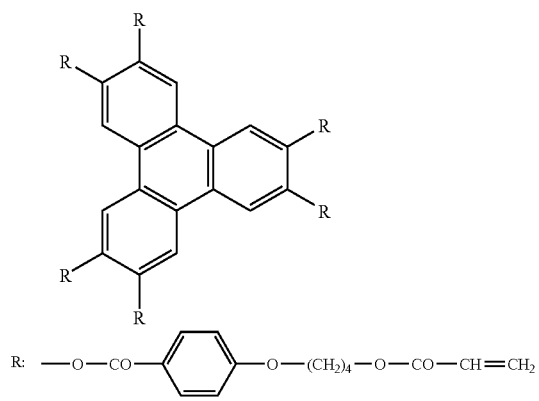

Example 1-5

Preparation of Optical Compensation Films F24 and F25 Having an Optically Anisotropic Layer The films F14 and F15 prepared in Example 1-1 were used for saponification treatment and for manufacture of oriented film by the same manner as in Example 1-4. After that, a longitudinal direction (conveying direction) of the cellulose acetate film was defined as 0° and a rubbing treatment was conducted onto the resulting film in the clockwise 180° direction.

A copolymer containing fluoroaliphatic group (Megafac F780, manufactured by Dainippon Ink and Chemical) (0.4 kg) was added to the applying solution prepared by dissolving 91.0 kg of the above-mentioned discotheque liquid crystal compound, 9.0 kg of ethylene oxide-modified trimethylolpropane triacrylate (V#360, manufactured by Osaka Yuki Kagaku), 2.0 kg of cellulose acetate butyrate (CAB551-0.2, manufactured by Eastman Chemical), 0.5 kg of cellulose acetate butyrate (CAB531-1, manufactured by Eastman Chemical), 3.0 kg of optically polymerization initiator (Irgacure 907, manufactured by Ciba-Geigy) and 1.0 kg of sensitizer (Kayacure DETX, manufactured by Nippon Kayaku) in 207 kg of methyl ethyl ketone and continuously applied on the oriented film surface of the films F14 and F15 being conveyed at 20 m/minute by rotating a wire bar of #3.2 at 391 rotations in the same direction as the conveying direction of the films. During a step of continuous heating from room temperature to 100° C., the solvent was dried, then the wind velocity on the surface of the film to the discotheque liquid crystal compound layer in parallel to the conveying direction was made 5.0 m/sec in a drying zone of 135° C. and heating was conducted for about 90 seconds so that the discotheque liquid compound was oriented. After that, it was conveyed to a drying zone of 80° C., irradiated with ultraviolet ray of 600 mW illuminance for 4 seconds by an ultraviolet irradiating device (ultraviolet lamp: 160 W/cm output and 1.6 m of luminous length) at the state where surface temperature of the film was about 100° C. so that the cross-linking reaction was proceeded and the discotheque liquid compound was fixed to that orientation. After that, they were allowed to cool down to room temperature and wound in a cylindrical shape to give roll-like shape. As such, roll-shaped optical compensation films F24 and F26 were prepared from the films F14 and F15 prepared in Example 1-1, respectively.

Re retardation value of the optically anisotropic layer measured at the wavelength of 633 mm using an ellipsometer (M-150, manufactured by Nippon Bunko) was 45 nm. An average direction of the molecular symmetric axis of the optically anisotropic layer to the longitudinal direction of the optical compensation film was −0.3°.

(Evaluation of Properties of Film)

With regard to the polymer films prepared in Examples 1-1 to 1-5, seven samples for measurement were cut out in a width direction in parallel to the end of the film and retardation at wavelength 590 nm was measured using Kobra 21 ADH (manufactured by Oji Keisoku Kiki). Similarly was measured retardations from the directions of 40° and −40° inclination from normal line to the film surface and Rth was calculated. Mean value for the seven places was adopted as Re (590) and Rth (590) of the film. The maximum difference between high and low film thicknesses (P−V value) and RMS value of film thickness were measured by Fujinon stripe analyzer (FX-03). At that time, measuring area was made within a range of ⌀=60 mm. Slow axis angle distribution was measured by Optipro (XY scanning stage, halogen lamp light+550 nm interference filer). At that time, measuring area was made 60 mm×60 mm and measurement was conducted with an interval of 4 mm using a beam of 4-mm caliber. Results obtained by the experiment are shown in Tables 1-5 to 1-7.

Example 1-6

Preparation of Polarizing Plate

Polyvinyl alcohol (PVA) film of 80 μm thickness was dipped in an aqueous solution of iodine containing 0.05% by mass of iodine at 30° C. for 60 seconds to dye, then stretched in a longitudinal direction to an extent of 5-fold of the original length by dipping in an aqueous solution of boric acid containing 4% by mass of boric acid for 60 seconds and dried at 50° C. for 4 minutes to give a polarizing film of 20 μm thickness.

Figure 4A:
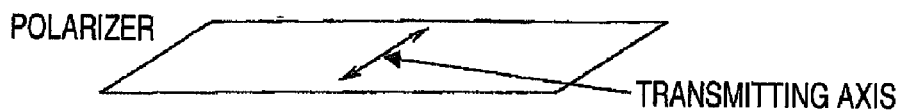
FIG. 4 is a schematic chart showing an example of method for adhesion of polymer film during the manufacture of polarizing plate of the present invention.
Figure 4B:
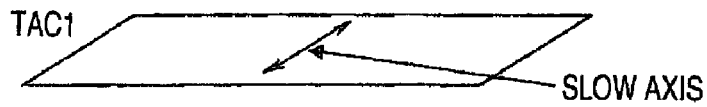
Figure 5:
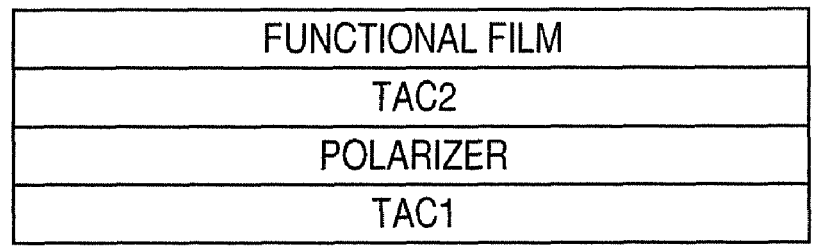
FIG. 5 is a cross-sectional view of an example of cross-sectional structure of the polarizing plate of the present invention showing in a schematic manner.
Figure 6:
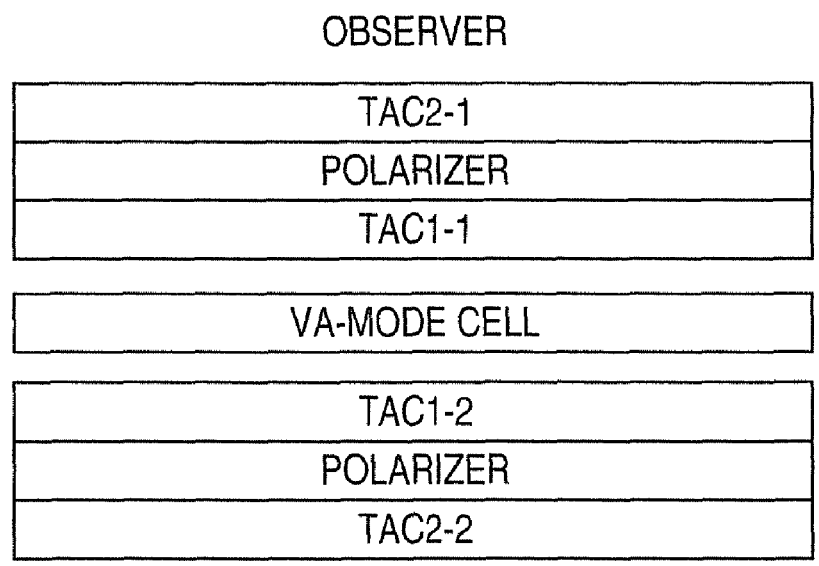
FIG. 6 is a cross-sectional view of an example of cross-sectional structure of the liquid crystal display device of the present invention showing in a schematic manner.

Each of the polymer films F1, F2, F4 to F13, F16 to 26 and F27 to 51 prepared in Examples 1-1 to 1-4 was adhered on one side of a polarizer using an adhesive of a polyvinyl alcohol type (corresponding to TAC of FIGS. 4 to 6). Incidentally, a saponifying treatment was conducted under the following condition.

A 1.5N aqueous solution of sodium hydroxide was prepared and kept at 55° C. A 0.01N aqueous solution of diluted sulfuric acid was prepared and kept at 35° C. The prepared polymer film was dipped in the above aqueous solution of sodium hydroxide for 2 minutes and then dipped in water to well wash out the aqueous solution of sodium hydroxide. After that, the film was dipped in the above aqueous solution of diluted sulfuric acid for 1 minute and dipped in water to well wash out the aqueous solution of diluted sulfuric acid. Finally, the sample was well dried at 120° C.

Commercially available cellulose triacetate film (Fujitac TD80UF, manufactured by Fuji Photo Film; corresponding to TAC2 of FIG. 5 or to TAC2-1 or 2-2 of FIG. 6) was subjected to a saponifying treatment, adhered on another side of the polarizer using an adhesive of a polyvinyl alcohol type and dried at 70° C. for not shorter than 10 minutes to prepare polarizing plates P1 to P48.

Orientation was done so as to make the transmitting axis of the polarizer and the retardation phase axis of the polymer film prepared in Examples 1-1 to 1-5 parallel (FIG. 4). Orientation was done so as to make the transmitting axis of the polarizer and the retardation phase axis of the commercially available cellulose triacetate film orthogonal.

An adhesive of an acrylate type was applied on the surface of a cell side of the above-prepared polarizing plate and a separate film was adhered on the adhesive. A protect film was adhered on the side which is opposite to the cell.

Example 1-7

(Actual Installment to Panel-1)

Polarizing plates and phase contrast plates on front and back sides of liquid crystal TV of VA mode (LC-20C5-S, manufactured by Sharp) were peeled off and polarizing plates P12 to P18, P21 to P23, P31 to P38 and P47 prepared in Example 1-6 were adhered on the front and back sides. At that time, orientation was conducted in such a manner that absorbing axis of polarizing plate of visible side was made in a panel horizontal direction, absorbing axis of polarizing plate of backlight side was made in a panel vertical direction and adhesive surface was made in the liquid crystal cell side.

(Actual Installment in Panel-2)

Polarizing plates and phase contrast plates on front and back sides of liquid crystal TV of VA mode (LC-20C5-S, manufactured by Sharp) were peeled off and, on the front side, commercially available polarizing plate (HLC2-5618, manufactured by Sunritz) having no visual angle compensation plate was adhered while, on the back side, polarizing plates P1 to 11, P19, P20, P24 to 30, P39 to 46 and P48 prepared in Example 1-6 were adhered. At that time, orientation was conducted in such a manner that absorbing axis of polarizing plate of visible side was made in a panel horizontal direction, absorbing axis of polarizing plate of backlight side was made in a panel vertical direction and adhesive surface was made in the liquid crystal cell side.

(Actual Installment to Panel-3)

Polarizing plates on front and back sides of liquid crystal TV of TN mode (LC-20V1, manufactured by Sharp) were peeled off and polarizing plates P21 and 22 prepared in Example 1-6 were adhered. At that time, direction relation for absorbing axis of each polarizing plate was oriented so as to give the same manner as in the commercially available one and adhesive surface was made in the liquid crystal cell side.

(Actual Installment to Panel-4)

Polarizing plates on front and back sides of liquid crystal TV of OCB mode (VT23XD1, manufactured by Nanao) were peeled off and polarizing plate P23 prepared in Example 1-6 was adhered. At that time, direction relation for absorbing axis of each polarizing plate was oriented so as to give the same manner as in the commercially available one and adhesive surface was made in the liquid crystal cell side.

Evaluation for unevenness was conducted by means of black display from the front side. Evaluation was conducted in the directions of front side, angles of direction of 45° and 135° and polar angle of 10° and points were as follows.

1: hazy unevenness was clearly noted and non-permissible for practical use

3: hazy unevenness was slightly noted but permissible for practical use

5: no unevenness was noted at all 2, 4: intermediate levels

The results are shown in Tables 1-5 to 1-7. As mentioned already, Re for each film was the value measured by incidence of light of 590 nm wavelength into a direction of normal line to the film in Kobra 12ADH (manufactured by Oji Keisoku Kiki) and Rth is a value calculated by Kobra 21ADH on the basis of inputted film thickness value, an average refractive index 1.48 of cellulose acylate or an average refractive index 1.53 of cycloolefin polymer and retardation value measured from three directions in total which were Re, retardation value measured by incidence of light of 590 nm wavelength in the direction of +40° inclination to the normal line direction of the film where the retardation phase axis in the plane (judged by Kobra 21ADH) was used as an inclination axis (rotation axis) and retardation value measured by incidence of light of 590 nm wavelength in the direction of −40° inclination to the normal line direction of the film where the retardation phase axis in the plane was used as an inclination axis (rotation axis). In the meanwhile, in F24 to F26, optical anisotropic layer having different average refractive index was applied and, therefore, their values were not calculated.

TABLE 1-5

| | | Properties of Film | | | | | | Evaluation in Actual Installment | |
|---|---|---|---|---|---|---|---|---|---|
| Polarizing Plate No. | Film No. | Re (nm) | Rth (nm) | Film Thickness (μm) | P-V Value (μm) | RMS Value (μm) | Slow axis angle Distribution (°) | Evaluation of Uneven Black Display | Remarks |
| P1 | F1 | 60 | 180 | 89 | 0.4 | 0.06 | 0.18 | 5 | Inv |
| P2 | F2 | 68 | 189 | 88 | 0.3 | 0.05 | 0.15 | 5 | Inv |
| P3 | F4 | 61 | 184 | 89 | 1.0 | 0.16 | 0.50 | 2 | Inv |
| P4 | F5 | 59 | 176 | 88 | 0.3 | 0.05 | 0.15 | 5 | Inv |
| P5 | F6 | 59 | 178 | 89 | 0.9 | 0.15 | 0.50 | 2 | Inv |
| P6 | F7 | 60 | 183 | 88 | 1.2 | 0.19 | 0.55 | 1 | Comp |
| P7 | F8 | 60 | 183 | 89 | 1.0 | 0.16 | 0.19 | 2 | Inv |
| P8 | F9 | 65 | 190 | 89 | 1.1 | 0.18 | 0.52 | 1 | Comp |
| P9 | F10 | 66 | 187 | 88 | 1.2 | 0.19 | 0.58 | 1 | Comp |
| P10 | F11 | 60 | 190 | 93 | 0.5 | 0.08 | 0.26 | 4 | Inv |
| P11 | F12 | 63 | 203 | 94 | 1.1 | 0.18 | 0.51 | 1 | Comp |
| P12 | F13 | 33 | 136 | 92 | 0.4 | 0.06 | 0.18 | 5 | Inv |
| P13 | F16 | 43 | 120 | 79 | 0.4 | 0.06 | 0.19 | 5 | Inv |
| P14 | F17 | 45 | 125 | 80 | 1.1 | 0.18 | 0.56 | 2 | Comp |
| P15 | F18 | 37 | 133 | 91 | 0.8 | 0.13 | 0.40 | 4 | Inv |
| P16 | F19 | 39 | 138 | 93 | 1.2 | 0.19 | 0.54 | 2 | Comp |
| P17 | F20 | 27 | 134 | 92 | 0.6 | 0.10 | 0.30 | 4 | Inv |

TABLE 1-5-continued

|  |  | Properties of Film | | | | | | Evaluation in Actual Installment | |
| --- | --- | --- | --- | --- | --- | --- | --- | --- | --- |
| Polarizing Plate No. | Film No. | Re (nm) | Rth (nm) | Film Thickness (μm) | P-V Value (μm) | RMS Value (μm) | Slow axis angle Distribution (°) | Evaluation of Uneven Black Display | Remarks |
| P18 | F21 | 28 | 138 | 92 | 1.1 | 0.18 | 0.53 | 1 | Comp |
| P19 | F22 | 65 | 220 | 93 | 0.7 | 0.12 | 0.34 | 3 | Inv |
| P20 | F23 | 69 | 240 | 92 | 1.1 | 0.18 | 0.55 | 1 | Comp |
| P21 | F24 | — | — | 80 | 0.6 | 0.10 | 0.31 | 4 | Inv |
| P22 | F25 | — | — | 80 | 1.2 | 0.19 | 0.62 | 1 | Comp |
| P23 | F26 | — | — | 80 | 0.5 | 0.08 | 0.28 | 4 | Inv |

Inv: The present invention
Comp: Comparative Example

From Table 1-5, it is noted that the films prepared by the present invention are better than Comparative Examples in terms of uneven black display.

TABLE 1-6

| | | Properties of Film | | | | | | Evaluation in Actual Installment | |
| --- | --- | --- | --- | --- | --- | --- | --- | --- | --- |
| Polarizing Plate No. | Film No. | Re (nm) | Rth (nm) | Film Thickness (μm) | P-V Value (μm) | RMS Value (μm) | Slow axis angle Distribution (°) | Evaluation of Uneven Black Display | Remarks |
| P3 | F4 | 61 | 184 | 89 | 1.0 | 0.16 | 0.5 | 2 | Invn |
| P24 | F27 | 64 | 199 | 90 | 0.6 | 0.10 | 0.4 | 4 | Invn |
| P25 | F28 | 62 | 184 | 89 | 0.9 | 0.12 | 0.4 | 3 | Invn |
| P26 | F29 | 58 | 203 | 88 | 0.5 | 0.08 | 0.2 | 5 | Invn |
| P27 | F30 | 59 | 178 | 89 | 0.6 | 0.09 | 0.3 | 4 | Invn |
| P28 | F31 | 61 | 200 | 88 | 0.3 | 0.06 | 0.1 | 5 | Invn |
| P29 | F32 | 60 | 183 | 89 | 1.0 | 0.12 | 0.4 | 3 | Invn |
| P30 | F33 | 63 | 190 | 89 | 0.6 | 0.08 | 0.2 | 4 | Invn |
| P31 | F34 | 40 | 128 | 88 | 0.7 | 008 | 0.3 | 3 | Invn |
| P32 | F35 | 38 | 135 | 93 | 0.4 | 0.05 | 0.1 | 4 | Invn |
| P33 | F36 | 35 | 130 | 94 | 0.8 | 0.08 | 0.4 | 3 | Invn |
| P34 | F37 | 33 | 133 | 92 | 0.4 | 0.04 | 0.3 | 4 | Invn |
| P35 | F38 | 43 | 121 | 79 | 0.7 | 0.09 | 0.4 | 3 | Invn |
| P36 | F39 | 45 | 128 | 80 | 0.3 | 0.04 | 0.3 | 4 | Invn |
| P37 | F40 | 35 | 129 | 91 | 0.8 | 0.09 | 0.4 | 3 | Invn |
| P38 | F41 | 37 | 138 | 93 | 0.4 | 0.03 | 0.3 | 4 | Invn |
| P39 | F42 | 79 | 280 | 92 | 1.0 | 0.15 | 0.5 | 2 | Invn |
| P40 | F43 | 74 | 310 | 92 | 0.6 | 0.07 | 0.4 | 4 | Invn |

Invn: The present invention

From Table 1-6, it is noted that the films F27, F29, F31, F33, F35, F37, F39, F41 and F43 prepared by increasing the alcohol concentration of polymer solution before preparation of film were better than F4, F28, F30, F32, F34, F36, F38, F30 and F42 in terms of uneven black display.

TABLE 1-7

| | | Properties of Film | | | | | | Evaluation in Actual Installment | |
| --- | --- | --- | --- | --- | --- | --- | --- | --- | --- |
| Polarizing Plate No. | Film No. | Re (nm) | Rth (nm) | Film Thickness (μm) | P-V Value (μm) | RMS Value (μm) | Slow axis angle Distribution (°) | Evaluation of Uneven Black Display | Remarks |
| P41 | F44 | 58 | 210 | 82 | 1.1 | 0.15 | 0.4 | 3 | Inv |
| P42 | F45 | 56 | 210 | 84 | 0.8 | 0.08 | 0.4 | 4 | Inv |

TABLE 1-7-continued

|  |  | Properties of Film | | | | | Evaluation in Actual | |
| --- | --- | --- | --- | --- | --- | --- | --- | --- |
| Polarizing Plate No. | Film No. | Re (nm) | Rth (nm) | Film Thickness (μm) | P-V Value (μm) | RMS Value (μm) | Slow axis angle Distribution (°) | Installment Evaluation of Uneven Black Display | Remarks |
| P43 | F46 | 54 | 198 | 83 | 0.6 | 0.07 | 0.3 | 4 | Inv |
| P44 | F47 | 56 | 192 | 83 | 0.6 | 0.06 | 0.2 | 5 | Inv |
| P45 | F48 | 58 | 207 | 82 | 1.0 | 0.10 | 0.3 | 4 | Inv |
| P46 | F49 | 55 | 200 | 84 | 0.5 | 0.05 | 0.2 | 5 | Inv |
| P47 | F50 | 45 | 125 | 81 | 0.6 | 0.05 | 0.2 | 4 | Inv |
| P48 | F51 | 70 | 270 | 83 | 0.9 | 0.12 | 0.4 | 4 | Inv |

Inv: The present invention

It is noted from Table 1-7 that the films F45 to 51 prepared by means of a co-casting method in the present invention are better than F44 in terms of uneven black display.

The present invention will now be specifically illustrated by way of Examples as follows although the present invention is not limited to the Examples.

<Synthesis of Cyclic Polyolefin Polymer P-1>

Pure toluene (100 parts by mass) and 100 parts by mass of methyl norbornenecarboxylate were placed in a reactor. Then 0.225 mmol % (by mass to the monomer) of tri(pentafluorophenyl) boron and 25 mmol % (by mass to the monomer) of ethyl hexanoate-Ni dissolved in toluene and 0.25 mmol % (by mass to the monomer) of triethyl aluminum were placed in a reactor. They were made to react for 18 hours by stirring at room temperature. After completion of the reaction, the reaction mixture was poured into an excessive ethanol to give a polymer precipitate. The precipitate was purified and the resulting polymer (P-1) was dried in vacuo at 65° C. for 24 hours.

Example 2-1

The following composition was poured into a mixing tank, stirred to dissolve the components and filtered through a filter paper where an average pore size was 34 μm and a calcined metal filter where an average pore size was 10 μm.

| Cyclic Polyolefin Solution D-1 | |
| --- | --- |
| Cyclic polyolefin P-1 | 150 parts by mass |
| Dichloromethane | 380 parts by mass |
| Methanol | 70 parts by mass |

The following composition containing the above-prepared cyclic polyolefin solution was poured into a dispersing machine to prepare a fine particle dispersion.

| Fine Particle Dispersion M-1 | |
| --- | --- |
| Silica particles of av. particle size of 16 nm (Aerosil R 972; Nippon Aerosil) | 2 parts by mass |
| Dichloromethane | 73 parts by mass |
| Methanol | 10 parts by mass |
| Cyclic polyolefin solution D-1 | 10 parts by mass |

The above cyclic polyolefin solution D-1 (100 parts by mass) and 1.35 parts by mass of a fine particle dispersion M-1 were mixed to prepare a dope for the formation of film. It was casted in a film-forming line as shown in FIGS. 1 and 2, dried on a belt 16 until the dope showed a self-supporting property and peeled as a film 117 followed by introducing into a tenter 118.

Conditions for the above-mentioned process are as shown in Table 2-1.

In all samples, a volatile matter X in the film 117 upon introduction into the tenter 118 was in a value smaller than to an extent of 5% to 15% than a peeled volatile matter. In the tenter 118, the film was conveyed without stretching in the width direction where stretching rate was 0% and temperature in the tenter was 140° C. Immediately after detaching from the tenter, a roll conveyance was conducted with a tension of 100 N/m and drying was conducted at 140° C. followed by winding. Dry thickness of the film at that time was 80 μm.

Table 2-1 shows the film thickness, Re retardation, Rth retardation, slow axis angle, standard deviation of dispersion thereof, glass transition temperature of the film, conveying property, surface property of the film by naked eye, etc. With regard to an optical unevenness, a sample was inserted between polarizers oriented in a cross nicol was subjected to an evaluation by naked eye while, with regard to a conveying property, a relative evaluation was done for degree of easiness for formation of wrinkles, buckling, etc. in the film in terms of o to x for "good" to "no good".

TABLE 2-1

Relation of Drying Conditions with
Optical Characteristic and Surface Property

| | Drying Conditions in Initial Stage of Casting on Band | | | |
|---|---|---|---|---|
| Sample No. | Time for Passing the Natural Wind Region [sec] | Wind Velocity of Natural Wind [m/s] | Wind Velocity of Dry Wind [m/s] | Temp of Dry Wind [° C.] |
| 101 | 10 | 1 | 3 | 100 |
| 102 | 10 | 0.5 | 4 | 100 |
| 103 | 10 | 0.5 | 5 | 100 |
| 104 | 10 | 0.5 | 5.5 | 100 |
| 105 | 10 | 0.5 | 6 | 100 |
| 001 | 20 | 2 | 6 | 100 |
| 002 | 30 | 2 | 6 | 100 |
| 106 | 7 | 0.5 | 6.5 | 100 |
| 107 | 7 | 0.5 | 7 | 100 |
| 108 | 7 | 0.5 | 8 | 100 |
| 109 | 7 | 0.5 | 7.5 | 100 |
| 110 | 7 | 0.5 | 8.5 | 100 |
| 111 | 7 | 0.5 | 9.5 | 100 |
| 112 | 7 | 0.5 | 10 | 100 |
| 113 | 7 | 0.5 | 10.5 | 100 |
| 003 | 45 | 1 | — | — |
| 114 | 7 | 0.5 | 15 | 100 |
| 115 | 7 | 0.5 | 15 | 73 |

| Sample No. | Volatile Matter upon Peeling [wt % D.B.] | Resistance against Peeling [N/cm] | Finished Thickness of Film [μm] | Optical Characteristics of Film | | | |
|---|---|---|---|---|---|---|---|
| | | | | Re [nm] | Rth [nm] | Slow axis angle Distribution [°] | Standard Deviation of Slow axis angle [°] |
| 101 | 120 | 0.1 | 80 | 7 | 180 | 0.5 | 0.3 |
| 102 | 110 | 0.11 | 80 | 8 | 190 | 0.2 | 0.3 |
| 103 | 100 | 0.12 | 80 | 7 | 195 | 0.3 | 0.2 |
| 104 | 95 | 0.12 | 80 | 5 | 200 | 0.5 | 0.4 |
| 105 | 90 | 0.13 | 80 | 3 | 210 | 0.2 | 0.4 |
| 001 | 84 | 0.13 | 80 | 4 | 207 | 0.2 | 1.3 |
| 002 | 80 | 0.14 | 80 | 5 | 206 | 0.3 | 1.7 |
| 106 | 85 | 0.14 | 80 | 4 | 180 | 0.4 | 0.2 |
| 107 | 80 | 0.17 | 80 | 2 | 190 | 0.4 | 0.3 |
| 108 | 70 | 0.17 | 80 | 4 | 200 | 0.4 | 0.2 |
| 109 | 75 | 0.16 | 80 | 5 | 220 | 0.3 | 0.2 |
| 110 | 65 | 0.16 | 80 | 7 | 240 | 0.3 | 0.3 |
| 111 | 55 | 0.18 | 80 | 6 | 260 | 0.4 | 0.4 |
| 112 | 50 | 0.17 | 80 | 6 | 280 | 0.3 | 0.3 |
| 113 | 45 | 0.17 | 80 | 3 | 300 | 0.4 | 0.6 |
| 003 | 160 | 0.29 | 80 | 3 | 150 | 0.4 | 0.2 |
| 114 | 15 | 0.31 | 80 | 2 | 320 | 0.4 | 0.7 |
| 115 | 47 | 0.17 | 80 | 2 | 313 | 0.4 | 0.4 |

| Sample No. | Glass Transition Temp [° C.] | Conveying Property | Film Surface Property | | Notes |
|---|---|---|---|---|---|
| | | | Unevenness by Wind | Unevenness by Peeling | |
| 101 | 263 | ○ | ○ | ○ | Invn |
| 102 | 260 | ○ | ○○ | ○ | Invn |
| 103 | 260 | ○ | ○○ | ○ | Invn |
| 104 | 260 | ○ | ○○ | ○ | Invn |
| 105 | 262 | ○ | ○○ | ○○ | Invn |
| 001 | 261 | ○ | Δ | ○ | C.E. |
| 002 | 261 | ○ | x | ○ | C.E. |
| 106 | 259 | ○ | ○○ | ○○ | Invn |
| 107 | 259 | ○ | ○○ | ○○ | Invn |
| 108 | 260 | ○ | ○○ | ○○ | Invn |
| 109 | 261 | ○ | ○○ | ○○ | Invn |
| 110 | 260 | ○ | ○○ | ○○ | Invn |
| 111 | 258 | ○ | ○○ | ○○ | Invn |
| 112 | 258 | ○ | ○○ | ○○ | Invn |
| 113 | 258 | ○ | ○ | ○○ | Invn |
| 003 | 260 | x | x | x | C.E. |

TABLE 2-1-continued

| | Relation of Drying Conditions with Optical Characteristic and Surface Property | | | | |
|---|---|---|---|---|---|
| 114 | 258 | x | o | x | Invn |
| 115 | 259 | o | oo | oo | Invn |

Invn: This invention
C.E.: Comparative Example

[Evaluation of Surface Property of Film]

The film was observed by naked eye and its surface property was evaluated as follows, oo: film surface was flat and smooth
o: film surface was flat and smooth but very weak unevenness was noted
Δ: although weak unevenness was noted on film surface, some types of the optical films are able to be used
x: unevenness was noted on film surface being difficult to use as an optical film As shown in Table 2-1, it is noted that, when time for passing the natural wind region A is not longer than 15 seconds, unevenness of the film by the wind (unevenness in stripes and spots) is reduced giving a good surface property (001 to 003 are bad examples). When resistance against peeling was 0.25 N/cm or more, unevenness by peeling was resulted (003 and 114).

Example 2-2

Cyclic polyolefin films were prepared by entirely the same manner as in Example 2-1 except that stretching rate in the tenter 118 was made 8%. Results of evaluation are shown in Table 2-2.

TABLE 2-2

Relation of Drying Conditions with Optical Characteristic and Surface Property of Stretched Films

| | Drying Conditions in Initial Stage of Casting on Band | | | |
|---|---|---|---|---|
| Sample No. | Time for Passing the Natural Wind Region [sec] | Wind Velocity of Natural Wind [m/s] | Wind Velocity of Dry Wind [m/s] | Temp of Dry Wind [° C.] |
| 201 | 10 | 1 | 3 | 100 |
| 202 | 10 | 0.5 | 4 | 100 |
| 203 | 10 | 0.5 | 5 | 100 |
| 204 | 10 | 0.5 | 5.5 | 100 |
| 205 | 10 | 0.5 | 6 | 100 |
| 010 | 20 | 2 | 6 | 100 |
| 011 | 30 | 2 | 6 | 100 |
| 206 | 7 | 0.5 | 6.5 | 100 |
| 207 | 7 | 0.5 | 7 | 100 |
| 208 | 7 | 0.5 | 8 | 100 |
| 209 | 7 | 0.5 | 7.5 | 100 |
| 210 | 7 | 0.5 | 8.5 | 100 |
| 211 | 7 | 0.5 | 9.5 | 100 |
| 212 | 7 | 0.5 | 10 | 100 |
| 213 | 7 | 0.5 | 10.5 | 100 |
| 013 | 45 | 1 | — | — |
| 214 | 7 | 0.5 | 15 | 100 |
| 215 | 7 | 0.5 | 15 | 75 |

| Sample No. | Volatile Matter upon Peeling [wt % D.B.] | Resistance against Peeling [N/cm] | Finished Thickness of Film [μm] | Optical Characteristics of Film | | | |
|---|---|---|---|---|---|---|---|
| | | | | Re [nm] | Rth [nm] | Slow axis angle Distribution [°] | Standard Deviation of Slow axis angle [°] |
| 201 | 120 | 0.1 | 80 | 80 | 185 | 0.5 | 0.4 |
| 202 | 110 | 0.11 | 80 | 70 | 195 | 0.2 | 0.4 |
| 203 | 100 | 0.12 | 80 | 65 | 200 | 0.3 | 0.3 |
| 204 | 95 | 0.12 | 80 | 60 | 200 | 0.5 | 0.4 |
| 205 | 90 | 0.13 | 80 | 60 | 215 | 0.2 | 0.4 |
| 010 | 84 | 0.13 | 80 | 56 | 210 | 0.2 | 1.3 |
| 011 | 80 | 0.14 | 80 | 57 | 210 | 0.3 | 1.7 |
| 206 | 85 | 0.14 | 80 | 55 | 185 | 0.4 | 0.2 |
| 207 | 80 | 0.17 | 80 | 55 | 200 | 0.4 | 0.3 |
| 208 | 70 | 0.17 | 80 | 56 | 210 | 0.4 | 0.2 |
| 209 | 75 | 0.16 | 80 | 58 | 220 | 0.3 | 0.2 |
| 210 | 65 | 0.16 | 80 | 57 | 240 | 0.3 | 0.3 |
| 211 | 55 | 0.18 | 80 | 60 | 260 | 0.4 | 0.4 |
| 212 | 50 | 0.17 | 80 | 57 | 280 | 0.3 | 0.3 |

TABLE 2-2-continued

Relation of Drying Conditions with Optical Characteristic
and Surface Property of Stretched Films

| | | | | | | | |
|---|---|---|---|---|---|---|---|
| 213 | 45 | 0.17 | 80 | 55 | 300 | 0.4 | 0.6 |
| 013 | 160 | 0.29 | 80 | 57 | 150 | 0.4 | 0.2 |
| 214 | 15 | 0.31 | 80 | 57 | 320 | 0.4 | 0.7 |
| 215 | 48 | 0.15 | 80 | 55 | 300 | 0.4 | 0.7 |

| Sample No. | Glass Transition Temp [° C.] | Conveying Property | Film Surface Property Uneveness by Wind | Uneveness by Peeling | Notes |
|---|---|---|---|---|---|
| 201 | 263 | ○ | ○ | ○ | Invn |
| 202 | 260 | ○ | ○○ | ○ | Invn |
| 203 | 260 | ○ | ○○ | ○ | Invn |
| 204 | 260 | ○ | ○○ | ○ | Invn |
| 205 | 262 | ○ | ○○ | ○○ | Invn |
| 010 | 261 | ○ | Δ | ○ | C.E. |
| 011 | 261 | ○ | x | ○ | C.E. |
| 206 | 259 | ○ | ○○ | ○○ | Invn |
| 207 | 259 | ○ | ○○ | ○○ | Invn |
| 208 | 260 | ○ | ○○ | ○○ | Invn |
| 209 | 261 | ○ | ○○ | ○○ | Invn |
| 210 | 260 | ○ | ○○ | ○○ | Invn |
| 211 | 258 | ○ | ○○ | ○○ | Invn |
| 212 | 258 | ○ | ○○ | ○○ | Invn |
| 213 | 258 | ○ | ○ | ○○ | Invn |
| 013 | 260 | x | x | x | C.E. |
| 214 | 258 | x | ○ | x | Invn |
| 215 | 258 | ○ | ○○ | ○○ | Invn |

Invn: This invention
C.E.: Comparative Example

The difference from Table 2-1 is optical property of film and, particularly, expressing ability of Re was high. With regard to surface property and other characteristics, the results were nearly the same as those in Table 2-1.

Example 2-3

The following compositions were placed in a mixing tank, stirred to dissolve the components and filtered through a filter paper of average pore size of 34 μm and a calcined metal filter of average pore size of 10 μm.

| Cyclic Polyolefin Solution D-2 | |
|---|---|
| Cyclic polyolefin: Appear 3000 | 100 parts by mass |
| Dichloromethane | 380 parts by mass |
| Methanol | 70 parts by mass |

The following composition containing the cyclic polyolefin solution prepared by the above method was poured into a dispersing machine to prepare a fine particle dispersion.

| Fine Particle Dispersion M-2 | |
|---|---|
| Silica particles of 16 nm av. particle size (Aerosil R972 manufd by Nippon Aerosil) | 2 parts by mass |
| Dichloromethane | 73 parts by mass |
| Methanol | 10 parts by mass |
| Cyclic polyolefin solution D-2 | 10 parts by mass |

The above cyclic polyolefin solution D-2 (100 parts by mass) and 1.35 parts by mass of a fine particle dispersion M-2 were mixed to prepare a dope for film formation. Nearly the same method as in Example 2-1 was used except that the above-prepared dope was used and stretching rate by tenter 118 was made 8% whereupon a cyclic polyolefin film was prepared. Results of evaluation thereof are shown in Table 2-3. Nearly the same results as in Table 2-2 were achieved.

TABLE 2-3

Relation of Drying Conditions with Optical Characteristic
and Surface Property of Stretched Films

| | Drying Conditions in Initial Stage of Casting on Band | | | |
|---|---|---|---|---|
| Sample No. | Time for Passing the Natural Wind Region [sec] | Wind Velocity of Natural Wind [m/s] | Wind Velocity of Dry Wind [m/s] | Temp of Dry Wind [° C.] |
| 301 | 10 | 1 | 3 | 100 |
| 302 | 10 | 0.5 | 4 | 100 |
| 303 | 10 | 0.5 | 5 | 100 |
| 304 | 10 | 0.5 | 5.5 | 100 |

TABLE 2-3-continued

Relation of Drying Conditions with Optical Characteristic and Surface Property of Stretched Films

| | | | | | |
|---|---|---|---|---|---|
| 305 | 10 | 0.5 | 6 | | 100 |
| 306 | 7 | 0.5 | 6.5 | | 100 |
| 307 | 7 | 0.5 | 7 | | 100 |
| 308 | 7 | 0.5 | 8 | | 100 |
| 309 | 7 | 0.5 | 7.5 | | 100 |
| 310 | 7 | 0.5 | 8.5 | | 100 |
| 311 | 7 | 0.5 | 9.5 | | 100 |
| 312 | 7 | 0.5 | 10 | | 100 |
| 313 | 7 | 0.5 | 10.5 | | 100 |

| Sample No. | Volatile Matter upon Peeling [wt % D.B.] | Resistance against Peeling [N/cm] | Finished Thickness of Film [μm] | Optical Characteristics of Film | | | |
|---|---|---|---|---|---|---|---|
| | | | | Re [nm] | Rth [nm] | Slow axis angle Distribution [°] | Standard Deviation of Slow axis angle [°] |
| 301 | 120 | 0.11 | 80 | 80 | 188 | 0.5 | 0.3 |
| 302 | 110 | 0.13 | 80 | 70 | 198 | 0.2 | 0.4 |
| 303 | 100 | 0.14 | 80 | 65 | 200 | 0.4 | 0.4 |
| 304 | 95 | 0.13 | 80 | 60 | 200 | 0.5 | 0.3 |
| 305 | 90 | 0.14 | 80 | 60 | 210 | 0.2 | 0.4 |
| 306 | 85 | 0.14 | 80 | 55 | 190 | 0.3 | 0.2 |
| 307 | 80 | 0.16 | 80 | 55 | 200 | 0.3 | 0.3 |
| 308 | 70 | 0.18 | 80 | 56 | 210 | 0.4 | 0.2 |
| 309 | 75 | 0.17 | 80 | 58 | 220 | 0.3 | 0.2 |
| 310 | 65 | 0.16 | 80 | 57 | 240 | 0.2 | 0.3 |
| 311 | 55 | 0.18 | 80 | 60 | 265 | 0.3 | 0.4 |
| 312 | 50 | 0.18 | 80 | 57 | 290 | 0.3 | 0.3 |
| 313 | 45 | 0.18 | 80 | 55 | 310 | 0.4 | 0.6 |

| Sample No. | Glass Transition Temp [° C.] | Conveying Property | Film Surface Property | | Notes |
|---|---|---|---|---|---|
| | | | Unevenness by Wind | Unevenness by Peeling | |
| 301 | 143 | ○ | ○ | ○ | Invn |
| 302 | 142 | ○ | ○○ | ○ | Invn |
| 303 | 141 | ○ | ○○ | ○ | Invn |
| 304 | 143 | ○ | ○○ | ○ | Invn |
| 305 | 144 | ○ | ○○ | ○○ | Invn |
| 306 | 142 | ○ | ○○ | ○○ | Invn |
| 307 | 144 | ○ | ○○ | ○○ | Invn |
| 308 | 143 | ○ | ○○ | ○○ | Invn |
| 309 | 142 | ○ | ○○ | ○○ | Invn |
| 310 | 144 | ○ | ○○ | ○○ | Invn |
| 311 | 144 | ○ | ○○ | ○○ | Invn |
| 312 | 145 | ○ | ○○ | ○○ | Invn |
| 313 | 143 | ○ | ○ | ○○ | Invn |

Invn: This invention

Example 2-4

The following composition was poured into a mixing tank, stirred to dissolve the components and filtered through a filter paper of average pore size of 34 μm and a calcined metal filter of average pore size of 10 μm.

| Cyclic Polyolefin Solution D-3 | |
|---|---|
| Cyclic polyolefin: Zeonor ZF-14 | 100 parts by mass |
| Paraffin wax 15 (Nippon Seiro) | 10 parts by mass |
| Cyclohexane | 450 parts by mass |

Then the following composition containing the cyclic polyolefin solution prepared by the above method was poured into a dispersing machine to prepare a fine particle dispersion.

| Fine Particle Dispersion M-3 | |
|---|---|
| Silica particles of 16 nm av. particle size (Aerosil R972 manufd by Nippon Aerosil) | 2 parts by mass |
| Cyclohexane | 83 parts by mass |
| Cyclic polyolefin solution D-3 | 10 parts by mass |

The above-mentioned cyclic polyolefin solution D-3 (100 parts by mass) and 1.35 parts by mass of the fine particle dispersion were mixed to prepared a dope for film formation. It was casted in a film-forming line of FIG. 7, dried on a belt 116 until the dope showed a self-supporting property and peeled as a film 117. Volatile matters of the film 117 upon introducing into a tenter 118 was lower than those upon peeling as shown in Table 2-4 to an extent of 3 to 10% in all cases. An stretching of 20% was conducted in the tenter 118 and the product was conveyed by a roll, dried at 140° C. and wound. Thickness of the dry film at that time was 80 μm. Results of evaluation of the film manufactured as such are shown in Table 2-4.

Nearly the same surface property and conveying property as in Tables 2-2 and 2-3 were resulted. With regard to an optical characteristic, expressing property was somewhat different. With regard to a resistance against peeling, products having somewhat higher than Tables 2-2 and 2-3 were obtained and some of them showed some uneven surface upon peeling although they were within a usable range.

TABLE 2-4

Relation of Drying Conditions with Optical Characteristic and Surface Property of Stretched Films

| Sample No. | Time for Passing the Natural Wind Region [sec] | Wind Velocity of Natural Wind [m/s] | Wind Velocity of Dry Wind [m/s] | Temp of Dry Wind [° C.] |
|---|---|---|---|---|
| 401 | 10 | 1 | 3 | 100 |
| 402 | 10 | 0.5 | 4 | 100 |
| 403 | 10 | 0.5 | 5 | 100 |
| 404 | 10 | 0.5 | 5.5 | 100 |
| 405 | 10 | 0.5 | 6 | 100 |
| 406 | 7 | 0.5 | 6.5 | 100 |
| 407 | 7 | 0.5 | 7 | 100 |
| 408 | 7 | 0.5 | 8 | 100 |
| 409 | 7 | 0.5 | 7.5 | 100 |
| 410 | 7 | 0.5 | 8.5 | 100 |
| 411 | 7 | 0.5 | 9.5 | 100 |
| 412 | 7 | 0.5 | 10 | 100 |
| 413 | 7 | 0.5 | 10.5 | 100 |

| Sample No. | Volatile Matter upon Peeling [wt % D.B.] | Resistance against Peeling [N/cm] | Finished Thickness of Film [μm] | Re [nm] | Rth [nm] | Slow axis angle Distribution [°] | Standard Deviation of Slow axis angle [°] |
|---|---|---|---|---|---|---|---|
| 401 | 120 | 0.17 | 80 | 80 | 190 | 0.5 | 0.4 |
| 402 | 110 | 0.19 | 80 | 70 | 200 | 0.3 | 0.4 |
| 403 | 100 | 0.18 | 80 | 65 | 210 | 0.4 | 0.4 |
| 404 | 95 | 0.19 | 80 | 60 | 220 | 0.5 | 0.5 |
| 405 | 90 | 0.18 | 80 | 60 | 230 | 0.3 | 0.4 |
| 406 | 85 | 0.19 | 80 | 55 | 200 | 0.4 | 0.3 |
| 407 | 80 | 0.18 | 80 | 55 | 210 | 0.3 | 0.4 |
| 408 | 70 | 0.19 | 80 | 56 | 220 | 0.4 | 0.3 |
| 409 | 75 | 0.2 | 80 | 58 | 200 | 0.4 | 0.4 |
| 410 | 65 | 0.19 | 80 | 57 | 210 | 0.3 | 0.5 |
| 411 | 55 | 0.18 | 80 | 60 | 270 | 0.4 | 0.4 |
| 412 | 50 | 0.19 | 80 | 57 | 300 | 0.3 | 0.4 |
| 413 | 45 | 0.2 | 80 | 55 | 340 | 0.5 | 0.6 |

| Sample No. | Glass Transition Temp [° C.] | Conveying Property | Unevenness by Wind | Unevenness by Peeling | Notes |
|---|---|---|---|---|---|
| 401 | 143 | ○ | ○ | ○ | Invn |
| 402 | 142 | ○ | ○○ | ○ | Invn |
| 403 | 141 | ○ | ○○ | ○ | Invn |
| 404 | 143 | ○ | ○○ | ○ | Invn |
| 405 | 144 | ○ | ○○ | ○○ | Invn |
| 406 | 142 | ○ | ○○ | ○○ | Invn |
| 407 | 144 | ○ | ○○ | ○○ | Invn |
| 408 | 143 | ○ | ○○ | ○○ | Invn |
| 409 | 142 | ○ | ○○ | ○ | Invn |
| 410 | 144 | ○ | ○○ | ○○ | Invn |
| 411 | 144 | ○ | ○○ | ○○ | Invn |
| 412 | 145 | ○ | ○○ | ○○ | Invn |
| 413 | 143 | ○ | ○ | ○ | Invn |

Invn: This invention

Example 2-5

Preparation of Polarizing Plate

A polarizer was prepared by adsorption of iodine with the stretched polyvinyl alcohol film. A cyclic polyolefin film (207) prepared in Example 2-2 was subjected to a glow discharge treatment (treatment was conducted for 20 seconds by applying high-frequency voltage of 300 Hz frequency and 4,200 V between upper and lower electrodes) and a commercially available 80 μm cellulose triacetate film (TD 80 UF) was subjected to the following saponification treatment, then each of them was adhered on both sides of the polarizer using a polyvinyl alcohol adhesive and dried at 70° C. for not shorter than 10 minutes to prepare a polarizing plate A. Conditions for the saponification treatment were as follows.

Thus, a 1.5N aqueous solution of sodium hydroxide was prepared and kept at 55° C. A 0.01N aqueous diluted sulfuric acid solution was prepared and kept at 35° C. TD 80 UF was dipped for 2 minutes in the above aqueous solution of sodium hydroxide and then dipped in water so that the aqueous solution of sodium hydroxide was well washed out. Finally, the sample was well dried at 120° C.

In the prepared polarizing plate A, a cyclic polyolefin film 207 was adhered on one side of a polarizer while, on another side thereof, a commercially available cellulose triacetate film (TD 80 UF) was adhered. Transmitting axis of the polarizer and slow axis angle of the cyclic polyolefin film 207 were oriented to make them in parallel. Transmitting axis of the polarizer and slow axis angle of the TD 80 UF were oriented to make them orthogonal.

<Preparation of VA Liquid Crystal Cell>

A liquid crystal cell was prepared in such a manner that cell gap between substrates was made 3.6 μm and a liquid crystal material having a negative dielectric anisotropy (MCL 6608 manufactured by Merck) was dropped and infused between the substrates followed by sealing to form a liquid crystal layer between the substrates. Retardation of the liquid crystal layer (or, in other words, the product (Δn×d) of thickness d (μm) of the liquid crystal layer and refractive index anisotropy Δn) was made 300 nm. The liquid crystal material was oriented so as to make it in a vertical orientation. In the upper side (side for an observer) of this vertically oriented liquid crystal cell, a commercially available super high contrast product (such as HLC 2-5618 manufactured by Sunrits) was used. On the lower side (backlight side) of the liquid crystal cell, the polarizing plate A manufactured as above was adhered via an adhesive so that the cyclic polyolefin film comes to the side of the liquid crystal cell. A cross nicol orientation was done so that a transmitting axis of the polarizing plate of the upper side becomes in an up-and-down direction while a transmitting axis of the polarizing plate of the lower side becomes in a right-and-left direction.

When the prepared liquid crystal display device was observed, neutral black display was able to be achieved in a front direction and also in a visual angle direction for all gradations. Even after the environmental temperature was changed, display along the picture was without unevenness but was good.

INDUSTRIAL APPLICABILITY

In accordance with the solution film-forming method of the present invention, dry wind is applied from a ventilation opening within 15 seconds from formation of the casted film on the support in a solution film-forming method where a dope containing polymer and solvent is casted on a support running from a casting die in an endless manner to form a casted film on the support from the dope and the casted film is peeled as a film. Accordingly, it is now possible to manufacture a film having an improved flatness without the use of special equipment and without lowering the film-forming speed.

It is also possible by the use of the cellulose ester film of the present invention to provide an optical film having little uneven display when used for a liquid crystal display device.

In accordance with the present invention, it is now able to provide a cyclic polyolefin film having little hygroscopicity and moisture permeability, having little change in optical characteristics by changes in environmental temperature and humidity and having excellent flatness and surface property without unevenness. There is also able to be provided a solution casting film-forming method for a cyclic polyolefin film having the above-mentioned properties. There is further able to be provided an optical compensation film, a polarizer and a liquid crystal display device using the excellent cyclic polyolefin film having the above-mentioned properties.

The entire disclosure of each and every foreign patent application from which the benefit of foreign priority has been claimed in the present application is incorporated herein by reference, as if fully set forth.

The invention claimed is:

1. A polymer film,
   wherein when any point in the polymer film is taken as a center, a maximum difference between high and low film thicknesses within a range of 60 mm diameter is not more than 1 μm, and an RMS value of a film thickness within a range of 60 mm diameter is 0 μm to 0.15 μm, and
   wherein a difference between maximum and minimum values of slow axis angle in any 60 mm×60 mm square in the polymer film is 0° to 0.40°.

2. The polymer film according to claim 1,
   wherein an in-plane retardation Re (λ) is 0 nm≦Re$_{(590)}$ ≦200 nm and a retardation in a direction of film thickness Rth (λ) is 60 nm≦Rth$_{(590)}$≦400 nm,
   wherein Re (λ) is an in-plane retardation (Re) value (unit: nm) at a wavelength of λ nm; and
   Rth (λ) is a retardation (Rth) value (unit: nm) in a direction of film thickness at a wavelength of λ nm.

3. A polarizing plate comprising:
   a polarizer; and
   at least two protective films,
   wherein at least one of the at least two protective films is a polymer film according to claim 1.

4. A liquid crystal display device comprising at least one of a polymer film according to claim 1 and a polarizing plate comprising: a polarizer; and at least two protective films, wherein at least one of the at least two protective films is a polymer film according to claim 1.

* * * * *